US 9,810,549 B2

(12) United States Patent
Johnson et al.

(10) Patent No.: US 9,810,549 B2
(45) Date of Patent: Nov. 7, 2017

(54) SYSTEMS, METHODS, AND APPARATUS FOR CALIBRATION OF AND THREE-DIMENSIONAL TRACKING OF INTERMITTENT MOTION WITH AN INERTIAL MEASUREMENT UNIT

(75) Inventors: Eric Allen Johnson, West Haven, UT (US); Mark A. Minor, Salt Lake City, UT (US); Stacy J. Morris Bamberg, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 1109 days.

(21) Appl. No.: 13/345,431

(22) Filed: Jan. 6, 2012

(65) Prior Publication Data

US 2012/0203487 A1    Aug. 9, 2012

Related U.S. Application Data

(60) Provisional application No. 61/460,681, filed on Jan. 6, 2011, provisional application No. 61/460,682, filed on Jan. 6, 2011.

(51) Int. Cl.
*G01C 25/00* (2006.01)
*G01P 21/00* (2006.01)

(52) U.S. Cl.
CPC ............ *G01C 25/005* (2013.01); *G01P 21/00* (2013.01)

(58) Field of Classification Search
CPC ..................... G01R 19/0092; G01R 19/2513
USPC .................................. 702/64, 104; 356/4.01
See application file for complete search history.

(56) References Cited

U.S. PATENT DOCUMENTS

| | | | |
|---|---|---|---|
| 6,292,751 B1 | 9/2001 | Frank | |
| 6,617,750 B2 | 9/2003 | Dummermuth et al. | |
| 6,882,964 B2 | 4/2005 | Bayard et al. | |
| 7,274,504 B2 | 9/2007 | Crane et al. | |
| 7,457,724 B2 | 11/2008 | Vock et al. | |
| 7,481,109 B2 | 1/2009 | Moore et al. | |
| 7,508,384 B2 | 3/2009 | Zhang et al. | |
| 7,840,369 B2 | 11/2010 | Lee et al. | |
| 7,921,716 B2 | 4/2011 | Morris Bamberg et al. | |
| 8,279,412 B2 * | 10/2012 | Motzer et al. | 356/4.01 |
| 8,583,392 B2 * | 11/2013 | Panagas | 702/93 |
| 2002/0109512 A1 | 8/2002 | Chia et al. | |
| 2006/0072634 A1 * | 4/2006 | Daiber | 372/20 |
| 2007/0032951 A1 | 2/2007 | Tanenhaus et al. | |
| 2008/0188909 A1 | 8/2008 | Bradley | |

(Continued)

FOREIGN PATENT DOCUMENTS

WO    2007124257    11/2007

OTHER PUBLICATIONS

Saxena et al., "In Use Parameter Estimation of Inertial Sensors by Detecting Multilevel Quasi-static States". pp. 595-601.

(Continued)

*Primary Examiner* — Lam Nguyen
(74) *Attorney, Agent, or Firm* — Workman Nydegger

(57) ABSTRACT

Generally, implementations of the present invention include devices, systems, and methods for tracking intermittent motion. Such systems can be used to calibrate inertial measurement units (IMUs), which can be used to obtain acceleration, linear and angular velocities, orientation, and position of a moving body. Such systems also can be used to account and compensate for errors and imperfections present in an IMU prior to and during operation.

23 Claims, 17 Drawing Sheets

(56) References Cited

U.S. PATENT DOCUMENTS

2010/0204615 A1    8/2010  Kyle et al.
2010/0292943 A1*  11/2010  Minor et al. .................... 702/64
2012/0022780 A1*   1/2012  Kulik et al. ................. 701/220

OTHER PUBLICATIONS

Ford, et al., "MEMS Inertial on an RTK GPOS Receiver: Integration Options and Test Results," 12 pages.

Rizun, "Optimal Wiener Filter for a Body Mounted Inertial Attitude Sensor," *The Journal of Navigation*, 2008, 61, pp. 455-472.

Armesto, et al., "Fast Ego-motion Estimation with Multi-rate Fusin of Inertial and Vision," The International Journal of Robotics Research, 2007, 26; 577. 14 pages. Available at http://ijr.sagepub.com.

Weinberg, et al. "Tilt Determination in MEMS Inertial Vestibular Prosthesis," *Journal of Biomechanical Engineering*, Dec. 2006, vol. 128, pp. 943-956.

Jurman, et al., "Calibration and Data Fusion Solution for the Miniature Attitude and Heading References System," Sensors and Actuators A 138 (2007) pp. 411-420.

Oskiper, et al. "Visual Ododmetry System Using Multiple Stereo Cameras and Inertial Measurement Unit," 2007 IEEE, 8 pages.

Huang, et al. "Integration of MEMS Inertial Sensor-Based GNC of a UAV," *International Journal of Information Technology*, vol. 11, No. 10, 2005. pp. 1-10.

Bandala, et al., "Tracking of Internal Organ Motion with a Six Degree-of-Freedom MEMS Sensor: Concept and Simulation Study," Meas. Sci. Tecnol. 19 (2008) 024006, (9pp).

Johnson, et al., "Inertial Navigation for a Mobile Robot Using MEMS Inertial Sensors and a State Estimation Algorithm for Bias Updates," IEEE Transactions on Robotics, 2011.

Johnson, et al., "A Powerful and Inexpensive Method for Calibrating an Inertial Measurement Unit. Part I: Background and Theory," Jan. 2, 2011.

U.S. Appl. No. 12/467,881, Jul. 19, 2011, Office Action.
U.S. Appl. No. 12/467,881, Aug. 3, 2012, Final Office Action.
U.S. Appl. No. 12/467,881, Mar. 28, 2014, Office Action.
U.S. Appl. No. 12/467,881, Jul. 9, 2014, Final Office Action.
U.S. Appl. No. 12/467,881, Jan. 15, 2015, Office Action.
U.S. Appl. No. 12/467,881, Jun. 3, 2015, Notice of Allowance.

* cited by examiner

SYSTEMS, METHODS, AND APPARATUS FOR CALIBRATION OF AND THREE-DIMENSIONAL TRACKING OF INTERMITTENT MOTION WITH AN INERTIAL MEASUREMENT UNIT

CROSS-REFERENCE TO RELATED APPLICATIONS

The present application claims the benefit or priority to: U.S. Provisional Application No. 61/460,681, entitled "Powerful and Inexpensive Method for Calibrating an Inertial Measurement Unit," filed on Jan. 6, 2011 and U.S. Provisional Patent Application No. 61/460,682, entitled "Inertial Navigation for a Mobile Robot Using MEMS Inertial Sensors and a State Estimation Algorithm for Bias Updates," filed on Jan. 6, 2011, the entireties of which are incorporated by this reference.

BACKGROUND OF THE DISCLOSURE

1. The Field of the Invention

This invention relates generally to calibrating and tracking of inertial measurement units, and specifically relates to systems, methods, and apparatus for three-dimensional tracking of intermittent motion with the aid of an inertial measurement unit.

2. Background and Relevant Art

An Inertial Measurement Unit (IMU) is a device that can report on the inertial status of a moving body including the acceleration, velocity, orientation, and position of the moving body. The use of an IMU may facilitate tracking of movement of a body by integrating the acceleration and the angular velocity measured by the IMU. In some instances, the IMU can supplement or replace alternative tracking systems, such as a global positioning system (GPS). One advantage that an IMU may have over other tracking systems, such as a GPS, is that the IMU is self-contained and does not require input or feedback from an external device. Hence, an IMU can continue tracking movement and position of a body in locations where a GPS signal may be unavailable.

Typically, an IMU utilizes a combination of accelerometers and gyroscopes that can determine and quantify linear acceleration and angular velocity, respectively. The values obtained from the IMUs gyroscopes can be processed to obtain the pitch, roll, and heading of the IMU and, therefore, of the body with which the IMU is associated. Signals from the IMU's accelerometers also can be processed to obtain velocity and displacement of the IMU. Accurate results, however, may depend on the quality of the IMU. A higher precision IMU typically comes at a higher price and may come with increased weight and size, as compared with a generally lower-precision IMU.

The size and price of IMUs utilizing low-cost, miniaturized inertial sensors may make such devices attractive for applications where, for example, smaller size and lower weight are important. A typical example is the use of IMUs based on microelectromechanical systems (MEMS) inertial sensors. Modern manufacturing techniques have made MEMS IMUs less expensive and have increased their durability. Unfortunately, typical low-cost, consumer-grade MEMS IMUs currently have lower precision than is needed to allow them to provide accurate position information. In fact, error accumulation and growth during the operation of consumer-grade MEMS IMUs can easily render their time-integrated output signals highly unreliable within a matter of seconds.

More specifically, consumer-grade MEMS IMUs are commonly plagued with manufacturing deviations as well as other inherent problems. For instance, a typical consumer-grade MEMS IMU can suffer from scale factor nonlinearlity, anisotropic sensitivity, gyroscope acceleration sensitivity, output noise, parameter drift, or other issues, which can lead to unbounded error growth. Consequently, the advantages of the MEMS IMU's size and cost are frequently overshadowed by and/or cannot be adequately realized due to the inherent errors in its output. Although various attempts have been made to address various inadequacies related to the inherent error in MEMS IMUs' output, conventional systems may not produce sufficiently accurate results that can be used to track velocity, position, and/or orientation of the MEMS IMU in a three-dimensional space. These same limitations, in whole or in part, can also apply to IMUs based on other technologies that sacrifice accuracy in exchange for reduced size, weight, and/or cost or other desirable characteristics.

Accordingly, a need exists for systems, methods, and apparatus for three-dimensional tracking of intermittent motion with the aid of an inertial measurement unit.

BRIEF SUMMARY

Implementations of the present disclosure provide systems, methods, and apparatus that permit calibration of inertial measurement units (IMUs) as well as use in the tracking of intermittent motion. Although some implementations may both calibrate an IMU and use the calibrated IMU in tracking intermittent motion, other implementations may only calibrate an IMU or may track intermittent motion without using the calibration techniques described herein. Such systems may utilize calibrated microelectromechanical systems (MEMS) IMUs to obtain orientation and/or position related information (such as acceleration and angular velocity) of a stationary or moving body with an attached IMU. The system and methods also can process the acceleration and angular velocity to determine, for example, the linear velocity, orientation (i.e., pitch, roll, and heading), linear displacement, and, consequently, the position of the moving body. Hence, in at least one implementation, the IMU can be used to determine the position and/or orientation of an intermittently moving body.

In one or more implementations, a system for calibrating an inertial measurement unit (IMU) that has one or more sensors can incorporate a calibration fixture and a computer system. The calibration fixture can be sized and configured to limit relative movement of the IMU with respect to the calibration fixture. The calibration fixture also can be configured to allow for linear movement and for angular positioning of the IMU at various predetermined angles. The computer system can be in functional communication (either wired or wireless) with the IMU. The computer system can include a processor and one or more physical non-transitory computer readable medium having computer executable instructions stored thereon. When executed by the processor, the stored instructions can cause the computer system to perform various acts. Signals from the one or more sensors may be received. Calibration values for compensating signals from the one or more sensors from a calibration model that uses a variable for Earth's gravity vector acting on the IMU may be calculated.

In other implementations, a system for estimating a state of an (IMU) that has one or more accelerometers and/or one or more gyroscopes can have a computer system functionally connected to the IMU. Such computer system can include a processor and at least one physical non-transitory computer readable medium having computer executable instructions stored thereon. When executed by the processor, the stored instructions can cause the computer system to perform various acts. Signals from the one or more accelerometers and/or one or more gyroscopes may be received. Each signal may be monitored to determine whether the signal is within a noise band of the one or more gyroscopes and/or one or more accelerometers that sent the signal. If all of the received signals are within noise bands of the respective one or more gyroscopes and/or one or more accelerometers that sent the signals, a status of zero velocity may be assigned to the IMU.

In at least one implementation, a system for tracking intermittent motion can include an IMU that has one or more accelerometers and/or one or more gyroscopes and may be sized and configured to be secured to a moving body. Such system also can include a computer system functionally connected to the IMU. The computer system can incorporate a processor and at least one physical non-transitory computer readable medium having computer executable instructions stored thereon. When executed by the processor, the stored instructions can cause the computer system to perform various acts. Signals may be received from the one or more accelerometers and/or one or more gyroscopes. The state of the IMU may be estimated. If the IMU is in a zero velocity state, calibration value of biases for the one or more gyroscopes and/or calibration values of biases for the one or more accelerometers may be updated. If the IMU is not in a zero velocity state, the signal received from the IMU may be processed to measure one or more of specific force, acceleration, angular velocity, linear velocity, linear displacement, and pitch, roll, and heading of the IMU. Such system also can include an output module configured to output one or more measurements.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, the like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
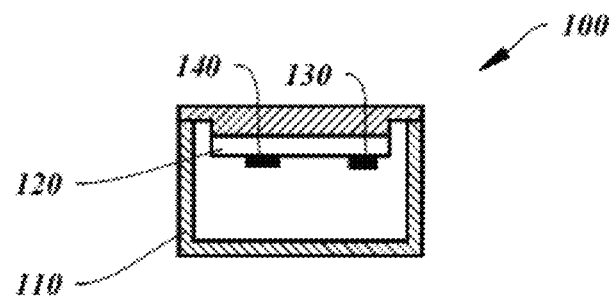
FIG. 1 illustrates a schematic of an encased inertial measurement unit in accordance with one implementation of the present invention.

Implementations of the present disclosure provide systems, methods, and apparatus that permit calibration of inertial measurement units (IMUs) as well as use in the tracking of intermittent motion. Although some implementations may both calibrate an IMU and use the calibrated IMU in tracking intermittent motion, other implementations may only calibrate an IMU or may track intermittent motion without using the calibration techniques described herein. Such systems may utilize calibrated microelectromechanical systems (MEMS) IMUs to obtain orientation and/or position related information (such as acceleration and angular velocity) of a stationary or moving body with an attached IMU. The system and methods also can process the acceleration and angular velocity to determine, for example, the linear velocity, orientation (i.e., pitch, roll, and heading), linear displacement, and, consequently, the position of the moving body. Hence, in at least one implementation, the IMU can be used to determine the position and/or orientation of an intermittently moving body.

The system can compensate for various errors in output from an IMU, some of which can be inherent to the IMU and can be present before and during the operation thereof. For example, the system can use calibration values to compensate for scale factor nonlinearity, anisotropic sensitivity, gyroscope specific force sensitivity, or other issues. In at least one implementation, the calibration values can be obtained using a nonlinear calibration model. Parameters within the calibration model can be populated with data obtained from simple manipulations of the IMU.

The IMU can be calibrated using a calibration fixture and a computer system functionally connected to the IMU. A computer system, as used herein, shall refer to any system or device capable of receiving, processing, and outputting electrical signals. A computer system can include one or more processors and one or more one or more physical non-transitory computer readable medium having computer executable instructions stored thereon connected to the processor(s). The computer readable medium can contain instructions that can be executed by the processor and cause the computer system to perform specified actions. In all instances described herein, the computer system is in electrical communication with (i.e. can be wired to and/or can be wirelessly connected to) the IMU 100.

In one or more embodiments, the IMU (or a case of the IMU) can be placed in contact with the support block and/or a surface of the calibration plate. The IMU can be displaced over known distances in a linear manner, and the outputs obtained from the IMU during such displacements can be used to populate the calibration model, in order to obtain calibration values. The calibration fixture can allow the IMU to be rotated through known angular displacements. Similarly, readings from the IMU during such rotations can be used to populate the calibration model and/or to obtain calibration values.

The system also can adjust and compensate for various errors incurred during the operation of the IMU. For example, the system may be used to obtain accurate acceleration, velocity, and position of the IMU and, thereby, of the movable body. For instance, the system may recognize noise and may filter at least a portion of the noise from the signal output by the IMU. Additionally or alternatively, the system can recognize still periods—i.e., periods of zero velocity—and use the signal obtained from the IMU during those periods to compensate for errors during the IMU's operation.

The system can be used in various applications and can track various types of intermitted motion. In at least one embodiment, the system can be used to track movement of a living being. For example, the system can track and/or monitor gait, walking patterns, and position of a person or person's body part. Additionally or alternatively, the system can track the movement of various manned and unmanned vehicles, which can be especially useful in the areas where alternative tracking is less effective or not available.

As illustrated in FIG. 1, an IMU 100 may include a case 110 and a computing system, such as a printed circuit board assembly (PCBA) 120. The PCBA 120 can incorporate one or more accelerometers 130 and/or one or more gyroscopes 140. The case 110 can have an approximately rectangular prismoid shape. For example, each side of the case 110 can be substantially perpendicular to every adjoining side of the case 110.

The PCBA 120, accelerometers 130, and/or gyroscopes 140 can have a fixed position with respect to the case 110 and/or the IMU 100. Furthermore, the case 110 and/or IMU 100 can have predetermined or known geometric and dimensional properties. Accordingly, the accelerometers 130 and gyroscopes 140 can have a fixed position with respect to the predetermined or known geometrical features and/or dimensions of the case 110 or IMU 100.

In some embodiments, the PCBA 120 may have three accelerometers 130, which can provide feedback related to acceleration along $x_a$, $y_a$, and/or $z_a$ accelerometer axes and can form an accelerometer triad. The term accelerometer or gyroscope "triad," as used herein shall refer to three accelerometers or gyroscopes, respectively, disposed substantially orthogonally with respect to each other within the IMU 100. In some implementations, the $x_a$, $y_a$, and $z_a$ axes can be approximately orthogonal to one another and can be aligned with one or more features of the PCBA 120.

Additionally or alternatively, the gyroscopes 140 can provide feedback related to angular velocity of the PCBA 120 with respect to one or more axes. For example, the PCBA 120 may have three gyroscopes 140, which can provide feedback related to angular velocity about $x_g$, $y_g$, and/or $z_g$ axes of the gyroscopes 140. Similar to the accelerometer triad, three gyroscopes 140 can form a gyroscope triad. In some instances, one or more of the accelerometer axes can coincide and/or can be "substantially" aligned with one or more gyroscope axes. The terms "substantially" and "approximately" as used in conjunction with alignment terms (including orthogonal alignment) take the practicalities of alignment in IMUs into consideration. These terms indicate that during alignment of these sensors, the general intent is to align the sensors within a reasonable degree of precision. Although near exactness in orthogonal alignment of IMUs may be possible, the cost of such precision may be unreasonable. Thus, "substantially" or "approximately" orthogonal includes a reasonable range of variation in alignment as one of skill in the art will appreciate.

Figure 2:
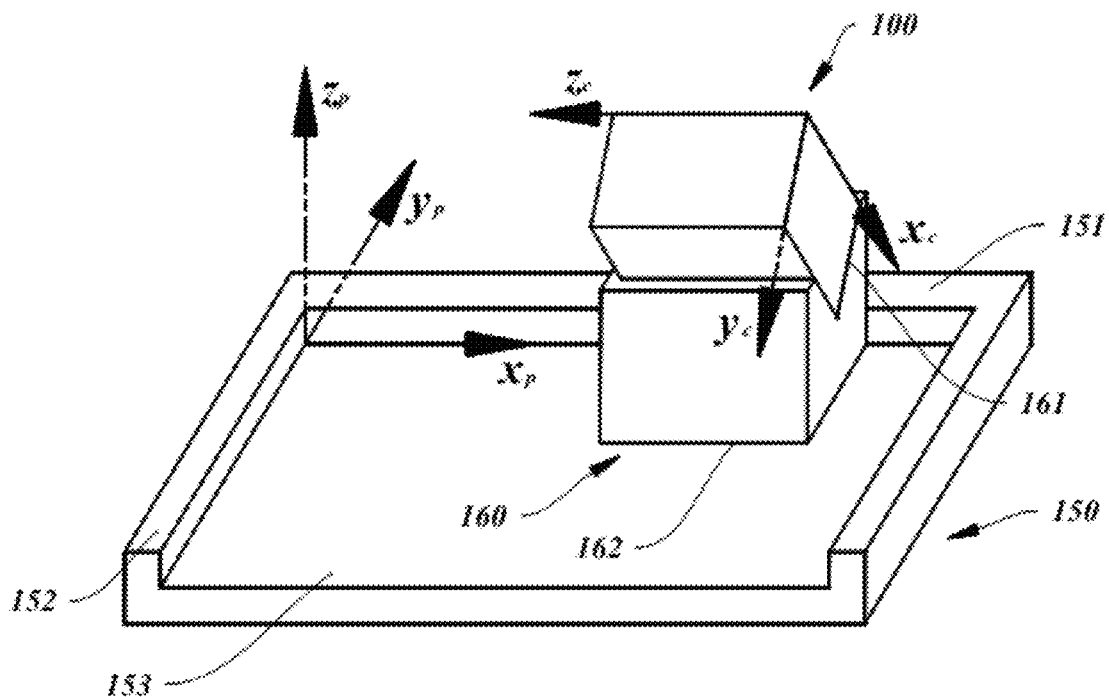
FIG. 2 illustrates a schematic of a calibration fixture setup in accordance with one implementation of the present invention.

As discussed above, the calibration fixture can be used for calibrating the IMU 100. In one or more implementations, the calibration fixture can include a calibration plate 150 and one or more support blocks 160. FIG. 2 illustrates the calibration plate 150 that can be used to calibrate the IMU 100. The calibration plate 150 may have a back rail 151 and/or one or more side rails 152, which can be used to limit the movement of the IMU 100. The calibration plate 150 also can have a support surface 153 that is substantially orthogonal to the back rail 151 and/or at least one side rails 152. In some implementations, the back rail 151 and at least one of the side rails 152 are disposed substantially orthogonally with respect to one another. Furthermore, the back rail 151 and/or side rails 152 can be substantially perpendicular to the support surface 153.

To obtain data that is necessary for calibration, the IMU 100 (which may include the case 110) can be placed on the support surface 153 of the calibration plate 150 and moved (manually or in an automated manner), such that the IMU 100 remains substantially flat and in contact with the support surface 153. Additionally, the IMU 100 can be moved substantially along the back rail 151 or one of the side rails 152, such that the IMU 100 remains in contact with the respective back rail 151 or side rail 152.

A caliper or other measuring device can be used to determine the distance that the IMU 100 traveled along the back rail 151 or side rails 152. Additionally or alternatively, the calibration plate 150 can incorporate stops at predetermined distances from the back rail 151 and/or side rails 152. For example, various slots, holes, or other features in the support surface 153 can be provided at predetermined distance from the side rails 152. Such holes can be configured to accept dowel pins or other limiting features, which can act as stops for the IMU 100. Hence, with the predetermined dimensions of the IMU 100 and the distance between the side rail 152 and the stop, a technician can obtain the total distance traveled by the IMU 100. Additionally or alternatively, the calibration fixture could be configured by attaching the IMU to a linear measurement or a rotational measurement system to directly measure the distance traveled or angle rotated.

In some implementations, one or more support blocks 160 can be used to obtain configuration data for the IMU 100. The support blocks 160 can have two or more surfaces 161 disposed at a predetermined angle with respect to a base 162. The case 110 of the IMU 100 can rest against one or more of the surfaces 161 to position the IMU 100 at a desired angle. For instance, the support block 160 can be a v-block with surfaces 161 disposed at 45° angles with respect to the base 162. Alternatively, the support block 160 can have surfaces 161 disposed at other angles with respect to the base 162. This can facilitate gathering of appropriate data for calibrating the IMU 100.

Hence, the IMU 100 can be rotated by positioning one or more sides of the IMU 100 against one or more surfaces 161 of the support block 160. Accordingly, the IMU 100 can be rotated through a known angular displacement or between known angular positions. Data obtained from the IMU 100 during the various movements can be used to populate the calibration model (described below), which can be used to obtain calibration values for the IMU 100.

In light of this disclosure, those skilled in the art should appreciate that the calibration fixture can have other configurations and/or features. For example the calibration fixture and/or calibration plate can incorporate a movable stage that has one or more linear and/or angular position sensors, such as linear and/or rotary encoders, which can provide accurate distance and/or angular displacement measurements. Furthermore, such sensors can send the distance measurements directly to the computer system, such that manual input of the information may not be required.

Similarly, a one-, two-, or three-axis stage or rotational fixture (e.g., a gimbal) can be used to rotate the IMU 100 in a three-dimensional space. Such stage can have frictionally restricted rotation, such that the stage with the secured IMU 100 cannot rotate absent an external force. Moreover, such stage can have position sensors that can accurately read the angular position (and/or change in angular position) of the stage and communicate this information to the computer system. Such stage also can be secured to another stage that can have freedom to move linearly along one or two axes. Moreover, such stage can have linear position sensors that can accurately read the linear position (and/or change in linear position) of the stage and communicate this information to the computer system.

Furthermore, other calibration fixtures should be appreciated by those skilled in the art. For example, generally, calibration fixtures with linear or rotary joints can reduce or eliminate the need to repeat observations due to errors in constraining the IMU or inadvertent impacts against the walls of the calibration plate. A linear joint with a displacement transducer also can reduce the time required to take those measurements. If desired, a three-axis gimbal mounted on a linear axis would allow the calibration to be completely automated. This also can allow the number of IMU orientations used during the calibration to be increased. Various combinations of linear and/or angular calibration fixtures with or without incorporated sensors can be implemented. Additionally or alternatively, various combinations of translations and/or rotations can be used to obtain calibration data.

In one or more implementations, the calibration model can use a reference frame (i.e., a coordinate system) defined by the IMU 100 (which may include the case 110). A computer system utilizing a calibration model (described below) can receive various signals during the calibration process, populate the calibration model, and calculate calibration values, which can compensate for various inherent imperfections of the IMU 100. Additionally, such a system (and the calibration model) can also compensate for misalignment of individual inertial sensors relative to the reference frame of the IMU 100.

For instance, the IMU 100 (which includes the case 110) can have three or more sides that can define the $x_c$, $y_c$, $z_c$ axes of a reference frame of the case 110 (case frame), as illustrated in FIG. 2. Alternatively, the case frame can be defined at any desired location with respect to known feature(s) of the case 110. The calibration model can incorporate alignment equations that can account and compensate for misalignment between the axes of the accelerometers 130 or the accelerometer triad and the case frame.

Figure 3:
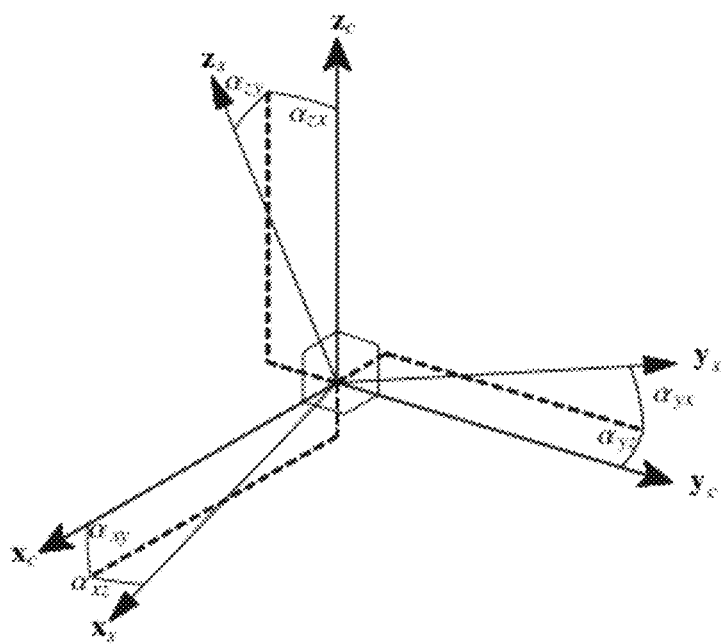
FIG. 3 illustrates example case and sensor reference frame relationships in accordance with one implementation of the present invention.

Similarly, the alignment equations can account and/or compensate for misalignment between the axes of the gyroscopes 140 or the gyroscope triad of the IMU 100 and the case frame. Accordingly, the calibration model can compensate for misalignment of axes with two alignment angles per sensor, which can be a total of six angles per triad, as shown in FIG. 3. The term "sensor," as used herein, refers to the accelerometers, accelerometer triad, gyroscopes, and/or gyroscope triad of the IMU 100, where either distinction is immaterial or the statement is equally applicable to all. Because in some embodiments the alignment equations of the calibration model can be the same for both sensors, accelerator triad, and gyroscope triad, the sensor axes can be generally denoted as $x_s$, $y_s$, and $z_s$. The alignment angles can be denoted as $\alpha_{ij}$, where i represents a sensor axis that can be aligned with respective axis of the case frame, and j represents an axis of the case frame about which the sensor axis i can be rotated in order to align with the respective axis of the case 110.

Accordingly, knowledge of both triads' orientation relative to a fixed reference is obtained and a common approach for calibrating the misalignment can be used for both triads. Using the angles and axes defined above as well as in FIG. 3, the nonorthogonal transformation from the sensor reference frame to the reference frame of the case 110, $^cN_s$, can be obtained with Equation (1) as follows:

$$^cN_s = [^cx_s \ ^cy_s \ ^cz_s] \quad (1)$$

The $^ci_s$ terms in the Equation (1) are sensor axes i expressed in the reference frame of the case 110. As used herein, a left superscript denotes the reference frame in which a vector is expressed—e.g., superscript "c," denotes the reference frame of the case 110 and superscripts "s," "a," "g," and "p" denote respective reference frames of the sensor (where applicable to both accelerometers or gyroscopes), accelerometers 130, gyroscopes 140, and calibration plate 150. Components $^cx_s$, $^cy_s$, $^cz_s$, of the Equations (1) can be found as follows:

$$^cx_s = R_z(\alpha_{xz})R_y(\alpha_{xy})\ ^sx_s = \begin{bmatrix} \cos\alpha_{xy}\cos\alpha_{xz} \\ \cos\alpha_{xy}\sin\alpha_{xz} \\ -\sin\alpha_{xy} \end{bmatrix}, \quad (2a)$$

$$^cy_s = R_x(\alpha_{yx})R_z(\alpha_{yz})\ ^sy_s = \begin{bmatrix} -\sin\alpha_{yz} \\ \cos\alpha_{yx}\cos\alpha_{yz} \\ \cos\alpha_{yz}\sin\alpha_{yx} \end{bmatrix}, \text{and} \quad (2b)$$

$$^cz_s = R_y(\alpha_{zy})R_x(\alpha_{zx})\ ^sz_s = \begin{bmatrix} \cos\alpha_{zx}\cos\alpha_{zy} \\ -\sin\alpha_{zx} \\ \cos\alpha_{zx}\sin\alpha_{zy} \end{bmatrix} \quad (2c)$$

The $R_i(\theta)$ terms in the Equations (2a), (2b), and (2c) are the rotation matrices that can correspond to rotation about i axis by angle $\theta$. It should be noted that $\theta$ does not have to be a small misalignment angle. Accordingly, the individual sensor axes can have arbitrary orientations relative to the case frame.

As discussed above, in addition to misalignment between the reference frames of the accelerometer triad (and gyroscope triad 135) and the case 110, as well as misalignment between the axes of the accelerometers 130 and gyroscope 140, the IMU 100 can have various internal imperfections, which can result in output errors. For instance, output of the accelerometers 130 can be subject to bias, anisotropic sensitivities and scale factor nonlinearities, which can lead to various errors in the accelerometer 130 readings. The calibration model can account for the above imperfections. For instance, voltage output of the accelerometers 130 can be modeled as follows:

$$E_a(^cf) = K_{Ea}\ ^aN_c\ ^cf + A_{Ea}\ ^cf_{ij} + S_{Ea}\ ^cf_{ii} + b_{Ea} \quad (3a)$$

$$^cf_{ij} = [f_x f_y\ f_x f_z\ f_y f_z]^T \quad (3b)$$

$$^cf_{ii} = [f_x^2\ f_y^2\ f_z^2]^T \quad (3c)$$

Terms of the Equations (3a), (3b), and (3c) are defined as follows: $E_a$ can be a 3×1 vector, corresponding to output voltages from the accelerometer triad; $^cf$ can represent the specific force vector in the reference frame of the case 110; $K_{Ea}$ is a diagonal matrix that can provide linear scale factors; $^aN_c = (^cN_a)^{-1}$ can be the inverse of the nonorthogonal transformation matrix, defined in the Equation (1); $A_{Ea}$ can be a 3×3 matrix of anisotropic sensitivities; $^cf_{ij}$ can provide the products of components of the specific force vector $^cf$; $S_{Ea}$ can be a 3×3 matrix of sensitivities to the squared specific forces $^cf$; $^cf_{ii}$ can be a vector of the specific force $^cf$ components squared; and $b_{Ea}$ can be a 3×1 vector of biases. Equations (3a), (3b), and (3c) can provide a model for how the sensor can be expected to respond to an applied specific force vector.

In at least one implementation, Equation (3a) can be transformed by assuming existence of an analogous relationship between the roles of $E_a$ and $^cf$, that if reversed, is adequate to allow the applied specific force to be predicted using the output voltages from the accelerometer triad. Hence, Equation (4) can be defined as follows:

$$^cf(E_a) = K_a\ ^cN_a E_a + A_a E_{a,ij} + S_a E_{a,ii} + b_a. \quad (4)$$

Terms $E_{a,ij}$, $E_{a,ii}$, and coefficient matrices, can be defined analogously to the representations used in the Equations (3a), (3b), and (3c), and can have appropriate units to obtain an output dimensioned in units of acceleration.

The product of the scale factor and the nonorthogonal transformation matrix can be collapsed as follows:

$$^cT_a = K_a\ ^cN_a = [k_{a,x}\ ^cx_a\ k_{a,y}\ ^cy_a\ k_{a,z}\ ^cz_a]. \quad (5)$$

Equation (5) can represent a 3×3 matrix, which can have nine elements. Hence, three scale factors and six misalignment angles can be obtained from the Equation (5), using definitions of the Equation (2) and the fact that the reference frame of the case 110 is defined in unit vectors. Together with other coefficient matrices as well as bias vector in Equation (4), a total of 30 parameters per accelerometer triad and 10 parameters per axis of each of the accelerometers 130 can be defined.

As discussed above, the calibration model also can incorporate parameters that can account for various errors and/or imperfections from the gyroscopes 140 of the IMU 100. For example, major influences on the outputs of the gyroscopes 140 can be compensated using Equation (6), as follows:

$$E_g({}^c\omega, {}^cf) = K_g{}^g N_c{}^c\omega + A_{Eg}{}^c\omega_{ij} + S_{Eg}{}^c\omega_{ii} + \ldots \ldots$$
$$F_{Eg}{}^cf + A_{Eg,f}{}^cf_{ij} + S_{Eg,f}{}^cf_{ii} + b_{Eg}. \quad (6)$$

The term $E_g$, in the Equation (6), can be a 3×1 vector of voltage outputs of the gyroscopes 140; the term $F_{Eg}$ can be a 3×3 matrix of linear acceleration sensitivities; ${}^c\omega$ can define an angular rate in the reference frame of the case 110. The remaining terms (not defined in this paragraph) can be analogous to the terms defined in connection with the Equations (3a), (3b), and (3c). Accordingly, Equation (6) can account and compensate for bias, misalignments, scale factor nonlinearity, nonlinear acceleration sensitivity, and anisotropic sensitivity to angular rate, which can be present in the uncompensated outputs of the gyroscopes 140.

In at least one embodiment, an approach similar to the transformation of the Equation (3a) can be taken with respect to the Equation (6), by assuming that the output voltage and angular velocity can be substituted one for another. Hence, Equation (6) can be rewritten as follows:

$$^c\omega(E_g, {}^cf) = K_g{}^g N_c E_g + A_g E_{g,ij} + S_g E_{g,ii} + \ldots \ldots F_g{}^cf +$$
$$A_{g,f}{}^cf_{ij} + S_{g,f}{}^cf_{ii} + b_g. \quad (7)$$

Furthermore, the product of the scale factor and nonorthogonal transformation matrix in Equation (7) can be collapsed, similar to the Equation (4), as follows:

$$^cT_g = K_g{}^g N_c = [k_{g,1}{}^c x_g \ k_{g,2}{}^c y_g \ k_{g,3}{}^c z_g]. \quad (8)$$

Consequently, given the above Equations (6)-(8), the calibration model can include 57 unknown parameters per gyroscope triad and 19 unknown parameters per axis of gyroscopes 140. Additionally or alternatively, fewer terms can be used in the above equations or additional terms can be included, such as temperature sensitivity. The same applies to the model employed for the accelerometers presented in Equations (3)-(5).

Using the calibration fixture that allows the IMU 100 to be placed in known orientations, as described above, the IMU 100 can be calibrated without knowing the orientation of a reference frame relative to the local gravity vector. While in different orientations, the IMU 100 can be subjected to pure linear motions with known displacements as well as rotations of known angles about an axis. In some embodiments, the direction of the axis of rotation can be fixed while allowing its location to change. Data collected during such various motions as well as from static measurements can be aggregated to form a regressor matrix and an output vector, used to calculate calibration values using least-squares regression.

As discussed above, the reference frame of the calibration plate 150 can be defined by $x_p$, $y_p$, and $z_p$ and can be aligned with the back rail 151 and support surface 153 of the calibration plate 150, as illustrated in FIG. 2. As used herein, the terms "plate frame" and "case frame" refer to the $x_p$, $y_p$, $z_p$ and $x_c$, $y_c$, $z_c$ reference frames of the calibration plate 150 and the case 100, respectively. In some embodiments, geometry of the case 110 as well as the geometry and angles of the support block 160 can be used to form a rotation matrix relating the plate frame and the case frame.

In one or more implementations, the calibration model can include equations relating output of the accelerometers 130, the gravity vector, and the kinematic acceleration, which can be expressed in the case frame as:

$$^cR_p{}^Pg + {}^cf(E_a(t)) = {}^cR_p{}^P\ddot{r}_c(t) \quad (9)$$

The terms of Equation (9) can be defined as follows: $\ddot{r}_c$ can be the second time derivative of the position of the case frame; g can be the gravity vector, $f(E_a)$ can be the specific force output of the accelerometers as calculated using Equation (4); and $^cR_p$ can be a rotation matrix relating the plate frame to the case frame. It should be noted that using the gravitational vector $^Pg$ as an unknown parameter offers at least the following benefits: (1) the calibration plate 150 does not need to be leveled precisely; (2) knowledge of the local value of the gravitational acceleration may not be required for the calibration model; and (3) the calibration model remains linear.

Static measurements of the IMU 100 can be taken by securing the IMU 100 in a predetermined or known orientation on the calibration plate 150 or in the support block 160 (positioned on or secured to the calibration plate 150). As the kinematic acceleration can be zero during static measurements, the Equation (9) can be stated as follows in this case:

$$^cR_p{}^Pg + {}^cf(E_a) = 0_{3\times1}. \quad (10)$$

Substitution of the terms from the Equations (4) and (5) can give:

$$^cR_p{}^Pg + {}^cT_a E_a + A_a E_{a,ij} + S_a E_{a,ii} + b_a = 0_{3\times1}. \quad (11)$$

Hence, a 33×1 vector of the unknown parameters can be defined as:

$$\phi_a = [{}^Pg^T \ \mathcal{L}_r({}^cT_a) \ \mathcal{L}_r(A_a) \ \mathcal{L}_r(S_a) b_a^T]^T. \quad (12)$$

An operator $\mathcal{L}_r(\cdot)$ linearizes a 3×3 matrix by rows as:

$$\mathcal{L}_r(M_{3\times3}) = [M_{r1} \ M_{r2} \ M_{r3}] \quad (13)$$

The term $M_{ri}$ can define an $i^{th}$ row of M. An operator $\mathcal{D}_3(\cdot)$ can operate on 3×1 vectors, and can be defined to create three transposed copies in a diagonal format, as follows:

$$D_3(v_{3\times1}) = \begin{bmatrix} v^T & 0_{1\times3} & 0_{1\times3} \\ 0_{1\times3} & v^T & 0_{1\times3} \\ 0_{1\times3} & 0_{1\times3} & v^T \end{bmatrix}. \quad (14)$$

Subsequently, using Equations (12) and (14), Equation (11) can be expressed as:

$$M_{a,stc}\phi_a = 0_{3\times1} \quad (15a)$$

$$M_{a,stc} = [{}^cR_p \ \mathcal{D}_3(\bar{E}_a) \ \mathcal{D}_3(\bar{E}_{a,ij}) \ \mathcal{D}_3(\bar{E}_{a,ii}) \ I_{3\times3}]. \quad (15b)$$

Terms of the Equations (15a) and (15b) can be defined as follows: $M_{a,stc}$ can be a 3×30 measurement matrix; a dash above a term ("¯"), can denote the average value of such term; $I_{3\times3}$ can be a 3×3 identity matrix. The output vector can be a 3×1 zero vector. Accordingly, voltage readings from the IMU 100 can be sampled over a finite period, while the IMU 100 is stationary in the desired orientation, and then averaged (to minimize the effect of output noise for such measurements), or otherwise filtered, as one of skill in the art will appreciate.

In addition to static measurements, linear displacement measurements of the IMU 100 can be made in order to populate the unknown parameters in the calibration model. Hence, in some embodiments, the IMU 100 (whether independently or together with the support block 160, when secured thereto) can be linearly translated a known distance, without rotations, such that $^cR_p$ can be a constant. Accordingly, kinematic acceleration can be a non-zero value for the linear measurements, and the geometrical constraints of the calibration plate 150 (and support block 160, when the IMU 100 is secured to the support block 160) can be purely along the $x_p$ axis of the plate frame, as illustrated in FIG. 2.

The case frame velocity can be defined as $v_c = \dot{r}_c$, and integrating the right-hand side of the Equation (9), once with respect to time over the duration of the motion, can give:

$$\int_{t_0}^{t_f} {}^cR_p \frac{dv_c}{dt} dt = {}^cR_p \int_{v_{c,0}}^{v_{c,f}} dv_c = {}^cR_p(v_{c,f} - v_{c,0}) = 0_{3\times 1} \quad (16)$$

Terms $t_0$ and $t_f$ can represent time at the beginning and at the end of the linear movement of the IMU 100; similarly, terms $v_{c,0}$ and $v_{c,f}$ can represent the initial velocity and the final of the case frame. It should be noted that the velocity vectors $v_c$, $v_{c,0}$, and $v_{c,f}$ are expressed in the plate frame, although superscripts "c" are omitted for clarity. Since IMU 100 starts and stops in static positions, $v_{c,0} = v_{c,f} = 0_{3\times 1}$.

Accordingly, integrating the left-hand side of the Equation (9) with respect to time produces:

$$\int_{t_0}^{t_f}[{}^cR_p{}^Pg + {}^cf(E_a)]dt = {}^cR_p{}^Pg(t_f-t_0) + {}^cT_a\int_{t_0}^{t_f} E_a dt + \ldots$$
$$A_a\int_{t_0}^{t_f}E_{a,ij}dt + S_a\int_{t_0}^{t_f}E_{a,ii}dt + b_a(t_f-t_0). \quad (17)$$

Because the integrals remaining in the Equation (17) are definite integrals, the mean value theorem can be applied. The mean value theorem can be expressed as:

$$\int_a^b h(t)dt = \overline{h(t)}|_a^b \quad (18)$$

The right side of the Equation (18) can denote the average value of h(t) over the interval [a, b]. Accordingly, Equation (17) can be transformed as follows:

$${}^cR_p{}^Pg\Delta t + {}^cT_a\overline{E}_a\Delta t + A_a\overline{E}_{a,ij}\Delta t + S_a\overline{E}_{a,ii}\Delta t + b_a\Delta t \quad (19a)$$

$$\Delta t = t_f - t_0. \quad (19b)$$

Since Equation (19a) can be equal to the Equation (16), which represents a zero velocity vector, the $\Delta t$ factors can be divided out. Subsequently, recombining and rearranging the resulting equation in the vector $\phi_a$, can result in the same expression as was identified for the static measurements—i.e., Equation (15). Accordingly, three calibration equations represented by the Equation (15a)—namely, Equations (11), (12), and (14)—can be used for both static and linear measurements.

Further, Equation (9) can be integrated to an indefinite time t, and a second integration can produce an equation in terms of position. Hence, the first integral yields:

$$\int_{t_0}^{t} {}^cR_p \frac{dv_c}{dt} dt = {}^cR_p \int_{v_{c,0}}^{v_c(t)} dv_c' = {}^cR_p v_c(t). \quad (20)$$

Similar to the Equation (16), $v_c$ can be expressed in the plate frame. The second integration, over $t_0$ to $t_f$, produces:

$$\int_{t_0}^{t_f} {}^cR_p \frac{dr_c}{dt} dt = {}^cR_p \int_{r_{c0}}^{r_{c,f}} dr_c = {}^cR_p^p \Delta r_c \quad (21a)$$

$${}^P\Delta r_c = {}^Pr_{c,f} - {}^Pr_{c,0} \quad (21b)$$

As noted in the Equations (21a) and (21b), the displacement vector $\Delta r_c$ can be expressed in the plate frame (i.e., as $^P\Delta r_c$). As such, the displacement vector $\Delta r_c$ can be relatively simple to measure. For example, the vector $\Delta r_c$ can have the following form (with d being a signed displacement):

$$^P\Delta r_c = [d\ 0\ 0]^T \quad (22)$$

Further, integrating the left-hand side of the Equation (9), first from $t_0$ to t, and then from $t_0$ to $t_f$, and applying the mean value theorem (see Equation (18)) for the second integration, produces the following:

$${}^cR_p^p g\frac{\Delta t^2}{2} + {}^cT_a\overline{\int_t E_a}\Delta t + A_a\overline{\int_t E_{a,ij}}\Delta t + S_a\overline{\int_t E_{a,ii}}\Delta t + b_a\frac{\Delta t^2}{2} \quad (23)$$

Equation (23) employs the following shorthand notation:

$$\overline{\int_t h} = \operatorname*{mean}_{t=[t_0,t_f]}\left(\int_{t_0}^t h(\tau)d\tau\right) \quad (24)$$

The result of the Equation (23) is equal to the displacement vector rotated in the case frame for the Equation (21a). Accordingly, a set of three additional equations (similar to the Equations (11), (12), and (14), as described above) can be used for calibration.

In some embodiments, both sides of the above equations can be divided by $\Delta t^2/2$, which would scale the values to be equivalent to the constant acceleration that would result in the same amount of displacement in a given time period. Further, equating Equations (21a) and (32), applying the above scaling ($\Delta t^2/2$), and rearranging to group the unknowns into the vector $\phi_a$, can produce the following:

$$M_{a,lin}\phi_a = u_{a,lin} \quad (25a)$$

$$M_{a,lin} = \left[{}^cR_p\mathcal{D}_3\left(\frac{2}{\Delta t}\overline{\int_t E_a}\right)\mathcal{D}_3\left(\frac{2}{\Delta t}\overline{\int_t E_{a,ij}}\right)\mathcal{D}_3\left(\frac{2}{\Delta t}\overline{\int_t E_{a,ii}}\right)I_{3\times 3}\right] \quad (25b)$$

$$u_{a,lin} = \frac{2}{\Delta t^2}{}^cR_p^p\Delta r_c \quad (25c)$$

The term $M_{a,lin}$ can represent a 33×3 measurement matrix, and the term $u_{a,lin}$ can represent a 3×1 output vector.

In one or more implementations, the accelerometer triad can be calibrated before calibrating the gyroscopes 140 and/or the gyroscope triad. Thus, the accelerometer triad can be used to provide the specific force in the case frame, using Equation (4). The angular rate sensed by the gyroscopes during the calibration procedure can be expressed as:

$$^c\omega(E_g, {}^cf) = {}^cR_p({}^P\omega_{c/p} + {}^P\omega_{E/i}) \quad (26)$$

The term $^P\omega_{c/p}$ can represent the angular velocity of the case frame relative to the plate frame, and $^P\omega_{E/i}$ can represent the angular velocity of the Earth relative to an inertial frame.

Typical MEMS gyroscopes cannot accurately detect Earth's rotation rate. Consequently, in some implementations, the Earth's rotation can be neglected. Other implementations, however, provide for calibration parameters that include Earth's rotation. Since $^P\omega_{c/p}=0_{3\times1}$ for static and linear measurements, neglecting the Earth's rotation rate can reduce Equation (26) to:

$$^c\omega(E_g, ^cf)=0_{3\times1} \quad (27)$$

Additionally, a linearizing operator, defined in Equation (13), can be used to group the unknown coefficient from the Equations (7) and (8) into a single 57×1 vector, defined as:

$$\phi_g=[\mathcal{L}_r(^cT_g) \ \mathcal{L}_r(A_g) \ \mathcal{L}_r(S_g) \ \mathcal{L}_r(F_g) \cdots \mathcal{L}_r(A_{g,f}) \\ \mathcal{L}_r(S_{g,f}) \ b_g^T]^T. \quad (28)$$

Further, using the above definition and the $\mathcal{D}_3(\cdot)$, defined in Equation (14), Equation (27) can be expressed as:

$$M_{g,stc}\phi_g=0_{3\times1} \quad (29a)$$

$$M_g=[\mathcal{D}_3(E_g) \ \mathcal{D}_3(E_{g,ij}) \ \mathcal{D}_3(E_{g,ii}) \cdots \mathcal{D}_3(\mathcal{J}) \\ \mathcal{D}_3(\mathcal{J}_{ij}) \ \mathcal{D}_3(\mathcal{J}_{ii}) \ I_{3\times3}] \quad (29b)$$

The term $M_g$ can be a 3×57 measurement matrix; and the output vector can be a 3×1 zero vector.

In some embodiments, rotations of the case 110 (and consequently of the IMU 100) can be performed, while keeping the case 110 or the support block 160 (if used) in contact with the support surface 153. Accordingly, using predetermined or known geometries of the case 110, support plate 150, and support block 160 (as well as all of the surfaces and angles corresponding to the foregoing), rotations of known angles can be performed by starting and stopping with a given surface of the case 110 or the support block 160 against the back rail 151 or one of the side rails 152.

Because the rotation can be performed about an axis whose direction is fixed, the direction of the angular velocity vector $^P\omega_{c/p}$ can be fixed. Consequently, such rotation can be represented as follows:

$$^P\omega_{c/p}(t)=[0 \ 0 \ ^P\omega_z(t)]^T. \quad (30)$$

Integrating Equation (30) with respect to time provides:

$$\int_{t_0}^{t_f} {}^P\omega_{c/p}(t)dt=[0 \ 0 \ \theta_{zp}]^T. \quad (31)$$

The term $\theta_{zp}$ in the Equation (31) can represent the known rotation angle of the case frame relative to the plate frame about the $z_p$ axis, and $t_0$ and $t_f$ can represent the time at the beginning and at the end of the rotation, respectively.

During the rotation, the orientation of the case frame relative to the plate frame can be expressed as:

$$^cR_p(t)={}^cR_{c_0}(t){}^{c_0}R_p=R_{z_p}(\theta_{zp}(t)){}^{c_0}R_p \quad (32)$$

The term $^{c_0}R_p$ can represent the rotation from the plate frame to an initial orientation of the case frame, and the $^cR_{c_0}(t)=R_{z_p}(\theta_{zp}(t))$ can represent the rotation from the initial to an instantaneous orientation of the case frame, which can be a rotation about the $z_p$ axis.

Because $\omega_{c/p}$ can be parallel to the $z_p$ axis, the time-dependent portion of the rotation does not affect its components and the following can be true:

$$^c\omega_{c/p}(t)={}^{c_0}\omega_{c/p}(t)={}^{c_0}R_p{}^P\omega_{c/p}(t). \quad (33)$$

Neglecting the Earth's rotation rate, Equations (33) and (26) can be used to provide:

$$^c\omega(E_g, ^cf)={}^{c_0}R_p{}^P\omega_{c/p}(t). \quad (34)$$

It should be noted that the term $^{c_0}R_p$ can be constant. Hence, substituting the Equations (7) and (8), integrating both sides over $t_0$ to $t_f$, utilizing Equation (31), and applying the mean value theorem (see Equation (18)), produces:

$$^cT_gE_g\Delta t+A_gE_{g,ij}\Delta t+S_gE_{g,ii}\Delta t+F_g\mathcal{J}\Delta t+A_{g,f}\mathcal{J}_{i,j}\Delta t+\ldots \\ S_{g,f}\mathcal{J}_{i,i}\Delta t+b_g\Delta t={}^{c_0}R_p[0 \ 0 \ \theta_{zp}]^T \quad (35)$$

In the Equation (35), $\Delta t$ can represent the rotation time span defined identically to that of the Equation (19b).

Consequently, dividing both sides by $\Delta t$ can make the right-hand side equal to the average angular rate during the rotation. Accordingly, the left-hand side can be rewritten in terms of $\phi_g$, which provides:

$$M_g\phi_g=u_{g,rot} \quad (36a)$$

$$u_{g,rot}={}^{c_0}R_p\begin{bmatrix}0 & 0 & \frac{\theta_{zp}}{\Delta t}\end{bmatrix}^T. \quad (36b)$$

The term $M_g \phi_g$ can be identical to the static measurement matrix, defined by the Equation (29b), and the term $u_{g,rot}$ can be a 3×1 output vector.

Calibration values for both sensors (accelerometers 130 and gyroscopes 140) can be estimated using linear regression. For instance, given m observation, the measurement and output matrices from each observation can be stacked in a regressor matrix $\tilde{M}$ and a composite output vector $\tilde{u}$, to produce the following set of equations:

$$\tilde{M}\phi = \tilde{u} \quad (37a)$$

$$\text{where: } \tilde{M}=\begin{bmatrix}M^{[1]}\\ \vdots \\ M^{[m]}\end{bmatrix} \text{ and: } \tilde{u}=\begin{bmatrix}u^{[1]}\\ \vdots \\ u^{[m]}\end{bmatrix} \quad (37b)$$

In the Equations (37a) and (37b), $\phi$ can be either $\phi_a$ or $\phi_g$; $M^{[i]}$ can be the applicable measurement matrix for a measurement i; and $u^{[i]}$ can be a corresponding output vector. In some embodiments, a sufficient number of independent measurements must be taken, so that the rank of $\tilde{M}$ can equal the number of parameters being estimated.

Given an overdetermined system of equations, the estimate of a parameter vector can be obtained through a least-squares solution, such as:

$$\hat{\phi}=(\tilde{M}^T\tilde{M})^{-1}\tilde{M}^T\tilde{u} \quad (38)$$

In some implementations, a weighing matrix is not needed, because the measurement matrices and output vectors are defined with proper scaling, which can ensure consistency of units and error magnitudes.

For the accelerometers 130, Equations (15a) and (15b) apply to both static and linear measurements. For linear measurements, Equation (25) also can apply. Hence, each static measurement can contribute 3 rows to the stacked regressor matrix and each linear measurement can contributed 6 rows to the stacked regressor matrix. In some embodiments, a sufficient number of combined static and linear measurements can be taken to populate the entire regressor matrix.

Similar to the equations applicable to the accelerometers 130, static measurement Equations (29a) and (29b) and finite rotation Equations (36a) and (36b) can be used to populate the stacked regressor matrix for gyroscopes. The static and finite rotation measurements each contribute 3 rows to the regressor matrix. With 57 parameters in the regressor matrix, 19 measurements could populate the entire matrix. Accordingly, in some implementations, a combined 19 static and finite rotation measurements can be made to populate the regressor matrix.

Results of the calibration model can be evaluated using a singular value decomposition method. Accordingly, determining estimated parameters of the Equation (38) can involve division by the singular values of the regressor matrix. Hence, small singular values can indicate that the parameters can have high sensitivity to errors in the input data (i.e., the measurements from the sensors). Because the parameters of the sensor models can have widely varying magnitudes, the columns of the regressor matrix can be scaled before comparing the singular values. For example, each column can be scaled using the following:

$$\tilde{M}' = \tilde{M}H \quad (39a)$$

$$H = \text{diag}(h_1, h_2, \ldots, h_n) \quad (39b)$$

$$h_i = \begin{cases} \|\tilde{M}_{ci}\|^{-1} & \text{if } \|\tilde{M}_{ci}\| \neq 0 \\ 1 & \text{otherwise} \end{cases} \quad (39c)$$

The terms $M_{ci}$ can represent an $i^{th}$ column of the regressor matrix M; the term n can represent the number of columns; and the term H can be a diagonal matrix constructed with indicated values. After applying the scaling, the singular values of $\hat{M}'$ can be used to determine the condition number c with the following:

$$c = \frac{\mu_1}{\mu_n} \quad (40)$$

The term $\mu_1$ can be the largest singular value, and the term $\mu_n$ can be the smallest singular value.

A small condition number can indicate that observability of the parameters is balanced and that the parameters will have similar sensitivities to errors in the data. A large condition number can suggest that the set of measurements used in the regression does not provide enough information to estimate some of the parameters robustly. For a sample calibration problem, simulated and experimental results discussed below indicate that a well-chosen set of measurements can give condition numbers near or below 40 for the accelerometers 130 and 20 for the gyroscopes 140. In some embodiments, condition numbers approaching or greater than 100 can indicate a poorly conditioned $\tilde{M}$ regressor.

Residual error from aggregated calibration Equations (37a) and (37b) also can be used to assess accuracy of the calibration. In particular, due to noise and measurement error, the relationship defined in the Equations (37a) and (37b) may be not a true equality. Accordingly, after obtaining parameter estimates using Equation (38), the residual errors in the measurement equations can be:

$$e = \tilde{u} - \tilde{M}\hat{\phi}. \quad (41)$$

The elements of e can be expected to be normally distributed with zero mean. Accordingly, when that is not true, there may be a systematic error in the method of data collection. Outliers in e can be used to help identify and remove measurements that may have been performed incorrectly or inaccurately.

Since the observation equations can be formulated to provide meaningful error magnitudes with consistent units of acceleration and angular rate, the residual errors also can be used to provide an estimate of the variance in the calibrated sensor output using:

$$v^2 = \frac{e^T e}{n_r - n_c} \quad (42)$$

The terms $n_r$ and $n_c$ can represent the number of rows and columns in the regressor matrix $\tilde{M}$, respectively.

Additionally or alternatively, an estimate of the parameter covariance matrix $C_{100}$ can be obtained using:

$$C_{100} = v^2 (\tilde{M}^T \tilde{M})^{-1} \quad (43)$$

Details regarding the derivation of this relationship can be found in J. P. Norton, An Introduction to Identification, Academic Press, London, 1986, the entire content of which is incorporated by reference herein. The elements on the diagonal of $C_{100}$ can be variances of individual parameter estimates and can relate to an amount of uncertainty in their calibrated values. The estimated standard deviation for parameter i is:

$$\sigma_i = \sqrt{C_{\phi,(i,i)}} \quad (44)$$

It is important to note that some of the parameters in the calibration model may be omitted or may be inapplicable, depending on the type and accuracy-grade of the sensors (i.e., accelerometers 130 and gyroscopes 140) intended for calibration. In light of this disclosure, applicability of the parameters of the calibration model can be assessed by attempting to calibrate all of the parameters and reviewing their variance and impact on the residual errors. A high standard deviation of a parameter relative to its magnitude would suggest that there is little confidence in the calibrated value. Accordingly, such parameter can be eliminated by setting its value to zero and removing the corresponding column from the regressor matrix. Additionally or alternatively, residual error in the calibration model with and without the parameter can be compared to decide if such parameter should be retained.

Figure 4:
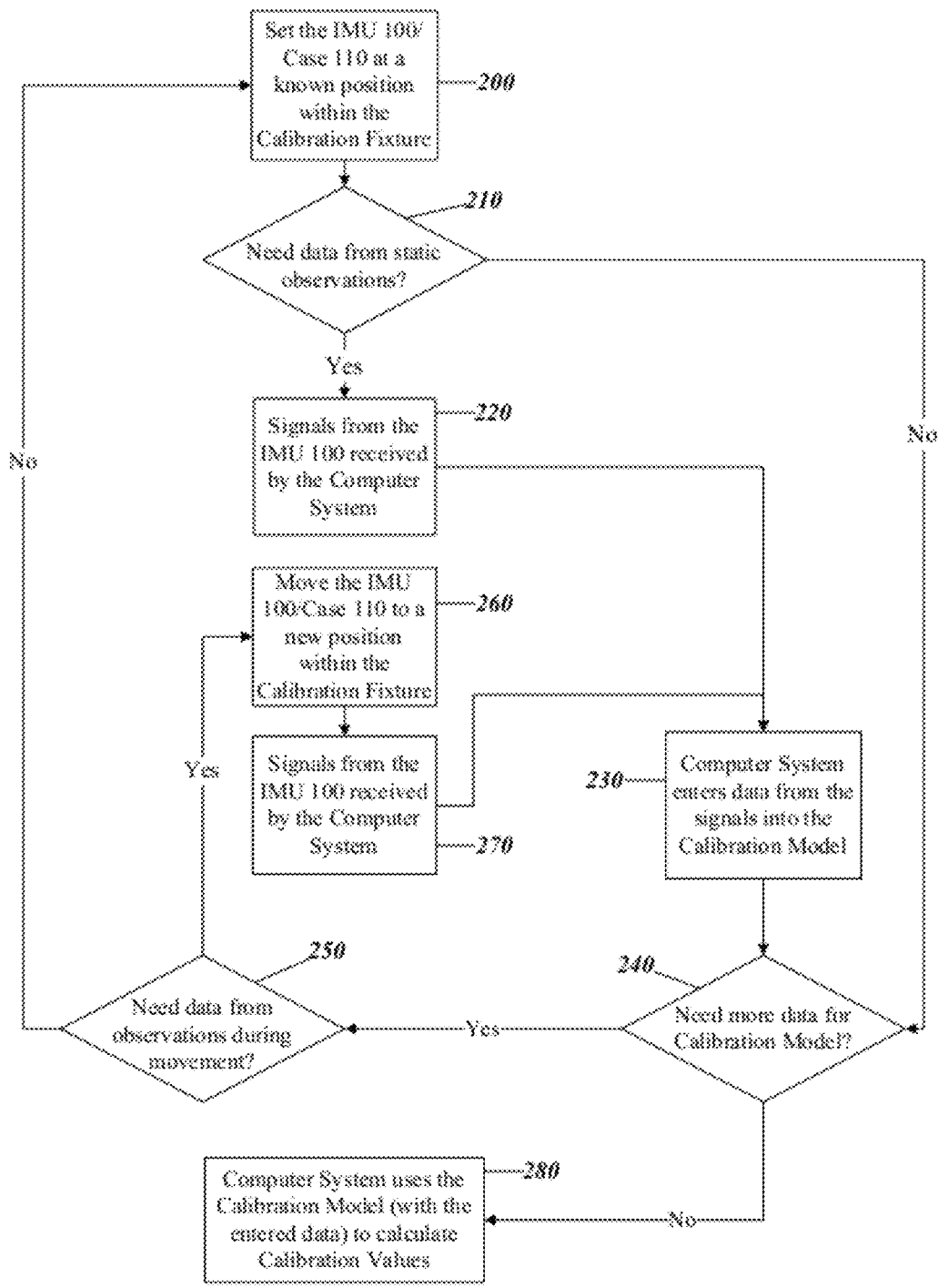
FIG. 4 illustrates a flow chart of procedures in a calibration process in accordance with one implementation of the present invention.

Accordingly, a calibration system, which can include the calibration fixture and the computer system (utilizing the calibration model), as described above, can be used to calibrate various parameters of the IMU 100. In particular, as illustrated in FIG. 4, the calibration system can have a step 200, in which the IMU 100 (or case 110) can be set at a known position within the calibration fixture. Subsequently, if data from static observations is needed or desired (step 210), in a step 220, a signal can be sent to the computer system, while the IMU 100 is stationary, and in a step 230 the data from the signal can be stored by the computer system within the calibration model. If additional data for the calibration model is required or desired, the process can be repeated (step 240).

Additionally, data can be obtained during dynamic observations, while the IMU 100 is moved (steps 240, 250). For instance, the IMU 100 can be moved through a known displacement to a new position (step 260). In a step 270, observations of the signal from the IMU 100 during the transition to and/or rest at the new position can be received by the computer system and stored within the calibration model (step 230). If additional data is needed or desired (whether from static or dynamic observations), the process described above can be repeated (step 240). Any two positions of the IMU 100 can be linearly and/or angularly separated one from another (i.e., the IMU 100 can be moved linearly, can be rotated, and/or can have a compound linear and rotational movement between the two positions).

Thus, observations of the signal from the IMU 100 at any position can be static observations as well as dynamic observations, when the IMU 100 is moved between two positions. Moreover, as noted above, in any of the positions, the IMU 100 can have any linear and/or angular orientation or location with respect to or within the calibration fixture. Hence, movements between positions are not limited to linear movements and can be linear, angular, or compound movements, as described above.

Observation of such movements between the two positions can be repeated at several different speeds and over different distances to obtain data for the calibration model. In addition, data for the calibration model also can be obtained during multiple static observations, consisting of only one position for each observation. Such data can be obtained at various positions (e.g., various orientations) of the IMU 100, for example, by placing the IMU in different orientations within a calibration fixture. This process can be repeated until a sufficient amount of data is received by the computer system (determined in the step 240) and populated within the calibration model, such that the computer system can calculate sufficiently accurate calibration values for the IMU 100 (step 280).

An output from the IMU 100 can include multiple components that relate to the acceleration of the IMU 100 (measured by the accelerometers 130) and/or angular velocity of the IMU 100 (measured by the gyroscopes 130). A computer system can be used to process the outputs from the IMU 100 (e.g., by integrating the outputs) to obtain velocity, displacement, and angle of rotation of the IMU 100. Hence, the IMU 100 can be secured to a moving object to measure acceleration, velocity, position, and orientation of such a moving object. In at least one instance, the IMU 100 can be first calibrated, for example, by using the calibration process and system described above. Alternatively, the IMU 100 can be secured to a moving object without prior calibration.

Figure 5:
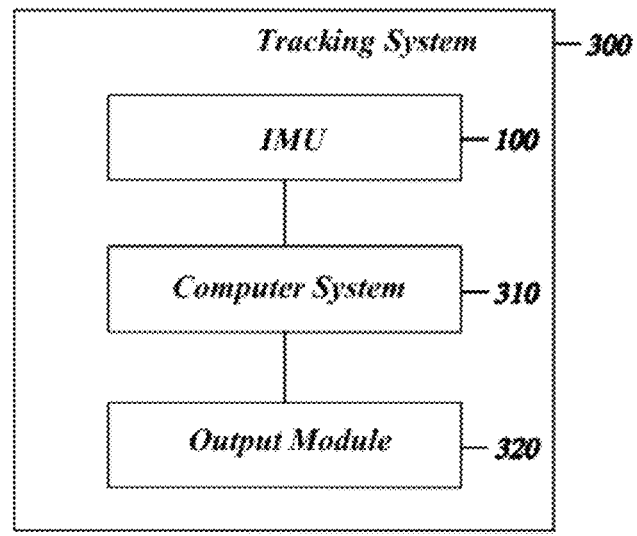
FIG. 5 illustrates a schematic of a tracking system in accordance with one implementation of the present invention.

Furthermore, as illustrated in FIG. 5, a tracking system 300 can include a computer system 310 that can monitor the IMU 100 and can receive and process signals from the IMU 100. The computer system also can provide a processed output via an output module 320.

Certain parameters related to a signal received from the IMU 100 can be updated while the IMU 100 is in operation. Such updates can occur while the IMU 100 is stopped. The terms "stopped," "motionless," "stationary," "zero velocity," and "still" periods are used interchangeably herein and refer to a state of zero velocity. Hence, if the moving object performs intermittent motion, certain parameters of the IMU 100 can be updated during the still periods, which can improve the accuracy of the readings obtained from the IMU 100. For instance, various output errors can contribute to position and/or velocity error, such as calibration errors, parameter drift, output noise, and other limitations (inherent or otherwise) in the accuracy of the sensor's output as well as imperfect gravity cancelation due to errors in the orientation estimate derived from the gyroscopes 140.

If the IMU 100 is known not to be moving (or substantially still), it can be possible to compensate for certain errors and/or prevent error accumulation. Accordingly, estimating the state of the IMU 100 (i.e., whether in motion or stationary) can be critical to accurately compensating for the errors during operation. An exemplar state estimation method and system are described in the U.S. patent application Ser. No. 12/467,881, entitled "State Estimator for Rejecting Noise and Tracking and Updating Bias in Inertial Sensors and Associated Methods," filed on May 18, 2009, the entire content of which is incorporated by reference herein. The method and system described in the above application allows for automatic identification of periods where acceleration and angular rate readings are sufficiently close to zero to not be accurately measured by the sensors. Typically, such periods can correspond to the period when the IMU 100 is still.

Figure 6:
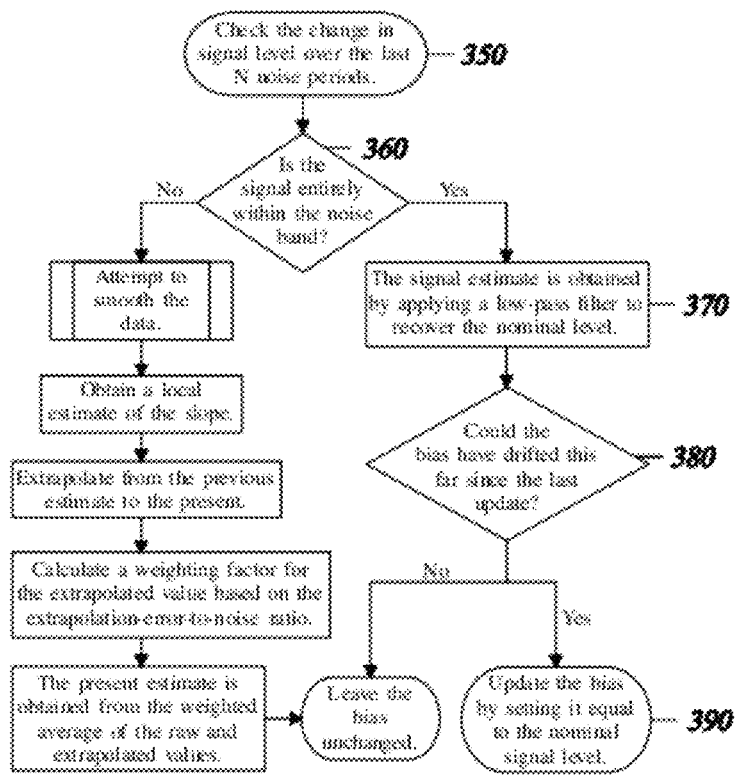
FIG. 6 illustrates a flow chart of procedures for estimating state and updating bias of a sensor in accordance with one implementation of the present invention.

As illustrated in the flowchart in FIG. 6, similar to the U.S. patent application Ser. No. 12/467,881, still periods can be recognized using the noise, bias, bias drift parameters of the sensors, or combinations thereof. In particular, as illustrated in FIG. 6, a state estimation and/or bias tracking modules can include the computer system, which can receive one or more signals from the IMU 100 (e.g., signals from the accelerometers 130 and/or signals from the gyroscopes 140). Such a computer system can be directed (by a software program or hard coding) to continuously (i.e., every predefined period of time) check for change in signal level over last N noise periods (step 350).

The computer system can check whether the signal from at least one of the sensors is entirely within the noise band (step 360). If the signal is within the noise band, the computer system can create a signal estimate by applying a low-pass filter (step 370). Additionally or alternatively, the computer system can check whether the bias could have drifted to the filtered value based on properties of the sensor output (e.g, such as a maximum drift rate and drift amount (step 380)). If, for example, the filtered value of the signal is within the possible range where bias could have drifted, the sensors' respective biases can be updated (step 390).

Hence, such a process can be used to determine whether a sensor is in a still period by analyzing the sensor's raw or compensated output. For instance, sensor outputs can be compensated using calibration values (derived from the calibration model) described above. Importantly, the systems and process described above are not application-specific and do not rely on references external to the IMU 100. Consequently, the systems can be implemented in any appropriate environment without reliance on the particulars of the application where the IMU 100 is used; instead, only the output signals of the IMU 100 are used to compensate for the various errors that can arise prior to and during the operation.

In some instances, the gyroscopes 140 can have significant specific-force sensitivity. Accordingly, monitoring of the outputs from such gyroscopes can be performed in the domain of angular rate outputs from the calibration model, after applying the calibration values to compensate for the specific-force dependency. Hence, the algorithm described in the U.S. patent application Ser. No. 12/467,881 can be adjusted to accept modified, calibrated outputs from the gyroscopes instead of raw outputs.

In some instances, it may be practically impossible to differentiate between orientation errors and drift in the accelerometer outputs without any external source of information. Hence, in some embodiments, the magnitude of the specific force output (from the accelerometer triad) can be monitored, to ensure that the specific force scalar is within a corresponding noise band. Additionally or alternatively, individual outputs from each axis of the accelerometers 130 can be checked to ensure that each output is within its peak-to-peak noise limits for a sufficient amount of time to obtain accurate filtered values.

Figure 7:
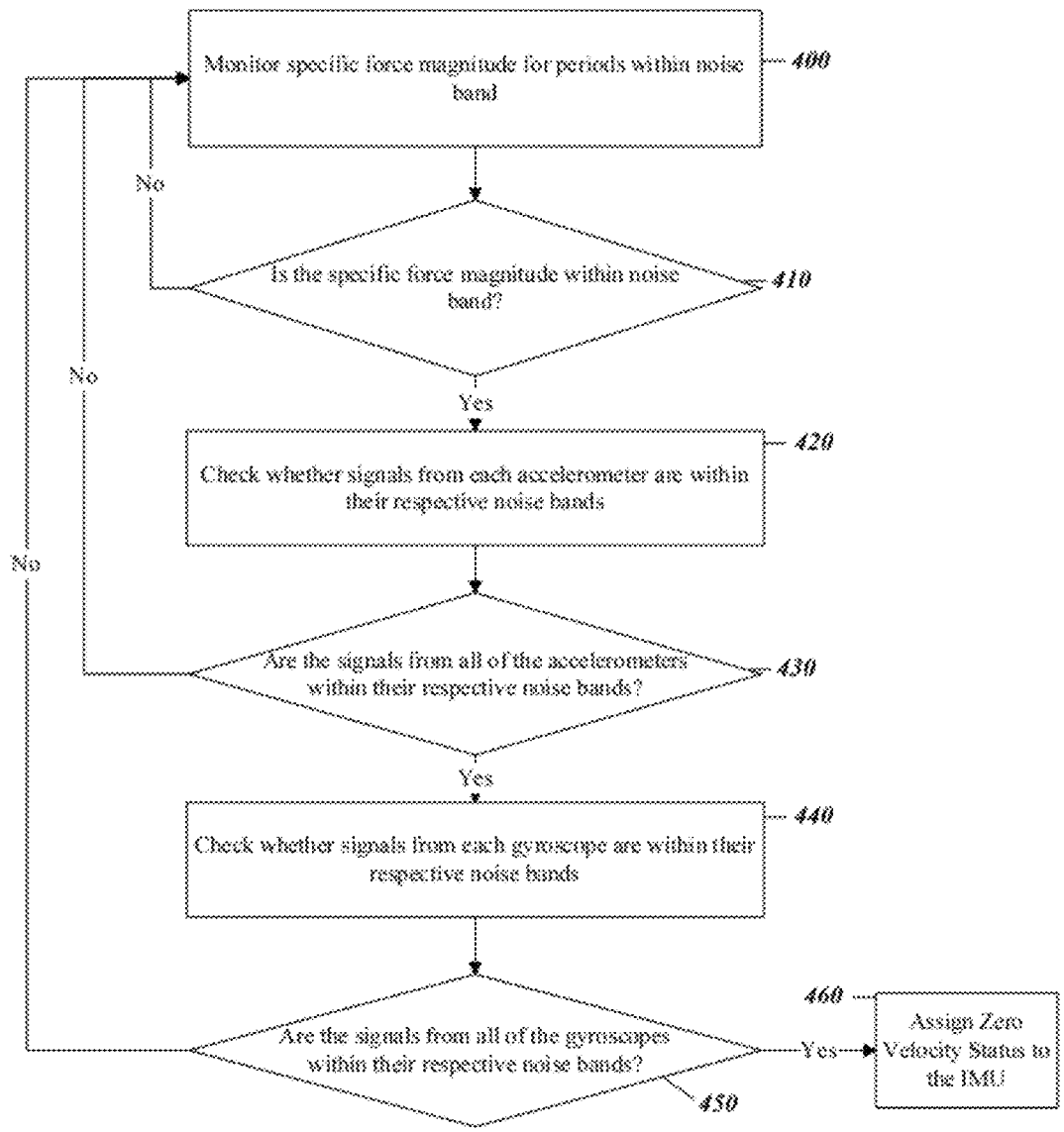
FIG. 7 illustrates a flow chart of procedures for estimating state and updating bias of a multi-sensor inertial measurement unit in accordance with one implementation of the present invention.

In one or more implementations, the IMU 100 can have a plurality of accelerometers 130 forming the accelerometer triad and a plurality of gyroscopes 140 forming a gyroscope triad. As illustrated in FIG. 7, the computer system can monitor the specific force magnitude (measured by the accelerometer triad) for periods that are within its noise band (step 400). If the specific force is within the previouslyidentified noise band therefor (step 410), the computer system can check whether the output(s) from one or more axes of the accelerometers 130 are within their respective noise bands (step 420). Additionally or alternatively, the computer system can check output(s) from one or more axes of the gyroscopes 140 (step 440). In some instance, the computer system can check whether the gyroscopes 140 are within their respective noise bands only when all of the accelerometers 130 are within their respective noise bands (step 430).

If any of the above-described outputs are within their respective noise bands (step 450), the computer system can assign a status of zero velocity to the IMU 100 (step 460). Subsequently, the bias of the sensors comprising the IMU 100 can be updated. Alternatively, additional reliability can be obtained by verifying that all of the outputs of the various sensors are within their respective noise bands. Consequently, for systems and processes that require or desire most reliable results, the computer system can be directed to ensure that all of the sensor outputs are within their respective noise bands and when all output signals are within their respective noise bands, assign zero velocity status to and/or update the bias of the sensors comprising the IMU 100.

In one or more implementations, one or more of the sensors comprising the IMU 100 of the tracking system can have a bias drift, which can affect the accuracy of the readings received by the computer system. Hence, the tracking system can incorporate the state estimation and/or bias tracking modules, which can lead to more accurate measurements of movement of the IMU 100. In some instances, the state estimation and/or bias tracking modules can account for bias drift of multiple accelerometers 130 and gyroscopes 140 of the IMU 100. Accordingly, the bias tracking module can account and/or compensate for bias drift along three axes of acceleration and/or rotation of the IMU 100.

Figure 8:
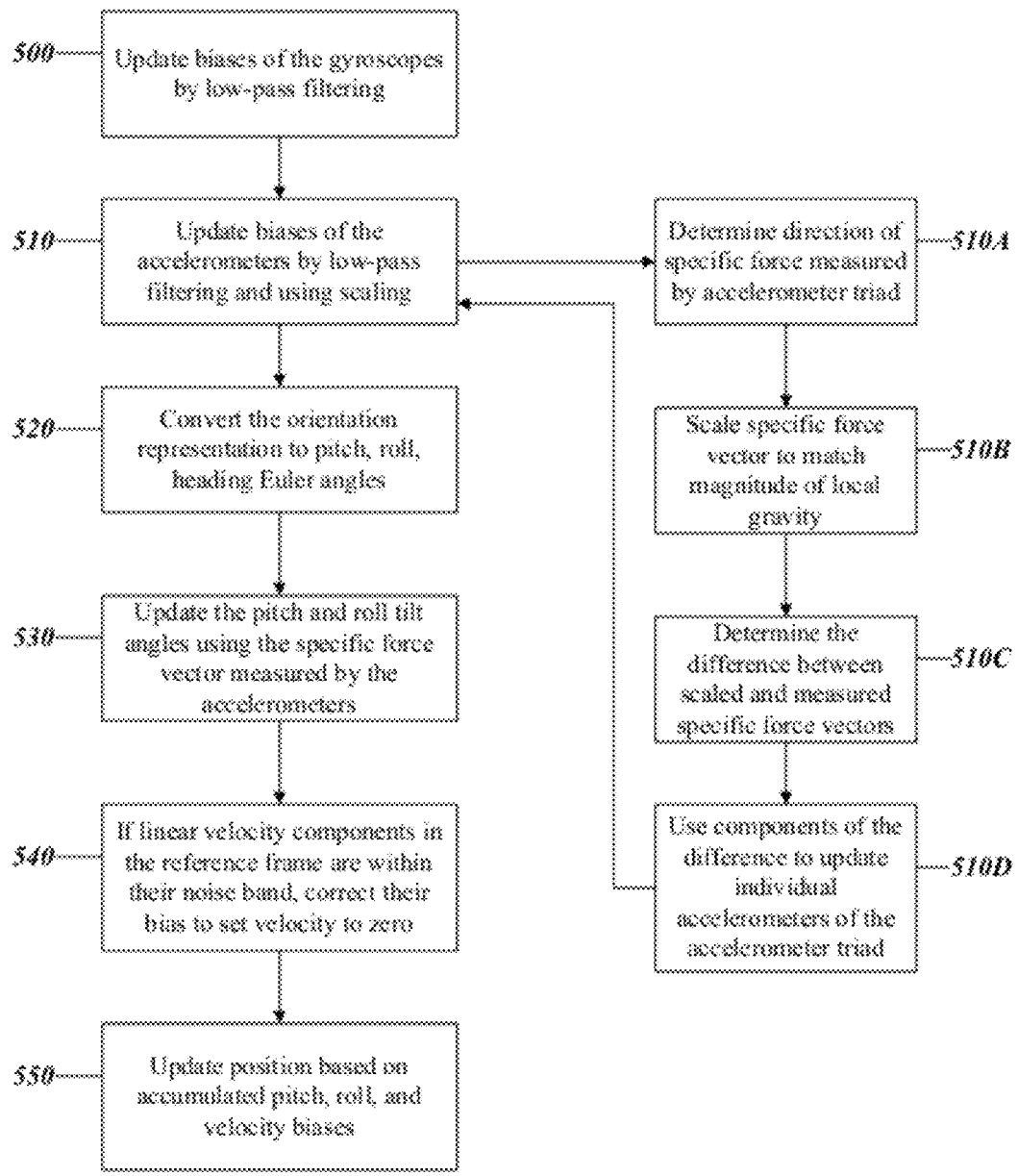
FIG. 8 illustrates a flow chart of procedures for updating biases of an inertial measurement unit that has one or more accelerometers and one or more gyroscopes in accordance with one implementation of the present invention.

In particular, the bias tracking module can update biases of the gyroscopes 140 during the still periods of the operation of the IMU 100. Similarly, the state estimation and bias tracking modules can update biases of the accelerometers of the IMU 100 during the still periods of the operation of the IMU 100. In some embodiments, as illustrated in FIG. 8, the state estimation and/or bias tracking modules can update the biases of the gyroscopes by low-pass filtering the output from each gyroscope 140 to be updated during the states of zero velocity (step 500). Similarly, the state estimation and/or bias tracking modules can update biases of the accelerometers 130 by low-pass filtering the outputs of each accelerometer 130 to be updated during the still period (step 510). Additionally or alternatively, the state estimation and/or bias tracking modules can update the bias of the accelerometers 130 to be updated by updating the output of the accelerometer triad such that the specific force measured by the accelerometer triad approximates (or matches) the magnitude of the local gravity vector (steps 510A through 510D).

For example, an update can be made by first ascertaining the direction of the measured specific force vector (step 510A). Subsequently, the specific force vector can be scaled to approximate (or match) the magnitude of gravity (step 510B). Then, the difference between the scaled and the sensed specific force vectors can be calculated (step 510C), and the components of the difference can be used to update the bias for the individual axes of the accelerometer triad (step 510D).

The computer system also can convert the orientation representation to pitch, roll, and heading Euler angles (step 520). Furthermore, the pitch and roll angles of the IMU 100 can be updated using the tilt angles of the specific force detected by the accelerometers 130 (step 530).

Additionally or alternatively, the computer system can check if linear velocity components in the reference frame of the IMU 100 are within their noise bands. If the velocity components are within their noise bands, their respective biases can be updated by setting such velocity component's value to zero (step 540). In some embodiments, updating of the various bias values can continue through the duration of the still period by averaging or otherwise filtering the data available since the beginning of the period.

Furthermore, the computer system can update calculated position of the IMU 100. Such update can be based on one or more of the accumulated pitch, roll, and velocity biases (step 550). Additionally, the computer system can be instructed to set a limit on the amount of data history that can be used for averaging. It should be noted that updating biases of the sensors, as described above, can completely halt accumulation of orientation error as well as halt the accumulation of velocity and position error due to either orientation error or accelerometer measurement errors. Thus, more accurate data is provided during future periods of motion.

As described in U.S. patent application Ser. No. 12/467,881, different methods of applying bias updates can be used. For instance, bias updates can be discrete and non-interpolated, which would require minimal processing and could be readily executed in real-time. For discrete updates, the final value of the updated bias can be held constant until a subsequent update, which can result in discrete jumps in the bias value.

Alternatively or in addition, bias estimates can be interpolated between updates to further reduce motion tracking errors, which can accumulate during periods of motion. For example, biases of the gyroscopes 140 can be interpolated over the last motion period to obtain an improved estimate of changes in the orientation. Moreover, the pitch and roll angles can be corrected using interpolation of errors developed during the motion period (and ascertained during still periods) to further refine the orientation estimates. Subsequently, the updated orientation can be used to resolve the specific force measurements into the reference frame. After adjusting sensor bias based on the magnitude of gravity (see description above), the acceleration biases also can be interpolated to obtain an improved velocity estimate. Similarly, the velocity bias can be interpolated, and an improved velocity estimate can be integrated to obtain improved position estimates.

The computer system can terminate bias updates if a signal exits its noise band. Furthermore, after terminating the updating of various biases, the computer system can resume calculating the motion of the IMU 100, as described above. Hence, in some embodiments, a single system can estimate the state of the IMU 100 (i.e., stopped or moving), track the bias of the various sensors of the IMU 100, and calculate the acceleration, linear velocity, angular velocity, linear displacement, and/or orientation of the IMU 100. Accordingly, in some embodiments, a single system can track movement of the IMU 100 in a three dimensional space.

Additionally or alternatively, depending on the type of motion, the tracking system can ignore readings from certain sensors, which can increase the processing speed and facilitate more accurate calculation and/or processing of the data. For instance, the computer system can monitor all of the sensors over a predetermined period of time to determine whether certain sensors are largely inactive. As such, the computer system can assume that the motion of the IMU 100 is in the direction(s) of the active sensors. Consequently, the computer system can omit the inactive sensors from future calculations. For example, based on sensor inactivity, the computer system may determine that the IMU 100 has been generally (or predominantly) moving only in the x and z directions and can omit the sensor detecting in the y-direction.

Hence, the computer system may rely only on the active sensor to determine whether the IMU 100 is in a zero velocity period. The computer system also can periodically check whether the inactive sensors have become active (i.e., the direction(s) of the motion has/have changed). To verify that the inactive sensors can still provide accurate information in the event they become active, the computer system can continue to update the biases of the inactive sensors during still periods.

As described above, the IMU 100 can be used in the tracking system (which can incorporate the state estimation and/or bias tracking modules) to obtain information about movement of the IMU 100. Such information can be more accurate for intermittent motion rather than continuous movement. Moreover, frequency of intermissions or still periods and accurate detection thereof can further influence the accuracy of the linear velocity and positional information obtained from the IMU 100.

In one or more implementations, the IMU 100 can be used to track human motion. In fact, the small weight and size of a MEMS IMU 100 can facilitate such use. Accordingly, the tracking system can have various applications, including in the healthcare and entertainment industries. For example the tracking system can be used to track movement of a person's legs or feet, which can be analyzed and corrected to be consistent with a common human gait. An example below further describes how the tracking system can be used to track human motion.

As described above, the accuracy of the tracking system, in part, can be related to or dependent on to the accuracy of the state estimation and/or bias tracking modules. The above-described system and process provide an improved tracking system. Additionally or alternatively, the tracking system and/or the state estimation and/or bias tracking modules can incorporate additional sensors or devices that can further help to estimate the state of the IMU 100.

For instance, a pressure sensor can be used in connection with tracking human motion. Such pressure sensor can detect when a person's foot touches the ground. Moreover, the computer system can monitor the pressure sensor to determine when the foot (and consequently the IMU 100) is in a still period. In at least one implementation, the computer system can consider the period over which the pressure sensor reports the greatest pressure to be a still period. During such period, the computer system also can check whether the outputs of the IMU 100 are within their respective noise bands and/or can update the various biases, as described above. An example of such a system is described in the U.S. Pat. No. 7,921,716, entitled "Method and System for Measuring Energy Expenditure and Foot Incline in Individuals," which is hereby incorporated by reference in its entirety.

The following examples describe embodiments of the present invention. Although these examples are described based on the systems and methods used as the experiments were performed, the descriptions of the examples are not meant to be limiting in any way. Rather, the following embodiments may be altered in light of the entire disclosure. For example, where a method (such as an algorithm) provides multiple acts or steps, more and/or fewer acts or steps may be contemplated. In another example, where a method (such as an algorithm) provides multiple acts or steps in a particular order, reorganization of any of the acts or steps may be contemplated.

Implementation Example and Test Data—IMU Calibration

The models of the sensor output voltages as a function of applied specific force and/or angular rate, as described above, were used to simulate an accelerometer and gyroscope (also known as "gyro") triad. The parameters were chosen based on the nominal values for the 400°/s gyros and the accelerometers used in the IMU, further described below. To test the efficacy of the calibration method with varying parameter values, the simulated model parameters were randomly selected from the ranges described below.

Errors in the voltage bias were chosen to be ±0.05-5% of their nominal values. Linear scale factors were chosen to have a maximum deviation of ±5% from their nominal values. Misalignment angles between the sensor and case axes were chosen between ±1-5°. Elements of the anisotropic and squared dependency matrices were chosen such that the impact of each would be between ±0.5-2.5% of the full-scale linear output. Elements of the gyro's linear, anisotropic, and squared specific force dependency matrices were also given influences between ±0.5-2.5% of the full-scale linear output. The tilt angles of the calibration plate relative to the gravity vector were chosen between ±0.1-10°.

Minimum magnitudes were enforced to ensure all of the parameters' effects would be meaningful. By doing this, if large uncertainties for the parameter estimates were reported, there appeared to be no ambiguity as to whether this was a result of their insignificance or an inadequate set of observations being used in the calibration equations. Since each element of the anisotropic and squared dependency matrices was chosen individually and required to have a minimum impact of ±0.5% of full-scale, their cumulative effect creates a model with significantly more nonlinearity than is expected for even consumer-grade MEMS inertial sensors. While unrealistic, this tested the calibration method's ability to estimate all of the model terms.

The sensor outputs for the observations used in the calibration procedure were simulated as discrete-time signals at the same sampling rates used in the experiments described below. Gaussian noise with variance matching that of the outputs from the real sensors was added to the simulated outputs. The simulated tilt angles of the calibration plate were used to obtain the gravity vector in the plate frame. For static observations, this was the only input since Earth's rotation rate was neglected given the accuracy of the gyros tested in this study.

For the linear motion observations, a sinusoidal acceleration profile was used with appropriate duration and magnitude to cause the desired displacement in a prescribed length of time. This modeled the accelerometer outputs observed in experimental trials very well. The angular rate during the linear motions was modeled as being zero, as in the ideal case, since the experimental results showed no significant response from the gyros for properly executed linear motions.

The finite rotations required both angular rates and accelerations to be simulated since only the direction of the rotation axis was assumed constant. Experimental data showed significant angular rate variation since the motions were performed manually. Rather than approximating these variations, the simulations used a half-sinusoid as the angular rate profile with the amplitude and period set to preserve the intended rotation angle and duration. The duration appeared to be the most critical factor given that the data reduction techniques use time-averaged sensor outputs rather than instantaneous values. In the experimental data, the accelerations observed during the rotations included sinusoids caused by changes in the centripetal acceleration as the angular rate varied. The simulated accelerations for the rotations were modeled as sinusoids of similar frequency and magnitude.

The maximum accelerations and angular rates for the simulations were determined using the minimum durations in which the linear and rotation motions could be executed accurately in the experiments. Preliminary trials showed that these were approximately 0.3 s for the linear motions and 0.6 s for the rotations. Given the sinusoidal profiles used to generate the simulated data, these resulted in peak accelerations and angular velocities of approximately 1.1 g and 300°/s, respectively. These appeared to agree well with the experimental data. While it was possible to move the IMU faster during the experiments, this made it difficult to maintain the correct orientation of the IMU. Therefore, these limits were adopted as it was deemed preferable to have more accurate data than a wider dynamic range.

For the simulated linear motions, the displacements were determined given the maximum travel, allowed by the geometry of the hardware. The angular displacements for the rotation observations were fixed at 90° in both the simulations and experiments as trying to execute larger rotations while securing the IMU in a support block proved awkward.

Preliminary simulations showed that the regressor's condition number was negatively impacted by large bias values in the sensor models. A similar effect was also observed when using wide time windows that included static data before and after the period of motion in the linear and rotation observations. This appears to be because both factors increase the bias's contribution to the time-averaged and integrated voltage outputs relative to the contribution from the specific force and angular rate inputs.

This problem can be illustrated by decomposing the total voltage output from the sensor, $E_{tot}$, into a constant component due to bias, $E_b$, and a time- and orientation-dependent component, $E_{f,\omega}$, due to the specific force and, for the gyros, angular rate inputs according to: $E_{tot}(t)=E_{f,\omega}(t)+E_b$. For the sensor biases:

$$\lim_{E_b \to \infty} E_{tot}(t) = \lim_{E_b \to \infty} E_{f,\omega}(t) + E_b = E_b,$$

meaning that as the bias voltages become very large, the effect of $E_{f,\omega}$ becomes insignificant in the sensor output. This results in poor observability of the motion-related model parameters. Because of this, in both the simulations and experiments, the voltage readings used to calibrate and apply the model were: $E_s=E_{raw}(t)-E_{b,nom}$, where $E_{raw}$ is the raw voltage output and $E_{b,nom}$ are the nominal bias values from the sensor datasheets. This eliminates enough of the bias to avoid observability problems.

As mentioned above, proper cropping of the time period for linear and rotation observations also appear to be important to improve parameter observability. Including stationary data before and after the motion does not appear to affect the validity of the calibration equations. However, the longer the included stationary periods become, the more the sensor bias levels contribute to the averaged and integrated values derived from that observation. Therefore, accurately cropping the data to the period of motion increases the relative influence of the actual motion on the corresponding rows of the regressor matrix and improves its condition number.

Experiments showed that it was easy to manually crop the data to within about 0.05-0.1 s of the best estimate of the start and end of the motion obtained through careful inspection. Therefore, for the simulations, random amounts of static data in this time range were added at the beginning and end of linear and rotation observations. This level of accuracy in cropping the data was found to provide good observability.

Simulations were used to assess the sensitivity of the calibration results to orientation errors of the case frame relative to the plate frame. Random orientation errors were simulated to represent the combination of errors that are likely to occur from small geometric errors in the hardware used to implement the technique along with errors that can occur while manually constraining the IMU's orientation. These errors were simulated by rotating the case frame from its intended orientation about an axis whose direction was chosen at random from a uniform distribution on the unit sphere. The angle of rotation was also selected randomly from a uniform distribution with a specified maximum magnitude and randomly selected sign. The resulting perturbed orientation was used to generate the simulated data for the observation. Note that additional sources of experimental error are identified and discussed below.

Given the large number of parameters to be calibrated in the sensor models, it is important to select a sufficiently large and rich set of observations to provide robust parameter estimates. Assessing whether or not this has been accomplished for a given set of observations is discussed above.

The inputs that determine the sensor outputs in the adopted models are the specific force and angular velocity vectors along with their anisotropic products and squared components. These can all be grouped together into a composite input vector:

$$\psi=[{}^cf^T \; {}^cf_{ij}^T \; {}^cf_{ii}^T \; {}^c\omega^T \; {}^c\omega_{ij}^T \; {}^c\omega_{ii}^T]^T$$

where the terms follow the definitions used in the calibration model above. A well-conditioned regressor matrix will result from choosing a set of observations that comprehensively spans the available space of $\psi$.

Furthermore, the number of observations required can be reduced by maximizing their linear independence. By defining the direction of gravity in the plate frame along with target accelerations and angular rates for the motions, the vector $\psi$ can be defined for each observation. Specifically, for linear motions, the angular velocity is zero and the average acceleration during the first half of the motion can be used as the acceleration vector to combine with gravity to obtain the specific force. For rotation motions, the average angular velocity can be used and gravity can be used alone as the specific force vector since there is no intended acceleration during the rotations. These simplifications provide $\psi$ vectors that adequately represent the information provided by the observations.

Given this set of $\psi$ vectors, they can be stacked as:

$$\Psi=[\psi^{[1]} \; \psi^{[2]} \; \ldots \; \psi^{[m]}]^T$$

where $\psi^{[i]}$ is the vector for observation i and m is the number of observations in consideration. The linear independence of the observations represented by the rows of $\Psi$ can then be assessed using their dot product after applying two normalizations:

(1) The columns of $\Psi$ are normalized to have unit length giving $\tilde{\Psi}$. This compensates for the different magnitudes and units of the terms in $\psi$ and balances their relative contributions in the dot products.

(2) The rows of $\Psi'$ are then normalized to have unit length. The magnitude of the dot products of the rows then depends only on their direction and not their length.

Denoting the result of these steps as $\Psi'''$, the smaller the magnitude of the dot product between two rows of $\Psi'''$, the more linearly independent they are. While this is based on the input vectors, they provide a good representation of the rows those observations will contribute to the regressor matrix. This leads to Algorithm 1 for optimizing the order of a set of candidate observations to maximize the improvement in parameter observability with each successive observation.

---

Algorithm 1 Optimize selection and ordering of observations

---

1: Initialize $\Psi$ using the list of candidate observations, C
2: Normalize the columns then rows of $\Psi$ to produce $\Psi'''$
3: Initialize the list of observations used, U, as the first observation in C or a predetermined list
4: Initialize a list of remaining observations as: R = C \ U
5: while length (R) > 0 and length (U) < maxToKeep do
6:   for i = 1 to length (R) do
7:     for j = 1 to length (U) do
8:       $D(j) \leftarrow |\Psi_{row\ R(i)}''' \cdot \Psi_{row\ U(j)}'''|$
9:     end for
10:     $M(i) \leftarrow \max(D)$
11:   end for
12:   if min(M) is unique then
13:     $i_{min}$ = index (min M) // This observation in R is the least parallel to, or most linearly independent from, any observation in U.
14:   else // There is a tie to resolve.
15:     $T \leftarrow \{t\ |\ M(t) = \min(M)\}$
16:     $i_{min}$ = random element from T
17:   end if
18:   $U \leftarrow U \cup R(i_{min})$
19:   $R \leftarrow R \setminus R(i_{min})$
20: end while
21: return U

---

An improvement for Algorithm 1 is to use a more sophisticated method of dealing with ties in the else clause beginning on line 14. Rather than picking a random observation from the list of ties, the second largest magnitudes of their dot products can be compared followed by the third largest, and so on, until a unique minimum is found. This approach is not shown in the pseudo code for the algorithm to avoid distracting from its main goal and because, in practice, the performance improvement from this refinement was found to be very small.

The first step in applying Algorithm 1 is to define a list of candidate observations. The geometry of the IMU's case and available support blocks determine the possible case frame orientations. Each orientation can provide a single static observation along with linear and rotation observations at different speeds. These speeds should be selected appropriately given the dynamic range of the sensors and the method of generating the motions. Practical limitations when moving the IMU by hand are discussed above. Given these limitations, four target accelerations for the linear motions were considered: 0.1 g, 0.25 g, 0.5 g, and 1 g. These span the available range and were found to provide sufficient variation to give good observability.

For the gyros, a generic set of target angular rates were defined as fractions of the dynamic range of each triad. After optimizing the set of generic observations, the target speeds were then replicated and scaled to the correct range for each triad. For the support blocks used in the experiments, simulations showed that the fractions $\frac{1}{3}$, $\frac{2}{3}$, $3\sqrt{\frac{2}{4}}$, and $3\sqrt{\frac{3}{4}}$ of the gyros' dynamic ranges were sufficient to ensure good parameter observability. The third and fourth values are greater than 1 and allow higher angular rates when the IMU is in the support blocks and none of the sensor axes are directly aligned with the rotation axis.

Combinations of the above target speeds and case frame orientations that would cause any sensor axis to saturate were excluded from the candidate observations. The sensor models use the outputs from all three of the triad's axes to determine each component of the output vector. If any of the axes is saturated, the observation must be discarded since the saturated values do not correctly represent the triad's response to the input.

Even for these relatively short lists of target speeds, taking all the valid combinations of positive and negative motions with the list of orientations creates a set of observations much larger than necessary or practical. Therefore, simulations were used to determine a sufficient number to ensure good observability for all model parameters. This process is simplified by noting that the parameters in the accelerometer model are essentially a subset of those in the gyro model. Thus, it can be assumed that ensuring the gyros are calibrated robustly will also provide good results for the accelerometers. Note that while the gyros could be calibrated without any linear motions, they provide a greater range of specific force inputs and improve the regressor's condition number significantly. Hence, they are included in the set of observations used to calibrate both types of sensors.

To determine an appropriate set of observations, the complete list was first used to calibrate the simulated accelerometer and gyro models. The regressor condition number and the estimated standard deviation of the model output from these results were calculated and used as the standard of comparison for the results obtained using subsets of the available observations. Since static observations can be executed faster and more accurately than linear and rotation observations, the following method was used to determine how many of each type of motion should be included:

(1) All of the static and rotation observations were retained and specified as the initial set of observations to use in Algorithm 1, which was used to optimize the order of the linear motions. Monte Carlo simulations were then used to plot the calibration quality metrics discussed above versus the number of linear motions used in the gyro calibration. These results were used to determine the number of linear motions needed to ensure good gyro calibration results.

(2) Using the chosen set of linear motions and still retaining all of the static observations, the order of the finite rotation observations was optimized and the simulations were repeated to assess how many should be retained.

(3) The ordering of the static observations was optimized and the same analysis was used to determine the number that should be retained.

(4) Given the number of static, linear, and rotation observations selected to ensure good gyro calibration results, simulations were then used to verify the assumption that this set of observations would also provide good calibration results for the accelerometers.

The results of this method are shown below along with examples of the results for the calibrated parameters.

The system of fixtures used during the calibration, described below, provides a total of 120 different case frame orientations. Given the four linear acceleration targets considered and the possibility of applying them in the positive or negative direction, this gives 960 potential linear motion observations. A total of 196 possible rotation observations were considered after eliminating those that differ from other observations only in their initial rotation about the normal to the calibration plate's surface.

Figure 9:
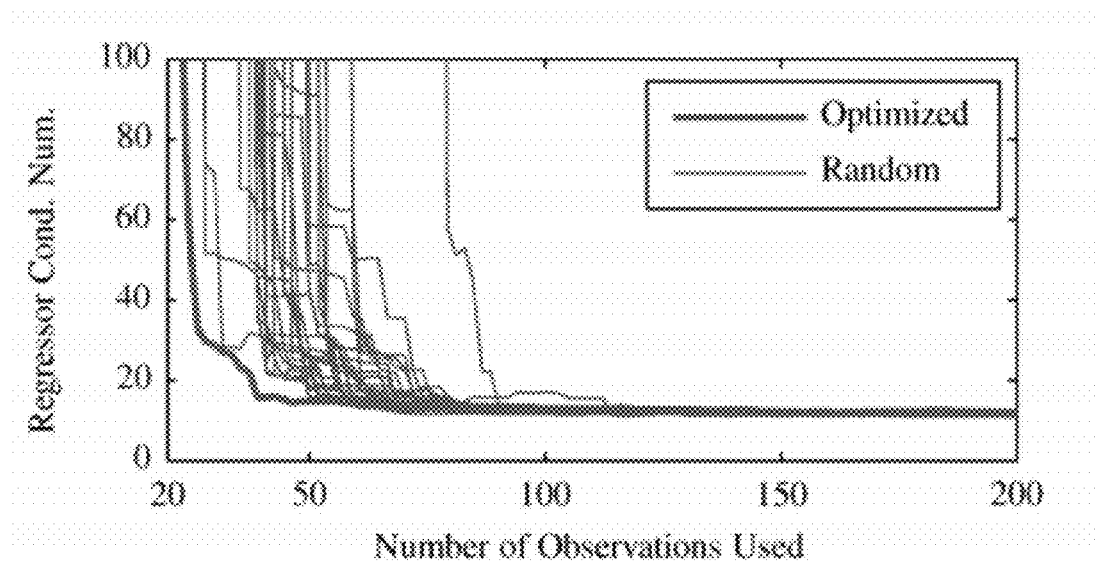
FIG. 9 illustrates a graph that shows the evolution of a condition number for a gyroscope calibration's regressor matrix in accordance with one implementation of the present invention.

To test the effectiveness of Algorithm 1, the complete list of potential observations was used to calibrate first a simulated accelerometer triad and then a simulated gyro triad. FIG. 9 shows the evolution of the condition number for the gyro calibration's regressor matrix as an increasing number of the observations are used in the calibration. The line for the optimized order uses the observations in the order determined by Algorithm 1. For comparison, 25 random orders are also shown. The optimized order provides the fastest improvement up until the rate of change is nearly zero, demonstrating that the algorithm effectively uses the inputs to the sensors to choose a set of observations that will result in a well-conditioned regressor matrix.

Figure 10:
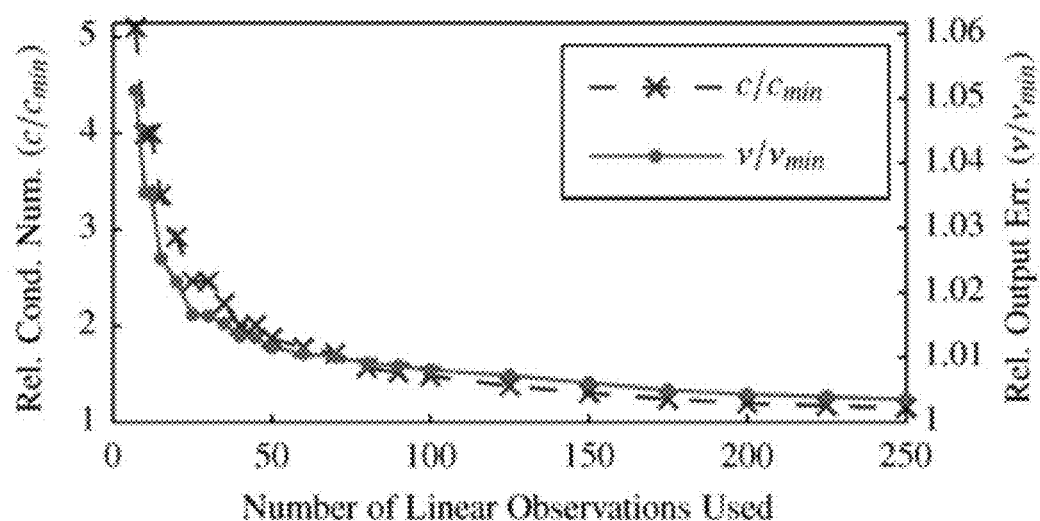
FIG. 10 illustrates a graph that shows simulated results for varying a number of linear motions used in calibrating gyroscopes in accordance with one implementation of the present invention.

FIG. 10 shows simulated results for varying the number of linear motions used in calibrating the gyros. The source of the specific force data used in the calibration was a simulated accelerometer calibrated using all of the available observations. The data points in this figure and the remainder of those presented in this section are the averages from 25 Monte Carlo simulations. In each, the parameters in the sensor models to be calibrated were randomly selected as described above. The two calibration quality metrics plotted are:

(1) The regressor matrix condition number, c, when using the given number of linear observations divided by the minimum value obtained for that simulation, $c_{min}$.

(2) The estimated standard deviation of the calibrated model's output error, v, divided by the minimum value obtained for that simulation, $v_{min}$. To ensure a fair comparison, the residual error from all of the available observations were used to calculate this metric even when only a subset of the observations were used to calibrate the parameters.

Based on the result in FIG. 10 it was decided to use 50 linear motion observations. Beyond this point, the regressor condition number could still be halved, but the rate of improvement is very slow and the output error only improves by 1%.

Figure 11:
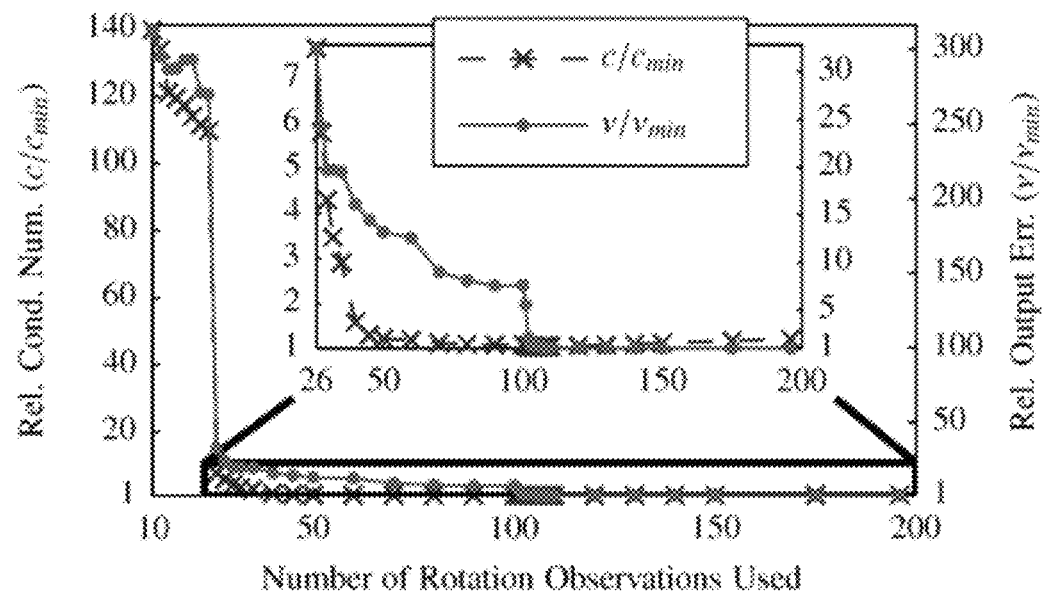
FIG. 11 illustrates a graph that shows variations in the same calibration quality metrics as the number of included rotation observations are varied in accordance with one implementation of the present invention.

Using the chosen number of linear motion observations, FIG. 11 shows the variation in the same calibration quality metrics as the number of included rotation observations is varied. From the scale of the main y axes and the steep drop, it appears that at least 25 observations should be included to obtain more accurate results, though the number of observations may be varied where more or less accurate results are desired. The inset view shows that including more than about 40 rotation observations does not cause any significant improvement to the regressor's condition number.

The data in FIG. 11 show each observation near the drop that occurs after 100 observations. There are only two observations that cause the sudden improvement in the error metric, suggesting that those convey important information for improving the results. Indeed, manually moving those to the front of the optimized list causes the drop in the error metric to occur around 40 observations instead of 100. This may cause concerns about the optimality of Algorithm 1; however, recall that it was designed to maximize the improvement in the regressor's condition number with each successive observation. Looking at that metric, the algorithm is succeeding in its goal. Given these considerations, and the fact that the sensor models used in these simulations are significantly more nonlinear than would be expected for real sensors, the unusual behavior in the model output error is likely a peculiarity of the simulations and only 40 rotation observations were used in the calibration experiments without modifying the order obtained from Algorithm 1.

Figure 12:
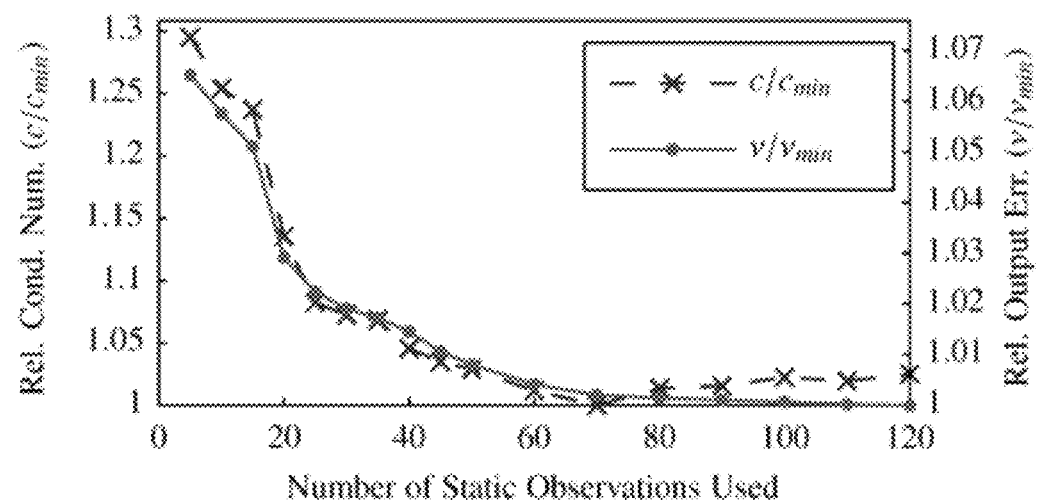
FIG. 12 illustrates a graph that shows the quality metrics as the number of static observations are varied in calibrating gyroscopes in accordance with one implementation of the present invention.

Given the selected number of linear and rotation observations, FIG. 12 shows the quality metrics as the number of static observations is varied. From these results, it was decided that 60 static observations would be sufficient for certain applications. The increase in the condition number after reaching a minimum at 70 observations does not mean that including additional observations degrades the calibration results. Rather, the information from the subsequent observations corrects what was an overly optimistic estimate of the robustness of the parameter estimates. The error metric continues to decrease beyond this point indicating that the accuracy of the calibrated parameters continues to improve.

Figure 13:
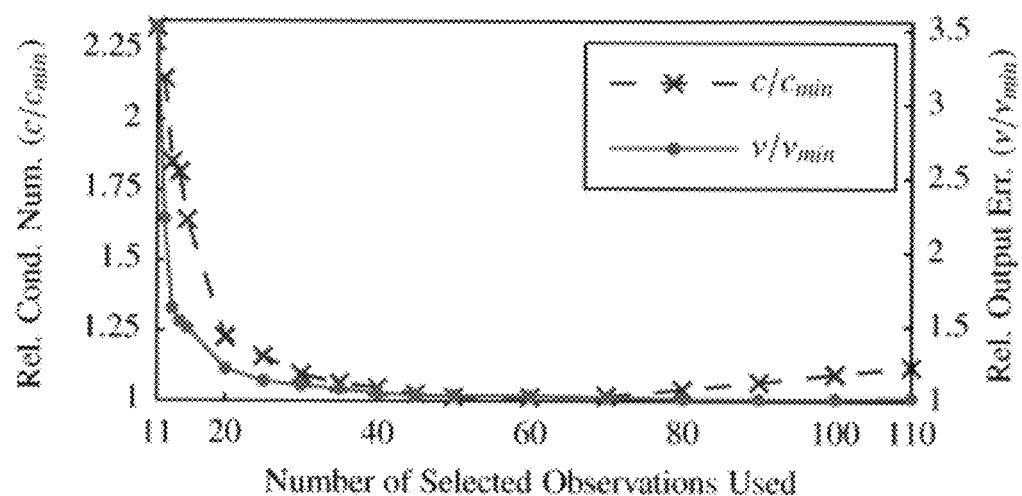
FIG. 13 illustrates a graph that shows the evolution of metrics for simulated accelerometer calibration results in accordance with one implementation of the present invention.

To verify the assumption that a set of observations that ensures good calibration results for the gyros would also do so for the accelerometers, FIG. 13 shows the evolution of the metrics for simulated accelerometer calibration results. The reference values are the calibration results using all of the potential static and linear observations. The results show that the selected observations provide error and observability metrics equivalent to using the full set of observations.

Example results for the calibrated parameters of a simulated accelerometer, as described above, are shown in Table 1 below. The impact is a measure of the significance of each model parameter. For the bias values, it is the parameter value over the nominal full-scale output, which is the nominal dynamic range of the sensor. For the remaining terms, it is calculated using the voltage that corresponds to the sensor's full-scale output according to the nominal scale factor. This voltage or its square, as appropriate, is multiplied by each parameter and the result is divided by the nominal full-scale output.

TABLE 1

Example results for the calibration of a simulated accelerometer, $\sigma_i$ is the standard deviation for the estimate of the corresponding parameter, $\hat{\phi}_i$. The method of calculating the impact of each term is described in Section 4.2.

| Parameter (units) | Calibrated Values | $\sigma_i/\hat{\phi}_i \times 100\%$ | Impact (% of Nom. Full Scale) |
|---|---|---|---|
| $^cT_a\left(\dfrac{mm/s^2}{V}\right)$ | $\begin{bmatrix} 14580 & -744.7 & -410.3 \\ 1345 & 15430 & -1120 \\ 416.4 & 1268 & 15120 \end{bmatrix}$ | $\begin{bmatrix} 0.05793 & 0.1965 & 0.3425 \\ 0.1152 & 0.05855 & 0.1375 \\ 0.3364 & 0.1233 & 0.05799 \end{bmatrix}$ | $\begin{bmatrix} 98.10 & 5.012 & 2.762 \\ 9.052 & 103.9 & 7.538 \\ 2.802 & 8.531 & 101.7 \end{bmatrix}$ |

TABLE 1-continued

Example results for the calibration of a simulated accelerometer, $\sigma_i$ is the standard deviation for the estimate of the corresponding parameter, $\hat{\phi}_i$. The method of calculating the impact of each term is described in Section 4.2.

| Parameter (units) | Calibrated Values | $\sigma_i/\hat{\phi}_i \times 100\%$ | Impact (% of Nom. Full Scale) |
|---|---|---|---|
| $A_a\left(\dfrac{mm/s^2}{V^2}\right)$ | $\begin{bmatrix} 221.8 & 259.2 & 252.9 \\ 263.8 & -252.4 & -138.9 \\ 293.8 & -140.8 & 235.9 \end{bmatrix}$ | $\begin{bmatrix} 2.052 & 1.544 & 2.003 \\ 1.732 & 1.587 & 3.648 \\ 1.555 & 2.855 & 2.151 \end{bmatrix}$ | $\begin{bmatrix} 1.971 & 2.303 & 2.247 \\ 2.344 & 2.242 & 1.234 \\ 2.610 & 1.251 & 2.095 \end{bmatrix}$ |
| $S_a\left(\dfrac{mm/s^2}{V^2}\right)$ | $\begin{bmatrix} -130.1 & -254.4 & 137.7 \\ 167.9 & 51.40 & -203.6 \\ -200.4 & 191.4 & 206.5 \end{bmatrix}$ | $\begin{bmatrix} 3.244 & 1.625 & 2.895 \\ 2.496 & 8.016 & 1.955 \\ 2.098 & 2.140 & 1.927 \end{bmatrix}$ | $\begin{bmatrix} 1.156 & 2.260 & 1.223 \\ 1.492 & 0.4566 & 1.809 \\ 1.781 & 1.700 & 1.834 \end{bmatrix}$ |
| $b_a\left(\dfrac{mm}{s^2}\right)$ | $[800.5 \;\; -243.8 \;\; -978.0]^T$ | $[0.2335 \;\; 0.7375 \;\; 0.1888]^T$ | $[4.082 \;\; 1.243 \;\; 4.987]^T$ |

Estimated model output error standard deviation = $5.934 \; \dfrac{mm}{s^2}$.

Regressor condition number = 31.77

Reviewing Table 1, the ratios of the standard deviation of the parameter estimates to their values indicate good confidence in all parameter estimates. The influence of the nonlinear terms is also in good agreement with the limits defined in above. Given their similarity to the accelerometer results, calibrated parameters for a simulated gyro calibration are not shown.

Figure 14:
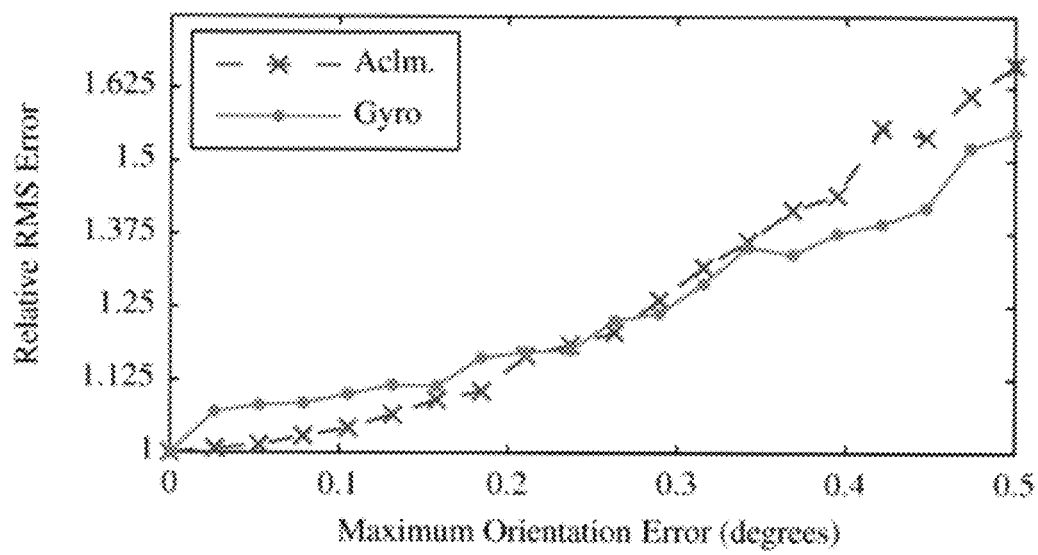
FIG. 14 illustrates a graph of RMS value of the error in the calibration equations divided by the error obtained from an ideal calibration plotted against a maximum simulated orientation error of the IMU during the calibration in accordance with one implementation of the present invention.

For the same simulated accelerometer calibration, the calibrated and simulated gravity magnitude, plate frame pitch and roll angles, linear scale factors, and axis misalignment angles are compared in Table 2. The gravity magnitude and plate frame orientation errors, derived from the calibrated components of the gravity vector, demonstrate the effectiveness of calibrating these terms. The scale factors and misalignment angles are also in excellent agreement. These were extracted from $^cT_a$ using the definitions from the calibration model. A direct comparison of the nonlinear terms is not possible since they do not allow the sensor models to be inverted. Despite this, the linear model terms are expected to be in close agreement, as demonstrated by the results.

rupted data were then used with the regressor matrix and output vector from the ideal simulation to calculate the errors for ideal observations. The RMS value of these errors divided by the RMS values of the errors for the parameters obtained from the ideal calibration is plotted against the maximum simulated orientation error in FIG. 14. The data shown are the average of 25 Monte Carlo simulations. The graphs show that orientation errors of 0.4-0.5° will cause the RMS error to increase by approximately 50% for both accelerometers and gyros.

These results show that it is important to accurately control the orientation of the IMU during the calibration procedure. However, the sensitivity to these errors is small enough that the hardware and experimental techniques described in the following sections are expected to provide good results relative to the ideal case. This is further discussed below.

The IMU used for the experiments uses two circuit boards mounted back to back with an insulating layer between them. The following is an example embodiment of a system for three-dimensional tracking of intermittent motion with a

TABLE 2

Comparison of simulated and calibrated values for an example accelerometer calibration.

| | $\|\|p_g\|\|$ | $\theta_{pitch}$ | $\theta_{roll}$ | $k_x$ | $k_y$ | $k_z$ | $a_{xy}$ | $a_{xz}$ | $a_{yx}$ | $a_{yz}$ | $a_{zx}$ | $a_{zy}$ |
|---|---|---|---|---|---|---|---|---|---|---|---|---|
| Simulated | 9806.6 | 9.100 | -8.200 | 14664 | 15482 | 15195 | -1.63 | 4.88 | 4.83 | 2.94 | 4.20 | -1.57 |
| Calibrated | 9804.9 | 9.102 | -8.200 | 14645 | 15501 | 15163 | -1.57 | 4.98 | 4.80 | 2.91 | 4.14 | -1.61 |
| Percent Error | 0.0178 | 0.0224 | 0.00423 | 0.135 | 0.123 | 0.209 | 3.45 | 2.04 | 0.592 | 0.935 | 1.36 | 2.70 |

The magnitude of gravity, $\|\|p_g\|\|$, is given in $mm/s^2$,
the calibration plate pitch and roll angles, $\theta_{pitch}$ and $\theta_{roll}$, are in degrees,
the linear scale factors, $k_i$, are in $mm/s^2/V$, and
the axis misalignment angles, $a_{ij}$, are in degrees.

The metric used to quantify the sensitivity of the calibration results to orientation errors is the root-mean-square (RMS) error of ideal observation equations evaluated with parameters estimated from corrupted observations. First, a set of simulated sensors was calibrated without any orientation error using the number of observations selected above. The regressor matrix and output vector from this calibration were stored to provide a set of ideal measurements and outputs.

Next, the simulated sensors were recalibrated using observations that included random orientation errors generated as described above. The parameters estimated from the cor- MEMS inertial measurement unit. All of the sensors used are manufactured by STMicroelectronics. The sensors on the top circuit board are: Two LIS344ALH accelerometers offering selectable ±2 g and ±6 g dynamic ranges. Only the ±2 g range was utilized in these experiments. An LPR403AL pitch/roll and an LPY403AL pitch/yaw gyro. Both provide two outputs, one with a dynamic range of 30°/s and the other 120°/s.

The bottom circuit board provides: Two additional LIS344ALH accelerometers, which were also fixed in the ±2 g range for these experiments. An LPR410AL pitch/roll and an LPY410AL pitch/yaw gyro. The gyros provide output ranges of 100°/s and 400°/s.

For both circuit boards, the extra in-plane gyro axis provided by the pitch/yaw sensor is ignored for simplicity. The remaining axes are grouped by dynamic range and calibrated as two separate gyro triads per board. The circuit boards were secured in the case using three screws. Two of the holes in each circuit board were reamed to their final diameter, as was done for the holes in the case. Shoulder screws were then used to mount the boards to provide consistent and accurate alignment.

The case was machined from blocks of acetal using a CNC mill. The external dimensions are approximately 47.5× 36.5×74 mm. The final external dimensions were cut with the case assembled to ensure those surfaces would be as planar and orthogonal as possible. The lid includes two exits for the data acquisition cable on opposite faces to allow the IMU to be placed in any orientation in the support blocks and on the plate.

Two support blocks and a calibration plate were machined on a CNC mill for use in the calibration procedure. A v-block provided orientations at 45° relative to the calibration plate surface. A compound angle block provided orientations where the three case axes have equal projections on the normal to the surface of the calibration plate.

The calibration plate was machined from an aluminum plate. The lobes on its perimeter have holes that were used to secure it to a tooling plate so that all of the features could be machined in one setup. A screen protector was applied to the main area of the plate and the back rail to provide a durable, low-friction surface and to prevent tooling marks from causing vibrations as the IMU and support blocks are slid and rotated on the plate. The v-block and the compound angle block were machined from acetal.

The v-block is made from two pieces held together with shoulder bolts for precise alignment. For each piece, the sides that are perpendicular to the bolts were machined flat and the holes for the shoulder bolts were drilled and reamed. Matching holes in a tooling plate allowed the piece to be secured while the perimeter and v-groove were cut in one setup. Thus, all geometrically important surfaces were accurate within the limits of the mill, specified to be ±0.010 mm positioning accuracy and ±0.005 mm repeatability. After deburring and assembling the two pieces, there is no perceptible error in the coplanarity of corresponding surfaces.

To ensure geometric accuracy of the compound angle block, its bottom surface was milled flat and three holes were drilled and tapped therein allowing it to be placed on a tooling plate and secured from underneath. All remaining surfaces of the block were then cut in one setup. The pocket that supports the IMU was created using a ball-end mill. Grooves in the compound angle block provide relief for the tool diameter to avoid interference with the corners and edges of the IMU's case.

To facilitate data collection, the observations were reordered for convenience of execution. This included: (1) ensuring the case would only be opened to switch the cable exit once, (2) grouping static motions together, and (3) minimizing the number of orientation changes required while executing the linear and rotation motions. After particularizing the target angular velocities to the dynamic ranges of the gyros, otherwise identical rotation observations that differed by less than 20% in their target speed were consolidated to a single observation at the lower speed since attempting to differentiate between very similar rotation rates while moving the IMU by hand is unreliable.

A GUI was implemented to display the intended orientation of the IMU and support block, if used, for each observation. The target angular velocity for finite rotations and acceleration for linear motions is also displayed and the motion can be animated to illustrate the intended speed. Deviations from the target speeds for the motions do not affect the accuracy of the calibration since it uses time-averaged values and displacements rather than instantaneous values. The target accelerations and angular velocities are simply used to help ensure that data throughout the sensors' dynamic ranges are obtained.

For linear motions, the IMU was slid manually across the calibration plate using the guide wall to constrain the motion. The IMU or support block, when used, was started against one of the reference walls of the plate and stopped a short distance from the opposite wall. A digital caliper with a specified accuracy of ±0.02 mm was then used to measure the gap remaining. The displacement was calculated using this value together with the measured dimensions of the IMU case, support blocks, and the distance between the plate's reference walls. It would be more convenient and the displacement values would be more accurate if the IMU were moved until it contacted the opposite reference wall. However, experiments quickly showed that no amount of care could reliably avoid impacts that would cause the accelerometer outputs to saturate briefly causing data loss.

The rotation motions were executed by starting with one face of the IMU or support block against a plate wall and rotating until contact was made between another pair of surfaces to ensure the desired angle change. It was most convenient to pivot around an edge of the IMU or support block starting and stopping against the same wall of the plate. Otherwise, it was difficult to avoid impacts that saturated the accelerometers at the end of the motion. Given these considerations, the profile of the compound angle block, which was designed to reduce its weight, made executing the rotations more difficult. Retaining a rectangular profile would be preferred.

Before beginning the experiments, the IMU was powered and allowed to warm up for approximately an hour to avoid temperature variations during the tests due to self-heating. The sensors' outputs were sampled using a 16-bit ADC with a ±5 V input range. Data for the static observations was sampled at 200 Hz for 5 seconds. For the linear and rotation observations, a 1000 Hz sampling rate was used. A second GUI window was used to display the data for each observation immediately after its collection. The nominal sensor parameters were applied to the raw data and the resulting outputs were rotated into the plate frame and then plotted. This allowed quick visual identification of problems such as orienting the IMU incorrectly, strong impacts against walls, or unintended orientation changes during an observation. Before saving the data from linear and rotation observations, it was cropped to the period containing the motion, as discussed above.

Figure 15:
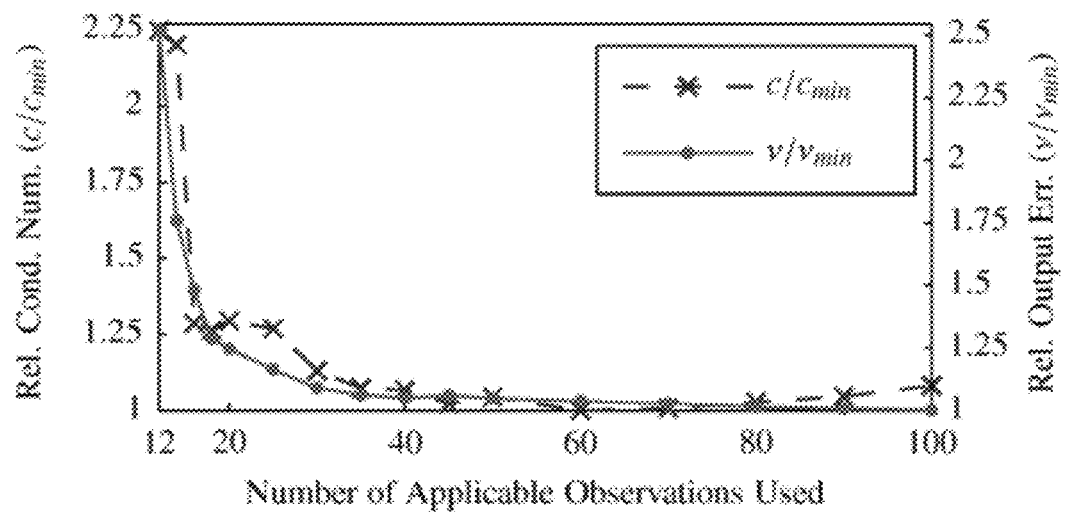
FIG. 15 illustrates a graph that shows the regressor condition number and estimated output error for one of the accelerometers versus the number of observations used in a calibration in accordance with one implementation of the present invention.
Figure 16:
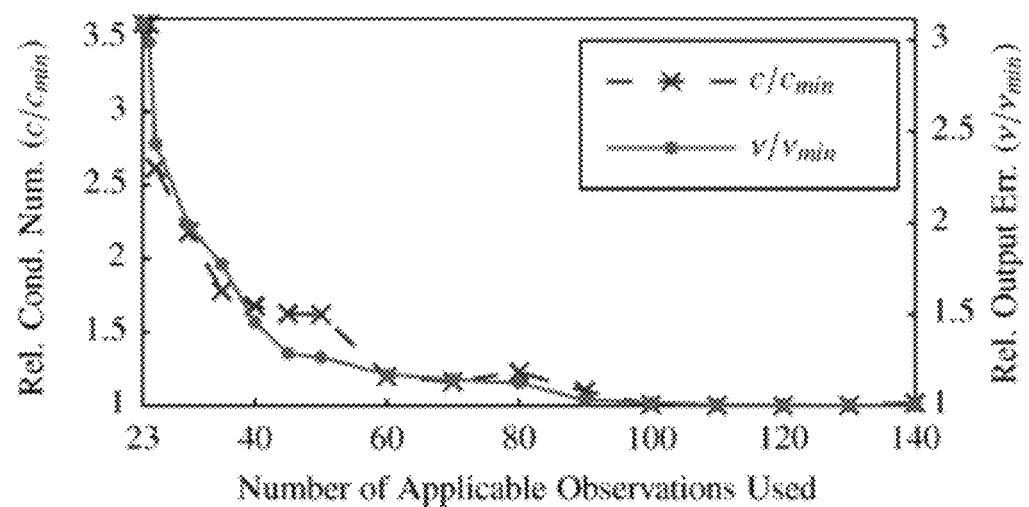
FIG. 16 illustrates a graph that shows the regressor condition number and estimated output error for one of the gyroscopes versus the number of observations used in a calibration in accordance with one implementation of the present invention.

To verify that the set of observations was sufficient, FIG. 15 shows the regressor condition number and estimated output error for one of the accelerometers versus the number used in the calibration. As few as half of the collected observations would still provide excellent results. The same analysis is shown for the 30°/s gyro triad in FIG. 16. Since it saturates most easily, the fewest number of rotation observations were applicable for its calibration. The number of observations can be reduced by about 25% without adversely affecting the calibration quality.

The magnitude and direction of the estimated gravity vectors obtained from the four accelerometers' calibration results are compared in Table 3. The magnitude of gravity used as the truth reference is 9797.7 mm/s², as reported by the National Geodetic Survey in June of 1998 at a location a few hundred meters from the building where the tests were conducted. The agreement between the calibrated and reference magnitudes is excellent, with one of the accelerometers coming within 0.05% of the truth value. The estimated pitch and roll angles of the calibration plate are also in excellent agreement with a maximum discrepancy between estimates from the individual accelerometers of only 0.025° for either angle.

TABLE 3

Comparison of the results for the calibrated gravity vectors obtained from the four accelerometers in the IMU.

| | $\|{}^F g\|$ | $\|{}^F g\|$ % Error | $\theta_{pitch}$ | $\theta_{roll}$ |
|---|---|---|---|---|
| Accelerometer 1 | 9780. | 0.182 | −0.3762 | −0.3839 |
| Accelerometer 2 | 9793 | 0.0453 | −0.3515 | −0.3877 |
| Accelerometer 3 | 9787 | 0.114 | −0.3628 | −0.3826 |
| Accelerometer 4 | 9780. | 0.181 | −0.3616 | −0.3793 |
| Mean | 9785 | 0.131 | −0.3630 | −0.3834 |

TABLE 3-continued

Comparison of the results for the calibrated gravity vectors obtained from the four accelerometers in the IMU.

| | $\|{}^F g\|$ | $\|{}^F g\|$ % Error | $\theta_{pitch}$ | $\theta_{roll}$ |
|---|---|---|---|---|
| Range | 13.4 | 0.137 | 0.0247 | 0.00839 |
| Range/Mean × 100% | 0.137 | NA | 6.81 | 2.19 |

The units of the gravity magnitude are mm/s², and the angles are given in degrees.

The complete set of calibrated parameters and the calibration quality metrics for one of the accelerometers is shown in Table 4. The ratios of the standard deviations to the parameter estimates vary from as small as 0.1% to as much as 660% indicating large variations in the level of confidence for each parameter. Considering the impact of each term shown in the last column, it can be seen that it is only the least significant terms that have very large uncertainties. While the terms in the combined alignment and linear scale factor matrix are clearly the most significant, it is interesting that some anisotropic and squared dependency terms have an influence on the model output comparable to misalignment of the axes.

TABLE 4

Calibration results for one of the accelerometers in the IMU.

| Parameter (units) | Calibrated Values | $\sigma_i/\hat{\phi}_i \times 100\%$ | Impact (% of Nom. Full Scale) |
|---|---|---|---|
| ${}^c T_a \left( \dfrac{mm/s^2}{V} \right)$ | $\begin{bmatrix} -14820 & 435.5 & 6.360 \\ -60.92 & 14750 & 2.183 \\ -18.05 & 0.2161 & -14770 \end{bmatrix}$ | $\begin{bmatrix} 0.1172 & 0.6081 & 39.55 \\ 4.323 & 0.1181 & 115.6 \\ 14.64 & 1204 & 0.1175 \end{bmatrix}$ | $\begin{bmatrix} 99.71 & 2.931 & 0.04280 \\ 0.4100 & 99.25 & 0.01469 \\ 0.1215 & 0.001454 & 99.40 \end{bmatrix}$ |
| $A_a \left( \dfrac{mm/s^2}{V^2} \right)$ | $\begin{bmatrix} 13.07 & 2.869 & -3.338 \\ -3.616 & -5.937 & 24.34 \\ -14.48 & 4.988 & 2.496 \end{bmatrix}$ | $\begin{bmatrix} 63.42 & 284.2 & 248.2 \\ 229.8 & 136.8 & 34.01 \\ 57.20 & 163.8 & 331.5 \end{bmatrix}$ | $\begin{bmatrix} 0.1161 & 0.02548 & 0.02965 \\ 0.03213 & 0.05275 & 0.2162 \\ 0.1286 & 0.04431 & 0.02217 \end{bmatrix}$ |
| $S_a \left( \dfrac{mm/s^2}{V^2} \right)$ | $\begin{bmatrix} -21.71 & -12.67 & -8.149 \\ -5.649 & 21.30 & 2.456 \\ -12.87 & -16.25 & -34.24 \end{bmatrix}$ | $\begin{bmatrix} 76.02 & 122.6 & 199.1 \\ 292.3 & 72.73 & 659.5 \\ 127.3 & 94.64 & 47.09 \end{bmatrix}$ | $\begin{bmatrix} 0.1929 & 0.1126 & 0.07239 \\ 0.05018 & 0.1892 & 0.02182 \\ 0.1144 & 0.1443 & 0.3041 \end{bmatrix}$ |
| $b_a \left( \dfrac{mm}{s^2} \right)$ | $[16.68 \quad -101.6 \quad -140.4]^T$ | $[44.10 \quad 7.225 \quad 5.192]^T$ | $[0.08504 \quad 0.5179 \quad 0.7156]^T$ |

Estimated model output error standard deviation = 11.85 $\dfrac{mm}{s^2}$.

Regressor condition number = 30.51

A listing of the calibrated parameters and calibration quality metrics for the 120°/s gyro triad is given in Table 5. As with the results for the accelerometer, the relative certainty in the parameter estimates is generally inversely related to the impact of each term. To evaluate the impact of the terms describing the specific force dependency, an input of 2 g was used. This gives a measure of their maximum impact over the working range of the accelerometers.

TABLE 5

Calibration results for the 120°/s gyro triad in the IMU.

| Parameter (units) | Calibrated Values | $\sigma_i/\hat{\phi}_i \times 100\%$ | Impact (% of Nom. Full Scale) |
|---|---|---|---|
| $^cT_g\left(\dfrac{°/s}{V}\right)$ | $\begin{bmatrix} 119.6 & -0.2801 & 0.9999 \\ 1.177 & 117.5 & 1.465 \\ 0.2515 & -0.2427 & 120.6 \end{bmatrix}$ | $\begin{bmatrix} 0.03124 & 12.76 & 3.536 \\ 3.177 & 0.03039 & 2.413 \\ 14.86 & 14.72 & 0.02932 \end{bmatrix}$ | $\begin{bmatrix} 99.70 & 0.2334 & 0.8332 \\ 0.9805 & 97.95 & 1.221 \\ 0.2096 & 0.2022 & 100.5 \end{bmatrix}$ |
| $A_g\left(\dfrac{°/s}{V^2}\right)$ | $\begin{bmatrix} -0.01993 & 0.2067 & 0.05673 \\ 0.006555 & 0.06147 & 0.03427 \\ 0.1214 & 0.03004 & 0.1394 \end{bmatrix}$ | $\begin{bmatrix} 648.2 & 44.96 & 152.7 \\ 1971 & 151.2 & 252.9 \\ 106.4 & 309.4 & 62.17 \end{bmatrix}$ | $\begin{bmatrix} 0.01661 & 0.1723 & 0.04727 \\ 0.005462 & 0.05122 & 0.02855 \\ 0.1012 & 0.02503 & 0.1162 \end{bmatrix}$ |
| $S_g\left(\dfrac{°/s}{V^2}\right)$ | $\begin{bmatrix} 0.1344 & -0.01006 & 0.03206 \\ 0.1559 & -0.2740 & 0.09537 \\ 0.1356 & 0.07219 & -0.07714 \end{bmatrix}$ | $\begin{bmatrix} 71.20 & 981.1 & 321.7 \\ 61.39 & 36.02 & 108.2 \\ 70.59 & 136.7 & 133.7 \end{bmatrix}$ | $\begin{bmatrix} 0.1120 & 0.008382 & 0.02672 \\ 0.1299 & 0.2283 & 0.07948 \\ 0.1130 & 0.06015 & 0.06429 \end{bmatrix}$ |
| $F_g\left(\dfrac{°/s}{g}\right)$ | $\begin{bmatrix} -0.002742 & 0.01210 & 0.02349 \\ 0.01573 & 0.01830 & -0.006075 \\ -0.01449 & -0.007844 & 0.01404 \end{bmatrix}$ | $\begin{bmatrix} 366.1 & 83.60 & 42.63 \\ 63.81 & 55.29 & 164.8 \\ 69.25 & 129.0 & 71.33 \end{bmatrix}$ | $\begin{bmatrix} 0.004570 & 0.02017 & 0.03914 \\ 0.02622 & 0.03050 & 0.01013 \\ 0.02416 & 0.01307 & 0.02339 \end{bmatrix}$ |
| $A_{g,f}\left(\dfrac{°/s}{g^2}\right)$ | $\begin{bmatrix} 0.03174 & -0.02468 & -0.009888 \\ -0.01472 & 0.001241 & -0.002126 \\ 0.02191 & -0.0009596 & -0.02588 \end{bmatrix}$ | $\begin{bmatrix} 81.18 & 96.18 & 251.1 \\ 175.1 & 1912 & 1168 \\ 117.6 & 2473 & 95.95 \end{bmatrix}$ | $\begin{bmatrix} 0.1058 & 0.08266 & 0.03296 \\ 0.04906 & 0.004137 & 0.007086 \\ 0.07303 & 0.003199 & 0.08627 \end{bmatrix}$ |
| $S_{g,f}\left(\dfrac{°/s}{g^2}\right)$ | $\begin{bmatrix} 0.01033 & 0.01140 & -0.001506 \\ -0.02621 & -0.002890 & -0.01905 \\ -0.04856 & -0.04577 & -0.03118 \end{bmatrix}$ | $\begin{bmatrix} 549.5 & 474.6 & 3733 \\ 216.5 & 1873 & 295.1 \\ 116.9 & 118.2 & 180.3 \end{bmatrix}$ | $\begin{bmatrix} 0.03442 & 0.03800 & 0.005020 \\ 0.08738 & 0.009632 & 0.06351 \\ 0.1619 & 0.1526 & 0.1039 \end{bmatrix}$ |
| $b_g$ (°/s) | $[1.573 \quad 0.6505 \quad 0.9910]^T$ | $[3.585 \quad 8.668 \quad 5.690]^T$ | $[1.311 \quad 0.5421 \quad 0.8259]^T$ |

Estimated model output error standard deviation = 0.08088°/s.
Regressor condition number = 24.41

Given that one of the key advantages of this calibration method is the ability to calibrate complex sensor models, it is of interest to assess the improvement in accuracy offered by the various terms. To do this, sensor models including only a subset of the terms included in the full model were calibrated using the same set of observations. As described above, this is done by simply zeroing the terms to be excluded and removing the corresponding columns from the regressor matrix.

Table 6 shows a comparison of the model accuracy provided by the nonlinear terms in the accelerometer model. The top row shows that the full model provides an average improvement of 5.7% relative to a linear model accounting for bias, scale factor, and misalignment. The second and third rows show that the squared dependency terms are more significant than the anisotropic sensitivities for the accelerometers used in this IMU.

TABLE 6

Percent increases in the estimated model output error standard deviation, v, for simplified accelerometer models relative to the results for the full model.

| | Percent increase in v for triad: | | | | |
|---|---|---|---|---|---|
| Model Terms Included | 1 | 2 | 3 | 4 | Avg. |
| $^cT_a, b_a$ | 7.456 | 5.497 | 3.617 | 6.400 | 5.743 |
| $^cT_a, A_a, b_a$ | 5.410 | 5.017 | 1.970 | 5.129 | 4.381 |
| $^cT_a, S_a, b_a$ | 1.707 | 0.5307 | 1.808 | 1.886 | 1.483 |

A similar comparison for the gyros is given in Table 7 where the influence of both the nonlinearities and specific force dependencies are investigated. Interestingly, the first row shows that the full model provides anywhere from 4.5-70.2% improvement compared to a linear model with bias, scale factor, and misalignment terms. This suggests significant variations in the sensors' linearity and sensitivity to specific force. While the list of potential parameter combinations is not exhaustive, the results in the remaining rows of the table indicate that the most important terms to include for these gyros, in order of significance, are: scale factor nonlinearity, linear specific force sensitivity, and anisotropic angular rate and specific force sensitivity.

TABLE 7

Percent increases in the estimated model output error standard deviation, v, for simplified gyro models relative to the results for the full model.

| | Percent increase in v for triad: | | | | |
|---|---|---|---|---|---|
| Model Terms Included | 30°/s | 120°/s | 100°/s | 400°/s | Avg. |
| $^cT_g, b_g$ | 15.80 | 4.514 | 70.15 | 7.047 | 24.38 |
| $^cT_g, A_g, b_g$ | 13.39 | 3.963 | 65.11 | 5.636 | 22.02 |
| $^cT_g, S_g, b_g$ | 3.031 | 2.990 | 5.786 | 5.360 | 4.291 |
| $^cT_g, A_g, S_g, b_g$ | 2.894 | 2.097 | 4.961 | 3.831 | 3.446 |
| $^cT_g, F_g, b_g$ | 14.25 | 2.914 | 66.26 | 4.392 | 21.95 |
| $^cT_g, S_g, F_g, b_g$ | 1.382 | 1.519 | 1.872 | 2.546 | 1.830 |
| $^cT_g, S_g, S_{g,f}, b_g$ | 2.666 | 2.824 | 5.123 | 4.698 | 3.828 |
| $^cT_g, S_g, A_{g,f}, b_g$ | 2.239 | 2.479 | 5.162 | 4.609 | 3.622 |
| $^cT_g, S_g, F_g, A_{g,f}, b_g$ | 0.6219 | 1.021 | 1.267 | 1.856 | 1.191 |
| $^cT_g, S_g, F_g, S_{g,f}, b_g$ | 1.026 | 1.355 | 1.407 | 2.084 | 1.468 |

The full set of model parameters considered in this test of the calibration technique provided an average improvement in the estimated model output error of 5.7% for the accelerometers and 24.4% for the gyros relative to the linear models employed in the majority of existing calibration techniques targeting MEMS inertial sensors. This will improve the accuracy of position and orientation estimates obtained by integrating the sensor outputs. For one of the gyros, the output errors were reduced by 70%. The resulting reduction in the growth rate of orientation errors will also reduce positioning errors due to inaccurate gravity cancellation, which are currently the dominant source of positioning errors when attempting to navigate using MEMS inertial sensors.

As mentioned above, the largest improvements in the gyro error were provided by compensating for scale factor nonlinearity and linear specific force sensitivity. It is also worth noting that the 30°/s and 100°/s gyro outputs, which exhibited the largest nonlinearity, are actually derived from the same sensor elements as the 120°/s and 400°/s ranges. This indicates that the amplifier used to provide the more sensitive dynamic ranges in these gyros has poor linearity. The ability of this calibration technique to identify and compensate for these nonlinearities is an excellent example of its ability to improve the accuracy attainable with this type of consumer-grade inertial sensor.

The simulation results demonstrate that the calibration technique is able to provide robust estimates for all 33 parameters per accelerometer triad and 57 per gyro triad for the employed sensor models. However, the experimental results shown herein, also illustrate that not all of the parameters will be significant for a given sensor. As shown above, parameters can be easily removed from the models to assess their significance in decreasing the model output error. This allows the complexity of the sensor model to be adapted depending on the desired balance between accuracy and speed of the calibration. Once the appropriate parameters have been eliminated, Algorithm 1 and the technique described herein can be used to obtain an optimized set of observations to calibrate the simplified sensor models. With fewer model parameters, fewer observations will be required to obtain robust estimates.

Repeated calibrations of an IMU can also be shortened using the same principles. If certain parameters, such as the components of gravity in the plate frame, are known to be constant between calibrations, their values can substituted into the calibration equations as known constants. Since these equations are linear in the parameters to be calibrated, the terms associated with the known values can easily be merged into the output vector. The remaining parameters can then be estimated using fewer observations. Aside from the gravity vector, it may be possible to obtain sufficiently accurate estimates of the axis misalignment angles to warrant treating them as constants. Separating the alignment and scale factor matrices and modifying the calibration equations appropriately would then allow only the three scale factors to be treated as unknowns.

Another aspect of the calibration technique that allows significant flexibility is the hardware used in its implementation. As demonstrated here, simple fixtures with a total cost for materials under US$50 combined with a caliper and manual excitation of the IMU allows the technique to be implemented with minimal expense. However, as discussed above, manually executing the motions without any fixed constraints between the IMU and the calibration plate limits the speeds that can be applied and requires a good deal of care to ensure they are executed properly.

For applications where the cost would be justified, more sophisticated hardware and data collection tools would allow the calibration to be completed with greater accuracy, speed, and convenience. For these experiments, after some practice, it took an average of 20-30 s to execute static observations and 30-60 s to execute and crop the data from linear and rotation observations. At this rate, it would require nearly three hours to collect all of the observations used for the full calibration of the IMU. However, inclusion of a linear stage with a linear encoder and/or a rotary stage with a rotary encoder could greatly reduce the required time by providing automated measurements of linear translations and the ability to perform rotations without the need to carefully avoid impacts against the sides of the calibration plate. Similar advantages that would be offered by other implementations using combinations of linear and rotary axes and transducers can be appreciated by those skilled in the art.

Results of the experiments showed that IMU orientation errors must be minimized to obtain accurate parameter estimates. With the equipment used in these experiments, errors in manually constraining the IMU and geometric errors in the machined parts are both potential sources of orientation error.

The most significant geometric errors are expected to be the dimensional stability of the materials used and the positioning accuracy of the CNC mill. Measurements from a coordinate measuring machine (CMM) could be used to compensate for geometric errors by correcting the assumed orientations. Such measurements were not performed for these experiments; however, the geometric accuracy of the parts was checked using a dial indicator mounted on the spindle of the mill. When passed over the planar surfaces of the parts, it registered variations on the order of ±0.020 mm, which is twice the machine's specified positioning accuracy. Given the size of the IMU and support blocks, these variations would cause maximum orientation errors on the order of 0.01°. Therefore, it was assumed that geometric errors in the hardware were negligible relative to other sources of experimental error.

While it is difficult to estimate the orientation errors due to manually constraining the IMU, misalignments as small as 0.25° are visible for the size of the objects involved. Assuming errors around half that size were present, the plots in FIG. 14 indicate that the degradation of the calibration accuracy relative to the ideal case would be less than 10%.

The displacements for linear and rotation observations are also potential sources of error. Averaging provided by the least-squares solution ensures that while random errors in the displacements will increase the variance of the parameter estimates, their values should not be significantly affected. Systematic errors in the displacements will scale the parameter estimates proportionally since they provide the scale for the observation equations. These errors should be negligible for rotations given the geometric accuracy of the parts. For linear motions, errors in the measured dimensions of the plate, IMU case, or support blocks would cause systematic errors. These would be noticeable over repeated calibrations since the estimated magnitude of gravity would be consistently high or low.

To minimize such errors, multiple measurements of the applicable hardware dimensions were taken and average values were recorded. Then, to estimate the measurement errors likely to occur during the calibration, repeated measurements of the IMU's position on the calibration plate were taken while it was held stationary. The results showed a maximum variation of 0.1 mm, or 0.07% of the average displacement of 144 mm. The accuracy of the calibrated gravity magnitudes shown in Table 3 indicates that these displacement measurement errors were small enough to avoid significant errors in the calibration results.

Example and Test Data of Motion Tracking

Figure 17:
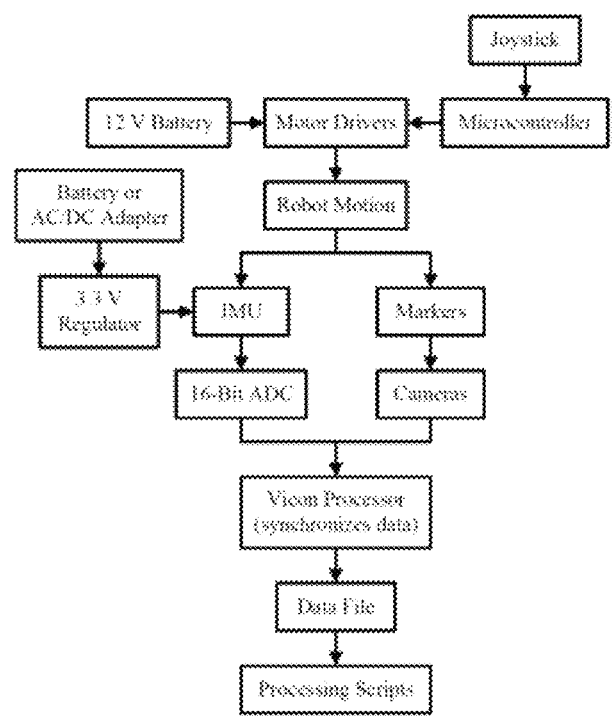
FIG. 17 illustrates a schematic diagram of a setup used in an experiment in motion tracking in accordance with one implementation of the present invention.

To test the tracking system, experiments were performed using a three-wheeled robot with a mounted IMU. The rear wheel is a caster wheel that is free to pivot, allowing good maneuverability on level ground. The upper platform of the robot is suspended on silicon foam pads to provide vibration isolation and reduce noise in the IMU outputs during locomotion. The wheelbase of the robot is 455 mm and its mass is approximately 6 kg. During these experiments, the robot's trajectory was controlled interactively using a joystick interfaced to the microcontroller that commands the motor drivers, as shown in the system diagram in FIG. 17. The same IMU and sensors as were used in the previous experiment (see discussion above) were used to test motion tracking. The outputs of these sensors were sampled at 1000 Hz using a 16-bit ADC with an input range of ±5 V.

In these experiments, calibrated outputs from separate triads were combined with weights determined according to the variances of the static outputs from the individual axes. For the gyros, only the dynamic ranges that are not saturated were used to determine the output at a given sample. The combined outputs were then used as the angular rate and specific force estimates from the IMU.

The IMU was calibrated using the techniques described above immediately after performing the experiments to obtain the sensor model values used to process the data. Given the residuals from the calibration equations, the average of the estimated standard deviations for the accelerometer triads' outputs was 19.7 mm/s². For the gyros, the average was 0.0945°/s. These figures are representative of the typical level of error in the IMU's outputs, and provide estimates of the attainable accuracy of the motion tracking results.

A truth reference for the motion of the robot was provided using a Vicon MX vision-based motion analysis system. It was used to track the motion of the reflective spherical markers. The marker centered on the top of the IMU was used as the origin of a coordinate system defined using the complete set of markers. The method of determining the alignment between this coordinate system and that of the calibrated IMU is discussed below.

After calibration of the vision system, the software reported residual errors of approximately 0.16 mm for the marker positions. This is more than an order of magnitude smaller than the errors in the most accurate position estimates derived from the IMU and, hence, can be considered negligible. The average distance between the origin and the other markers is 171.5 mm. Therefore, the worst-case error in the measured orientation of the marker coordinate system, or the marker frame, is expected to be on the order of 2×0.16/171.5=1.87 mrad=0.107°.

Alignment of the IMU's coordinate frame to the marker frame was accomplished by placing the robot on a swivel chair and spinning it through several rotations with the robot approximately level, on its side, and with its front facing down. The angular rate vector detected by the gyros during the spins provides an estimate of the direction of the rotation axis in the IMU coordinate frame. The rotation axis can also be estimated in the marker frame, m, using the fact that it is invariant during the rotations. If $^c R_{m0}$ is the initial orientation of the marker frame relative to the camera frame, c, and the rotation axis expressed in the marker frame is designated as $^m v$:

$$^{m_i}R_{m_0}{}^m v = {}^m v. \tag{101}$$

where:

$$^{m_i}R_{m_0} = {}^{m_i}R_c{}^c R_{m_0} = {}^c R_{m_i}^T {}^c R_{m_0} \tag{102}$$

is the rotation matrix from the initial marker frame to any subsequent orientation during the rotation. Rearranging (101) gives:

$$(^{m_i}R_{m_0} - I_{3\times 3})^m v = 0_{3\times 1}, \tag{103}$$

where $I_{3\times 3}$ is a 3×3 identity matrix and $0_{3\times 1}$ is a 3×1 vector of zeros. Stacking instances of (103) for multiple orientation observations during the rotations provides the following set of over-constrained equations:

$$\left( \begin{bmatrix} {}^{m_i}R_{m_0} \\ \vdots \\ {}^{m_n}R_{m_0} \end{bmatrix} - \begin{bmatrix} I_{3\times 3} \\ \vdots \\ I_{3\times 3} \end{bmatrix} \right) {}^{m_0}v = 0_{3n\times 1}. \tag{104}$$

After defining:

$$A = \begin{bmatrix} {}^{m_i}R_{m_0} \\ \vdots \\ {}^{m_n}R_{m_0} \end{bmatrix} - \begin{bmatrix} I_{3\times 3} \\ \vdots \\ I_{3\times 3} \end{bmatrix}, \tag{105}$$

then the least-squares solution of (104), with the constraint that v be a unit vector is the eigenvector of $A^T A$ associated with a zero eigenvalue or, in practice, the eigenvalue with the minimum magnitude. This provides a robust estimate of $^m v$ by allowing orientation information from observations throughout the rotations to be utilized.

Having obtained the rotation axes from three separate rotations in both the marker and IMU frame, U, an estimate of the rotation matrix between them is obtained by manipulating:

$$^U R_m [^m v_1 \; ^m v_2 \; ^m v_3] = [^U v_1 \; ^U v_2 \; ^U v_3] \tag{106}$$

to give:

$$^U R_m = [^U v_1 \; ^U v_2 \; ^U v_3][^m v_1 \; ^m v_2 \; ^m v_3]^{-1}. \tag{107}$$

Due to imperfections in the experimental data, the result of this calculation will not be a true rotation matrix. The closest orthonormal matrix can be obtained using singular value decomposition. Note that this alignment approach is very similar to the traditional method of gyro-compassing and using the gravity vector to align an IMU to a local level frame. Here, three vectors were used to improve the robustness of the estimated rotation matrix. However, the third vector required to make the set of equations invertible could be obtained from the cross product of the first two if fewer observations are collected.

Figure 18:
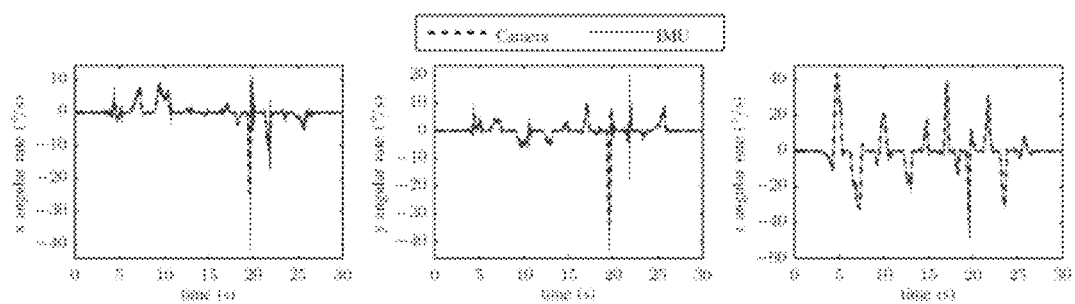
FIG. 18 illustrates graphs that reflect accuracy of alignment of a vision system camera with the IMU, as used during an experiment.

The accuracy of the alignment is demonstrated in FIG. 18, where the angular rates in the marker frame estimated using the camera data are transformed into the IMU frame using the calibrated rotation matrix. These were compared to the angular rates reported by the gyros, which were provided directly in the IMU frame. There was no visible error between the two estimates confirming that the two coordinate systems were aligned correctly.

To simplify the data processing, the reference coordinate frame for the motion tracking experiments was defined as a local-level frame coincident with the IMU frame's origin at the start of each experiment and aligned with its initial heading. This allowed the initial position and heading angle to be taken as zero. The axes were defined to have the x axis pointing right, the y axis pointing forward, and the z axis pointing up relative to the robot and IMU. This is different than the North-East-Down definition commonly used in aviation, but it provides a more intuitive interpretation of the motion in the z direction. Given this definition of the reference frame, pitch is measured about the x axis, roll about the y, and the heading angle is positive when the robot turns to the left.

All of the trials included an initial still period of approximately one second during which the direction of gravity could be estimated using the outputs from the accelerometers. This provided the initial values for the pitch and roll angles required to define the local-level reference frame. To minimize the effects of the accelerometers' output drift on the initial attitude estimate, the data from the initial still period were averaged and the direction of the resulting vector was taken as the direction of gravity for the roll and pitch angle initialization.

Integration of the IMU outputs to obtain orientation, velocity, and position data was performed as follows:
1) The defined initial heading of zero with the initial pitch and roll angles obtained from the accelerometers were converted to an equivalent quaternion representation of the initial orientation of the IMU in the reference frame.
2) The gyro outputs were integrated using the closed-form, first-order quaternion integration method. This is equivalent to a trapezoidal integration method for three-dimensional orientation and has the benefit of maintaining the unit length of the quaternion with each update. This avoids the need for frequent renormalization, which is common in other methods.
3) The orientation history provided by the quaternion integration was used to transform the accelerometer specific force outputs into the reference frame.

Four tests were conducted traversing the ramps with different frequencies of pauses. In the first test, the robot was driven very carefully over the ramps in short motions with brief pauses between them. In the last, pauses were made only as necessary to evaluate the position of the robot and avoid a premature dismount.

To provide more sustained motions, tests were also conducted with the robot driving on level ground. These tests allowed longer periods of motion between pauses to assess the results of the data processing algorithms when fewer opportunities for bias updates are present.

Figure 19:
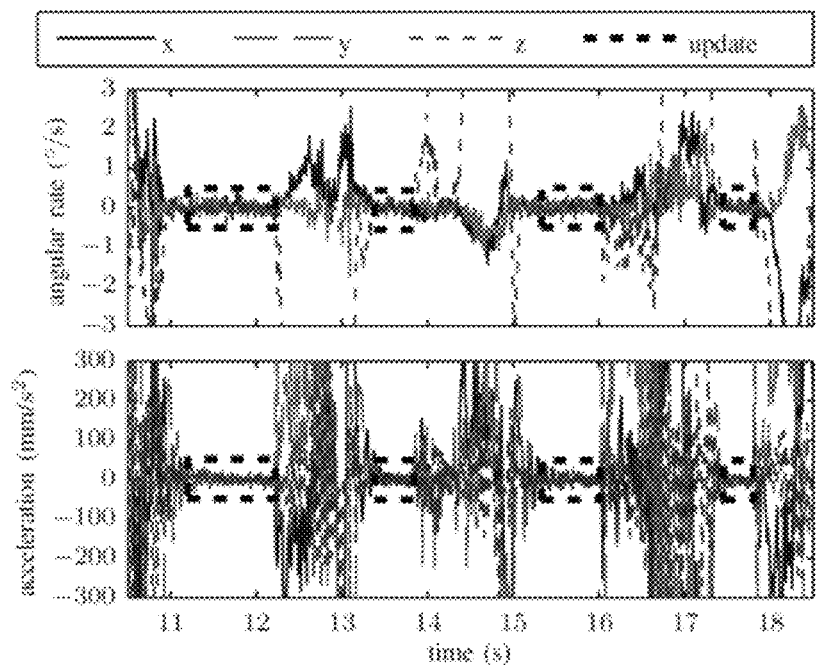
FIG. 19 illustrates several seconds of data from each of the axes of the gyroscope and accelerometer triads with regions identified where the accelerometer and gyro biases can be updated, as obtained during an experiment.

To demonstrate the state estimation algorithm's ability to identify periods where bias updating can be performed accurately, FIG. 19 shows several seconds of data from each of the axes of the gyro and accelerometer triads. Both are resolved into the reference frame, and the accelerometer outputs have gravity removed to move the signals into a common range. During still periods, it is evident that the signals from all axes reduce to within the noise band. The dashed black boxes in FIG. 19 indicate the periods identified by the algorithm as still periods, which were then used to update the various bias levels.

The motion tracking results using both discrete and interpolated bias updates, as discussed above, are summarized for the four trials conducted on the ramps and two trials conducted on level ground in Table 8. Values that change depending on the type of bias update used have the results listed separately in the appropriate columns. It can be seen that using interpolated bias updates provides only modest improvements in the maximum pitch and roll errors, but the velocity and position errors are reduced significantly. Since heading angle errors cannot be corrected using inertial sensors alone, there is no difference in the maximum heading error between the two methods. That is why the corresponding column lists only a single value rather than separating the results by discrete and interpolated bias updates.

TABLE 8

| Trial Type | Trial # | Duration (s) | Time in motion (s) | Avg. motion duration (s) | Max. motion duration (s) | Max. heading error (deg) | Max. pitch + roll error (deg) | | Avg. velocity error (mm/s) | | Path length (mm) | Max. position error (mm) | | Max. pos. error/ path length | |
|---|---|---|---|---|---|---|---|---|---|---|---|---|---|---|---|
| | | | | | | | Disc. | Int. | Disc. | Int. | | Disc. | Int. | Disc. | Int. |
| Ramps | 1 | 30.1 | 18.5 | 1.54 | 3.05 | 0.34 | 0.27 | 0.25 | 3.0 | 1.8 | 1931 | 40.1 | 6.7 | 2.08% | 0.35% |
| | 2 | 23.8 | 14.6 | 1.82 | 3.02 | 0.74 | 0.28 | 0.27 | 4.4 | 2.6 | 1729 | 60.0 | 19.4 | 3.47% | 1.12% |
| | 3 | 14.0 | 10.2 | 2.54 | 4.47 | 0.74 | 0.36 | 0.33 | 5.6 | 3.5 | 1327 | 34.4 | 18.9 | 2.59% | 1.42% |
| | 4 | 14.6 | 9.3 | 2.33 | 4.53 | 0.48 | 0.50 | 0.46 | 9.5 | 5.7 | 2186 | 75.6 | 38.5 | 3.46% | 1.76% |
| Level | 1 | 27.1 | 19.7 | 2.46 | 5.54 | 1.58 | 0.72 | 0.40 | 17.2 | 7.6 | 6793 | 177.5 | 74.2 | 2.61% | 1.09% |
| | 2 | 29.4 | 22.3 | 4.46 | 6.60 | 1.65 | 1.08 | 0.73 | 62.5 | 20.6 | 12383 | 1207.7 | 248.6 | 9.75% | 2.01% |

4) Since the reference frame was defined to be level, gravity was along its z axis. This was subtracted from the specific force outputs to obtain the kinematic acceleration in the reference frame. In doing this, the magnitude of gravity was taken to be the value reported by the National Geodetic Survey for the location of the experiments.
5) The kinematic acceleration values in the reference frame were then integrated twice with respect to time using a trapezoidal, first-order approximation to obtain the velocity and position estimates in that frame.

Two types of experiments were conducted. First, to simulate locomotion on rough terrain, two sets of wooden ramps were placed at the appropriate spacing for the robot to be driven across them. The caster wheel in the rear of the robot is, obviously, not ideal for stability during such tests. But, it served well to increase the variations in the robot's posture.

Figure 20:
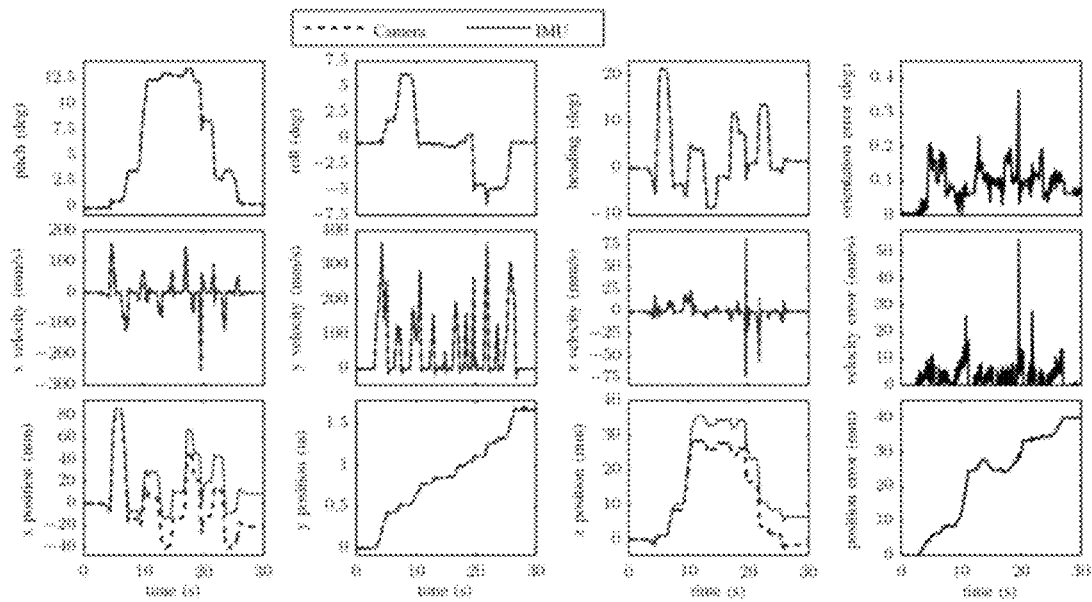
FIG. 20 illustrates graphs that show results obtained using discrete bias updates for a first trial during an experiment using ramps.

To provide a more detailed illustration of the accuracy of the motion tracking using the IMU, the results using discrete bias updates for the first trial on the ramps are shown in FIG. 20. Using the discrete bias updates, the position error was seen to remain under 40 mm throughout the 30 s trial. This was roughly six times more error than using interpolated updates. The final orientation error is under 0.1° and it reached a maximum of only 0.37°. The errors in the pitch, roll, and heading angles (determined relative to the vision system's estimates) are shown individually in FIG. 21. The errors in the three velocity components are shown in the reference frame in FIG. 22. The effects of the discrete bias updates are evident in the errors for the pitch and roll angles along with the velocity components. Each time a still period was detected the error was suddenly brought to zero as the bias update was applied. The pitch and roll errors during still periods were consistently below 0.1°, which is equal to the estimated worst-case error in the orientation tracking via the vision system.

Figure 23:
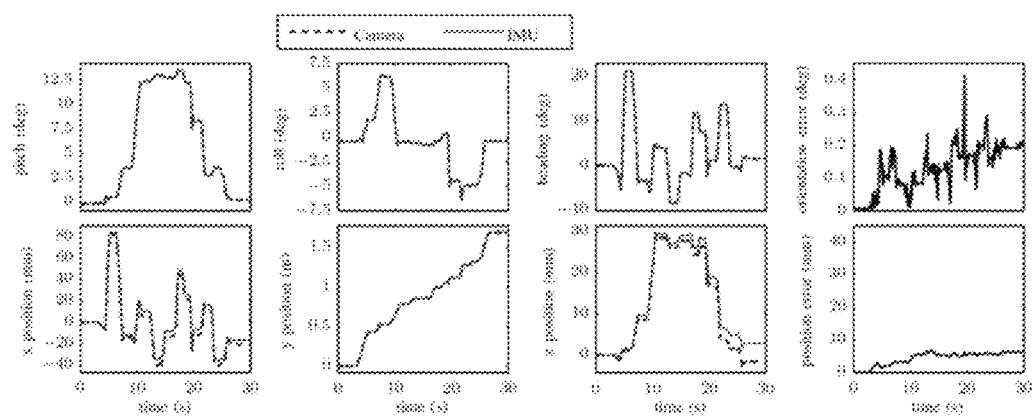
FIG. 23 illustrates graphs that show orientation and position tracking results using interpolated bias updates for the first trial on the ramps, as obtained during experiments.

The orientation and position tracking results using interpolated bias updates for the first trial on the ramps are shown in FIG. 23. The vertical scales on the error plots are the same as those in FIG. 21 to allow for direct comparison. At the end of the trial, the orientation error was just over 0.2°, while the position error was, remarkably, only 6.7 mm.

Figure 24:
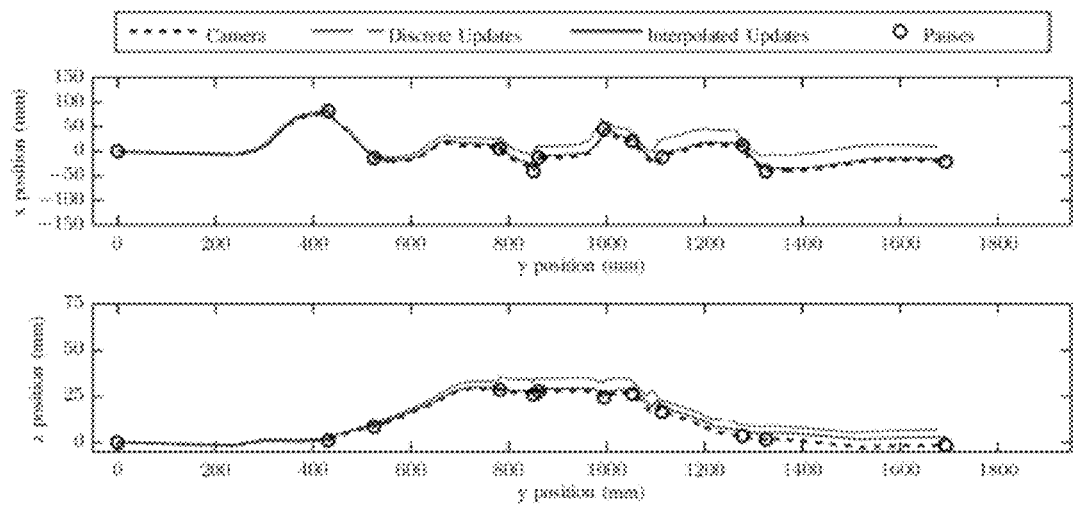
FIG. 24 illustrates graphs that show results of more accurate gravity cancellation and improved total position error for the first trial on the ramps, as obtained during experiments.
Figure 25:
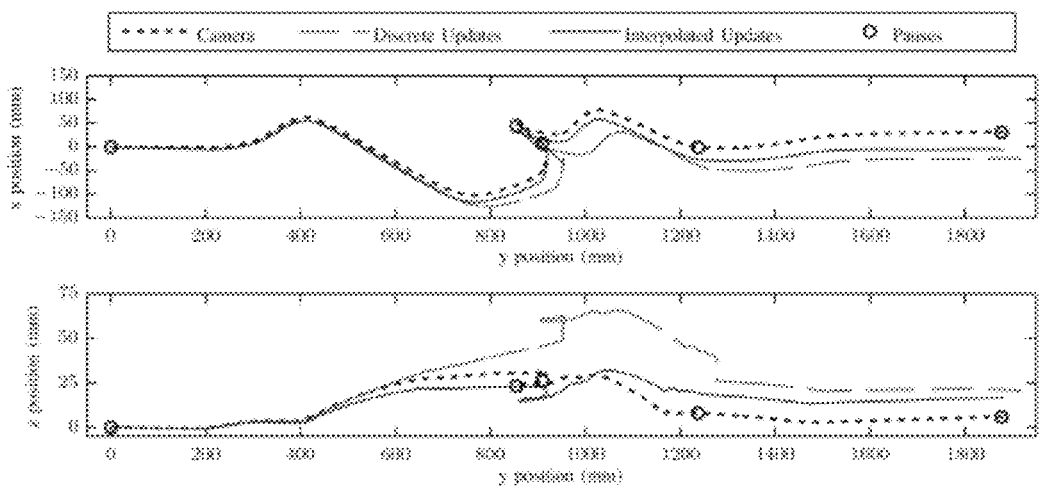
FIG. 25 illustrates graphs that show the path and location of pauses for a fourth trial on the ramps, as used during experiments.

As shown in Table 8, the maximum period of integration between bias updates for the first trial on the ramps was 3.05 s and the average was 1.54 s. Due to the difficulty in traversing the ramps with the robot, these were reasonable lengths of time between pauses that were used to assess the position and stability of the robot on the ramps. The path traversed in this trial and the locations of the detected pauses in the motion are illustrated in FIG. 24. For comparison, the path and location of pauses for the fourth trial on the ramps is illustrated in FIG. 25. This trial had significantly longer periods of integration between pauses with a maximum duration of 4.53 s and an average of 2.33 s. With the increased time between bias updates, the reduced accuracy in the position estimates from the IMU relative to the first trial is evident. However, the features of the path were still captured reasonably well, especially when using interpolated bias updates.

Figure 26:
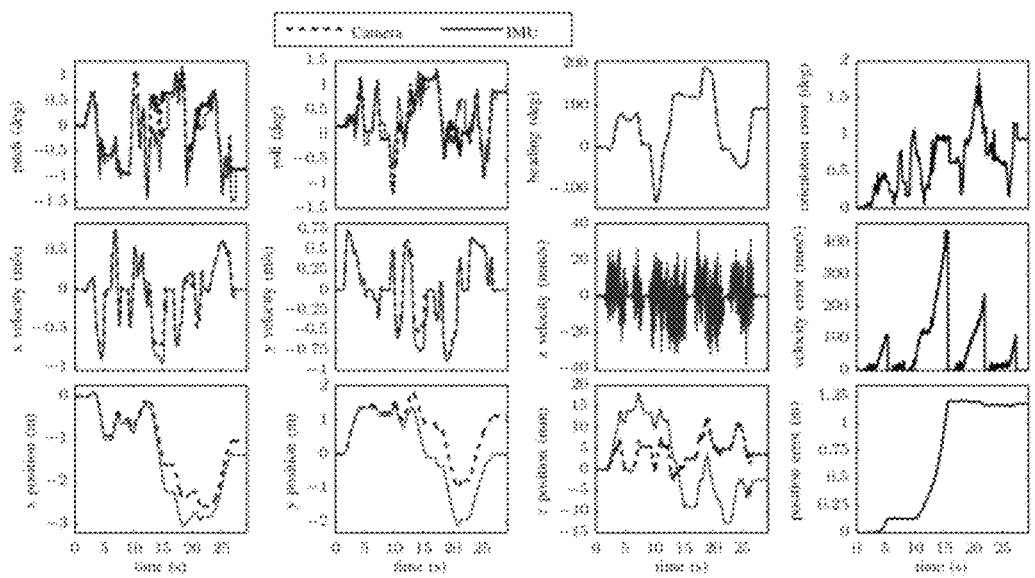
FIG. 26 illustrates graphs that show motion tracking results for a second trial on level ground using discrete bias updates, obtained during experiments.
Figure 27:
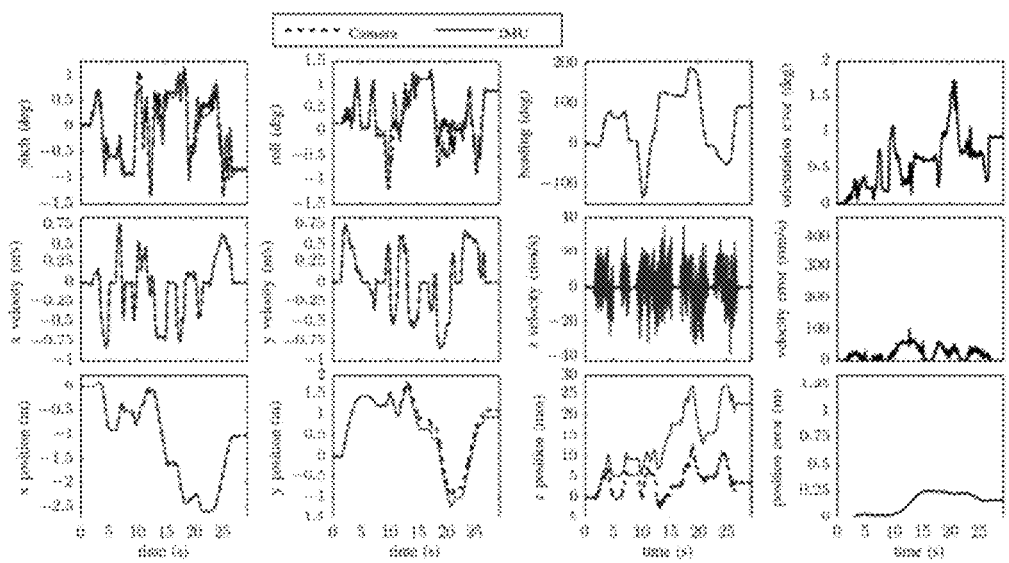
FIG. 27 illustrates graphs that show results using interpolated updates for the second trial on level ground, as obtained during experiments.

The trials conducted on level ground provide an example of the results that can be obtained in an application with longer cruising times between still periods, as would be common for an application using a mobile robot indoors or on pavement. The motion tracking results for the second trial on level ground using discrete bias updates are shown in FIG. 26, and the results using interpolated updates are shown in FIG. 27. The second trial is highlighted because it provides a greater distinction between the results with and without interpolated bias updates. In this trial, the maximum length of integration between still periods was 6.60 s and the average length of integration periods was 4.46 s. For both discrete and interpolated bias updates, the maximum orientation error is below 2° and the final orientation error is approximately 1°. The maximum position error dropped from 1.2 m using discrete updates to under 25 cm using interpolation between updates.

The accuracy of the orientation estimates derived from the gyros alone was very good even without any bias tracking. The drift rate of approximately 0.1°/s could provide sub-degree accuracy for 10 s without any aiding. For applications requiring only attitude and heading information, such as head tracking in virtual reality applications or estimating ground reaction forces on a mobile robot negotiating uneven terrain these levels of error would be tolerable for short experiments. This is especially true if the motion is intermittent, allowing bias updates to be applied to the gyro outputs alone to halt orientation error growth during still periods.

Figure 21:
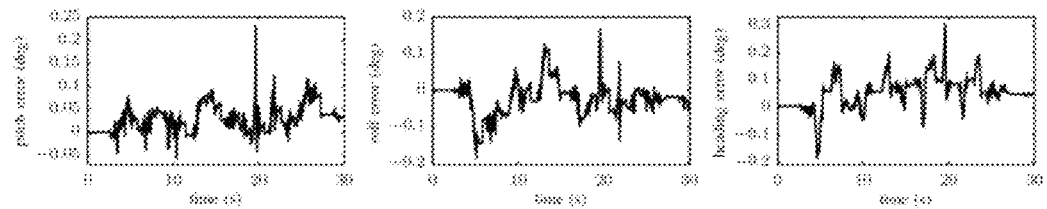
FIG. 21 illustrates graphs that show errors in the pitch, roll, and heading angles using discrete bias updates determined relative to the vision system's estimates, as obtained during experiments.
Figure 22:
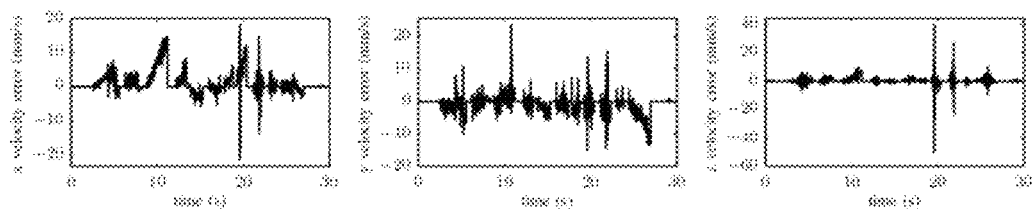
FIG. 22 illustrates graphs that show errors in the three velocity components shown in the reference frame using discrete bias updates, as obtained during experiments.

For applications requiring position and velocity estimates, it can be shown that for the MEMS IMU used in these experiments the small amount of orientation error that can accumulate after only one second causes gravity cancellation errors to surpass the errors in the accelerometer outputs. The three-dimensional bias tracking algorithm described above was shown to very effectively reduce gravity cancellation errors by limiting the growth of pitch and roll errors. As seen in FIG. 21, the algorithm's use of aiding information from the accelerometers allows pitch and roll errors to be kept in the vicinity of 0.1°. This is below the point where gravity compensation errors exceed accelerometer output errors.

Interpolation of the pitch and roll errors was found to provide the greatest benefit in the trials on level ground, where there were longer periods of integration. For the first trial on the ramps, illustrated in FIGS. 20 and 23, the maximum pitch and roll errors were reduced slightly by using interpolation, but the overall orientation error at the end of the trial actually increased. This is because only the pitch and roll angles are corrected, which can negatively impact the heading calculation due to the interaction between the three angles. Although this causes greater total orientation error, the interpolation is still desirable, because it reduces the error in the pitch and roll angles individually. This results in more accurate gravity cancellation, and improved total position error, as seen in Table 8 and FIG. 24.

The heading angle errors did not contribute as rapidly to position error because they did not cause errors in the kinematic acceleration estimates. However, they still caused position error to accumulate proportionally to the heading angle error and the distance traveled, just as with wheel odometry. While a major goal of the experiments was to demonstrate the attainable accuracy using unaided MEMS inertial sensors, the heading angle errors could be reduced by incorporating magnetometers for applications in environments free from significant magnetic disturbances. Thus, in some embodiments, systems, methods, and apparatus for three-dimensional tracking of intermittent motion with an IMU may not use other sensors other than the accelerometers and gyroscopes. In other embodiments, additional sensors, such as magnetometers, may be used.

The results demonstrated in these experiments clearly show the effectiveness of the above-described algorithm in improved the position and velocity estimates obtained using unaided inertial sensors. By reducing errors in gravity cancellation, and performing other appropriate bias updates, the velocity estimates can remain useful indefinitely given intermittent motion. Additionally, the accuracy of the position estimates were improved by four orders of magnitude relative to the results obtained by directly integrating the calibrated IMU outputs for a trial lasting 30 s.

With pauses every few seconds while traversing uneven terrain, position error on the order of a few centimeters was obtained after 30 s with a path length of around 2 m. The position error grew to tens of centimeters over the same time span driving on level ground with longer periods of motion and a total path length of over 12 m. In both cases, there is a significant improvement in the position estimate by interpolating the bias levels. However, since heading errors remain uncorrected using unaided inertial sensors, they cause a significant amount of the remaining position error. This can be seen clearly in the top view of the path in FIG. 25. As mentioned above, these errors could be reduced in applications where magnetometers can be used since this would improve the heading estimates.

The algorithm described above and experimental results presented here demonstrate that centimeter-level positioning accuracy and orientation errors below one degree can be obtained in mobile robotics applications using an unaided, commercial-grade, MEMS IMU over time periods of up to 30 s given intermittent motion. The average and maximum length of continuous motion ranged from 1.54-4.46 s and 3.02-6.60 s, respectively, in the six trials performed in this study, including experiments on uneven terrain and level ground. This represents a significant improvement relative to previous attempts to use unaided inertial measurement in mobile robotics and demonstrates that inexpensive MEMS inertial sensors can provide useful motion tracking results in practical applications.

The state estimation algorithm used to obtain these results relies only on easily measured characteristics of the inertial sensors' noise and does not depend on application-specific heuristics or thresholds. This provides improved flexibility and portability relative to existing methods that are specific to the application, rather than the sensors being used. Furthermore, the algorithm allows velocity, pitch, and roll estimates to remain useful indefinitely provided sufficiently frequent still periods. This is possible because accumulated error in these quantities is eliminated with each pause in the motion. Detection of the still periods is based only on the sensor outputs and does not require communication with an external motion controller. This further increases the utility and the range of potential applications of the algorithm.

Example and Test Data—Human Motion

The IMU used to conduct experiments on tracking human motion was substantially the same as the IMU used in previous experiments (described above). The sensors are sampled at 1000 Hz with a 16-bit A/D. The redundancy of the sensors allows for a weighted combination based on the static variance of each individual axis. At any time, saturated sensors are weighted out of the resulting signal. The calibration system described above provides an average improvement of 5.7% and 24% over other linear models for the accelerometers and gyros, respectively. This improves the state estimation described above, and combined they greatly reduce the compounding error resulting from multiple integrations over time. Temporal stability of IMU calibration was also investigated—i.e., would the device require recalibration at each use; and if not recalibrated at each use, how much benefit is lost?

The state estimator works as described above. Zero velocity updates were used to re-bias the accelerometers and gyros to minimize cumulating integration errors; they are typically based on step detection (using simple feature detection in accelerometer and gyroscope signals or insole pressure measurement) and assumed a no-slip condition with the ground. If a slip occurs, this error is accumulated for the remainder of the trial. The method described herein uses the measured noise parameters of the IMU to determine periods of still, therefore increasing the robustness of the system in irregular terrain and eliminating the no-slip requirement. The bias adjusting estimator has two tunable parameters for both accelerometers and gyroscopes: the length of time a signal must drop into the noise band of the sensor before being considered a still period (rather than noise or other abnormalities) and magnitude to consider the noise band. These parameters are optimized on a given trial and applied to the algorithm prior to execution.

Experiments were conducted in a motion analysis laboratory (MAL) which contains an 8-camera stereographic motion capture system (Vicon, Oxford, UK) for 3d motion tracking. The system has sub-millimeter accuracy and was utilized at a 1 kHz capture rate. The IMU was attached to the rigid cap of a steel-toed boot. Mounted securely to the IMU was an L shaped block with vision-system markers identifying the IMU coordinate system. The IMU was attached via a shielded cable to the DAQ system and powered by a constant DC power supply. Two types of trials were performed: Normal, unaffected gait on level ground (four trials) and natural stair climbing and descent of three steps (two trials). Both types of trails were used to examine calibration stability and the contributions of each aid (calibration and bias-update routine).

A goal for the experiments was to determine usefulness of the two tools (calibration and bias-update) and as such each gait trail was analyzed to determine the maximum error between IMU measurement and ground truth in six configurations: Bias-update Off, Factory Calibration; Bias-update On, Factory Calibration; Bias-update Off, User Calibration 1; Bias-update On, User Calibration 1; Bias-update On, User Calibration 2; Bias-update On, User Calibration 3. This set of routines provided information about the contribution of each tool as well as provided an indication of the stability of calibrations by applying calibrations 1, 2 and 3 to the trials under otherwise identical conditions. Note calibrations 1 and 2 are from a common operator and 3 a different operator.

Figure 28:
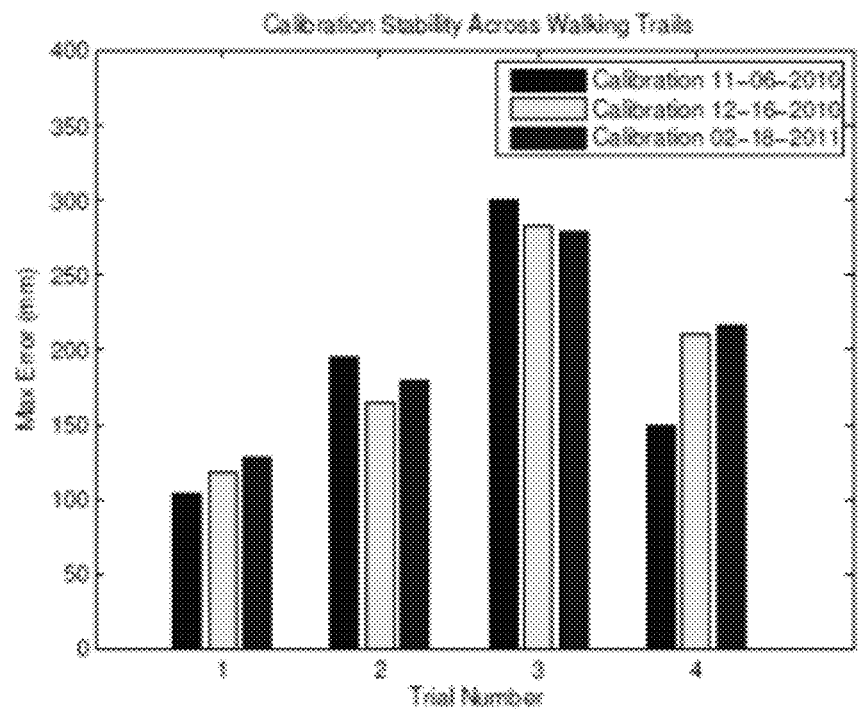
FIG. 28 illustrates a graph that shows relative difference in error by using three calibrations from different dates for four walking gait trials, as obtained during experiments.

To investigate the stability of calibration, FIG. 28 demonstrates the relative difference in error by using three calibrations from different dates on the four walking gait trials. Likewise, to determine the relative effect of bias-adjustment and calibration, Table 9 displays the percent error reduction by applying our calibration routine, applying the bias update algorithm; and applying both.

TABLE 9

| Trial | Calibration | State Estimation | Both |
|---|---|---|---|
| Stairs 1 | 32.92% | 99.92% | 99.95% |
| Stairs 2 | 56.84% | 99.57% | 99.60% |
| Walking 1 | 33.03% | 99.01% | 99.65% |
| Walking 2 | 82.35% | 97.51% | 99.23% |
| Walking 3 | 88.15% | 99.45% | 99.46% |
| Walking 4 | 75.83% | 99.29% | 99.43% |

Figure 29:
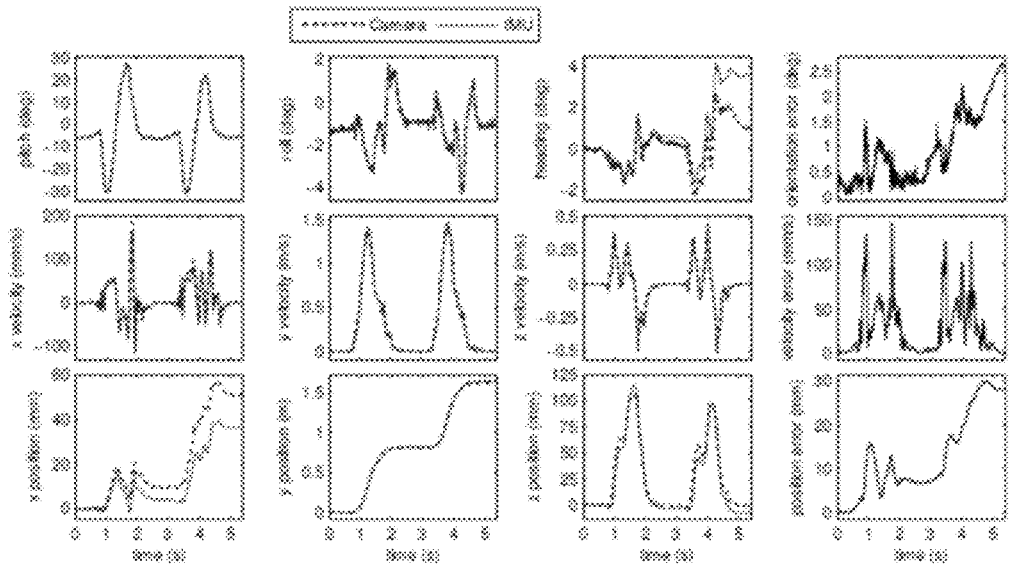
FIG. 29 illustrates graphs that show orientation, velocity, and position estimates from an IMU as well as truth from a camera system for a walking trial, as obtained during experiments.
Figure 30:
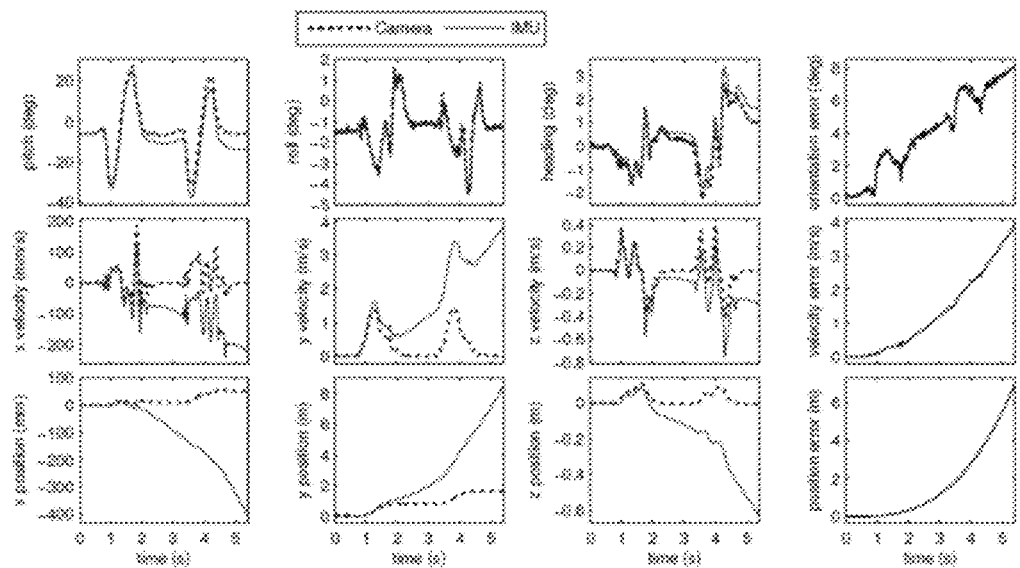
FIG. 30 illustrates graphs that show orientation, velocity, and position estimates from an IMU during the trial shown in FIG. 29 without applying calibration values or bias updates, as obtained during experiments.
Figure 31:
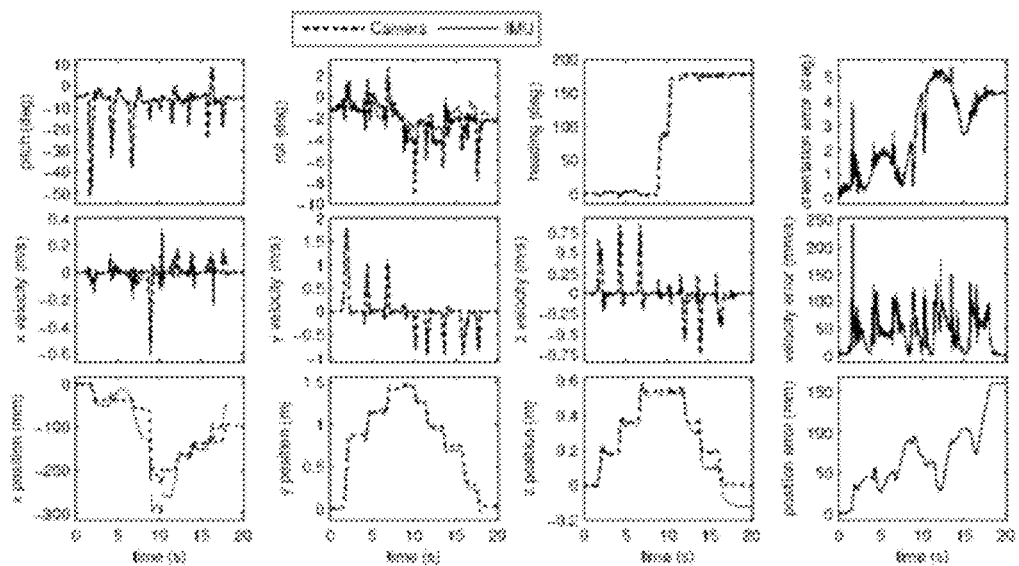
FIG. 31 illustrates graphs that show results obtained during walking on stairs, as obtained during experiments.

To determine the success of a low-cost IMU for gait tracking, all trials were analyzed with state estimation on and our calibration active. FIG. 29 shows the angle, velocity, and position IMU tracking as well as truth from the camera system of a walking trial. Errors are shown in the rightmost plots. FIG. 30 is the same trial as in FIG. 29 with both aids disabled, i.e., no bias updates and using the factory calibration. FIG. 31 is a representative stairs trial. Table 10 contains the errors as a percentage of total distanced traveled, directionally for X, Y, Z and rotations. Y is the direction of primary progress in all trials, Z height, and X the lateral axis.

TABLE 10

| | Position Errors (%) | | | Angular Errors (%) | | |
|---|---|---|---|---|---|---|
| Trial | X | Y | Z | X | Y | Z |
| Stairs 1 | 15.77 | 3.05 | 7.40 | 1.63 | 1.03 | 0.68 |
| Stairs 2 | 17.45 | 20.30 | 0.25 | 1.55 | 1.06 | 1.01 |
| Walking 1 | 12.44 | 1.47 | 2.88 | 5.34 | 0.63 | 0.72 |
| Walking 2 | 21.81 | 3.68 | 21.59 | 1.22 | 1.31 | 0.83 |
| Walking 3 | 27.20 | 3.74 | 10.90 | 3.72 | 1.18 | 0.48 |
| Walking 4 | 14.30 | 3.52 | 13.05 | 1.38 | 1.27 | 0.74 |
| Mean | 18.16 | 5.96 | 10.85 | 2.47 | 1.08 | 0.74 |

The results are greatly improved by the process of calibrating and applying zero-velocity updates, as evidenced by comparing the representative stair and gait tracking results, using the aids to the same walking trial without. Table 9 quantifies the improvement made by each aid. Note that state estimation alone makes the largest contribution to the error reduction; but also that the calibration improvements are non-trivial. The additional improvement of the calibration above state estimation alone is 104.75 mm±163.82 mm.

The calibration values appear to be static across the walking trials as seen in FIG. 28. The data does not show a trend for more recent calibrations to be more accurate, therefore a single, careful calibration to a new IMU is suspected to be sufficient for some months. Absolute errors as a percent of the distance traveled are shown in Table 10. Angular tracking is consistently strong across trials. Overall, the experiments demonstrated vast error reduction in inexpensive IMU-based motion tracking made by using a low cost, clinically feasible calibration routine as well as a bias-updating zero-velocity update algorithm.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A system for calibrating an inertial measurement unit (IMU) that has one or more sensors, said system comprising:
a calibration fixture, said calibration fixture having a support surface and a first rail, the support surface having a planar surface and the first rail having a planar surface, the planar surface of the first rail being orthogonal to the planar surface of the support surface to provide physical limits to a relative movement of the IMU in a linear or rotational direction with respect to said calibration fixture, said calibration fixture being configured to allow for linear movement of the IMU along the first rail of said calibration fixture and within the physical limits of said calibration fixture, and said calibration fixture being configured to allow for angular positioning of the IMU at various angles relative to and within the physical limits of said calibration fixture; and
a computer system in functional communication with the IMU, the computer system comprising:
a processor; and
one or more physical non-transitory computer readable medium having computer executable instructions stored thereon that when executed by the processor, cause the computer system to perform the following:
receiving signals from the one or more sensors in response to linear or rotational movement of the IMU with respect to and within the physical limits of said calibration fixture,
calculating calibration values to compensate for signals from the one or more sensors from a calibration model.

2. The system as recited in claim 1, wherein the calibration model includes a variable for Earth's gravity vector acting on the IMU.

3. The system as recited in claim 1, wherein the IMU is a MEMS IMU.

4. The system as recited in claim 1, wherein said calculated calibration values for compensating signals include one or more of calibration values for one or more of misalignment relative to a reference frame, a linear or nonlinear scale factor, an anisotropic sensitivity, a bias, a gyroscope acceleration sensitivity, or temperature sensitivity.

5. The system as recited in claim 4, wherein said computer system calculates said calibration values using a quadratic model to account for one or more of anisotropic sensitivities, scale factor nonlinearity, temperature sensitivity, or other relevant parameters.

6. The system as recited in claim 1, wherein said computer system uses an overdetermined system of equations to calculate said calibration values.

7. The system as recited in claim 1, wherein the one or more sensors comprise an accelerometer triad and a gyroscope triad having aligned axes.

8. The system as recited in claim 7, wherein said computer system calculates said calibration values using a regressor matrix, which is populated with data obtained from the accelerometer triad during one or more of static observations and linear movements within said calibration fixture.

9. The system as recited in claim 1, wherein the calibration fixture comprises a calibration plate that allows for linear movement of the IMU relative to and within the calibration fixture and support blocks to allow for angular positioning of the IMU at various angles relative to and within the calibration fixture.

10. The system as recited in claim 9, wherein said computer system calculates said calibration values using a regressor matrix, which is populated with data obtained from a gyroscope triad during a combination of static observations, linear motions, and rotations within said calibration fixture.

11. The system of claim 1, further comprising a case, wherein the case includes a first surface and a second surface that are planar and orthogonal to each other such that when the IMU is placed within the case, the case may abut the planar surface of first rail and the planar surface of the support surface as the case is moved along at least a portion of the first rail.

12. The system of claim 11, further comprising a second rail, the second rail having a planar surface orthogonal to the first rail and the support surface, and wherein the case includes a third surface that is orthogonal to the first surface and the second surface of the case.

13. The system of claim 12, wherein in a corner configuration, the first surface of the case abuts the planar surface of the support surface, the second surface of the case abuts the planar surface of the first rail, the third surface of the case abuts the planar surface of the second rail.

14. A system for estimating a state of an IMU that has one or more accelerometers and one or more gyroscopes, said system comprising:
an IMU having one or more accelerometers and one or more gyroscopes, the one or more accelerometers and one or more gyroscopes each having a known noise band; and
a computer system functionally connected to the IMU, the computer system comprising:
a processor; and
one or more physical non-transitory computer readable medium having computer executable instructions stored thereon that, when executed by the processor, cause the computer system to perform the following:
receiving a first signal from the one or more accelerometers and a second signal from the one or more gyroscopes and applying one or more calibration values to correct for one or more of misalignment of the one or more accelerometers and one or more gyroscopes relative to a reference frame, a linear or nonlinear scale factor, an anisotropic sensitivity, a bias, a gyroscope acceleration sensitivity, and temperature sensitivity,
monitoring the first signal to determine whether said first signal is within the noise band of the one or more gyroscopes and monitoring the second signal to determine whether said second signal is within the noise band of the one or more accelerometers that sent said second signal, and if said received first signal and said received second signal are within noise bands of the respective one or more gyroscopes and one or more accelerometers that sent said received first signal and said received second signal, assigning a status of zero velocity to the IMU.

15. The system as recited in claim 14, wherein said received first signal and said received second signal comprise signals related to a scalar force measured by the one or more accelerometers.

16. The system of claim 14, wherein the one or more physical non-transitory computer readable medium has second computer executable instructions stored thereon that, when executed by the processor, cause the computer system to perform the following:

receiving a static signal from the one or more accelerometers and one or more gyroscopes when the IMU is stationary;

receiving a moving signal from the one or more accelerometers and one or more gyroscopes when the IMU is moving; and applying a calibration model to the static signal and the moving signal to calculate the calibration values.

17. The system of claim 16, wherein movement of the one or more accelerometers and one or more gyroscopes is limited by a calibration fixture.

18. A system for tracking intermittent motion, comprising:

an inertial measurement unit (IMU) that has one or more accelerometers and one or more gyroscopes; and a calibration fixture, said calibration fixture having a support surface, a first rail, and a second rail, the support surface, the first rail, and the second rail being orthogonal to each other to provide physical limits to a relative movement of the IMU in a linear or rotational direction with respect to said calibration fixture, said calibration fixture being configured to allow for linear movement of the IMU along the first rail or the second rail of said calibration fixture, and said calibration fixture being configured to allow for angular positioning of the IMU at various angles relative to and within the physical limits of said calibration fixture;

a moveable support block having a first surface, a second surface, and a third surface, the first surface, the second surface, and the third surface of the moveable support block being orthogonal to each other, the IMU is sized and configured to be secured to the moveable support block and moved within the calibration fixture;

a computer system functionally connected to the IMU, the computer system comprising:

a processor; and one or more physical non-transitory computer readable medium having computer executable instructions stored thereon that when executed by the processor, cause the computer system to perform the following:

receiving signals from the one or more accelerometers and one or more gyroscopes as the IMU is moved along the first rail or the second rail, estimating a state of the IMU, if the IMU is in a zero velocity state, updating calibration values of biases for the one or more gyroscopes and update calibration values of biases for the one or more accelerometers, if the IMU is not in a zero velocity state, processing the signal received from the IMU by applying one or more calibration values to correct for one or more of misalignment of the one or more accelerometers and one or more gyroscopes relative to a reference frame, a linear or nonlinear scale factor, an anisotropic sensitivity, a bias, a gyroscope acceleration sensitivity, and temperature sensitivity to obtain one or more of specific force, acceleration, angular velocity, linear velocity, linear displacement, and orientation of the IMU; and an output module configured to output one or more measurements and/or estimates.

19. The system as recited in claim 18, wherein the calibrated values of the biases for the one or more gyroscopes are updated by averaging or otherwise filtering the signal received from the one or more gyroscopes during the zero velocity state.

20. The system as recited in claim 18, wherein the one or more accelerometers comprise an accelerometer triad and one or more gyroscopes comprise a gyroscope triad.

21. The system as recited in claim 20, wherein the computer system estimates the state of the IMU by monitoring a magnitude of the specific force measured by the accelerometer triad, and when the specific force is within its noise band, checking accelerometer signals from each axis of each accelerometer for whether the accelerometer signals are within noise bands of their respective accelerometers, and when all of the accelerometer signals are within their noise bands, checking gyroscope signals from each axis of each gyroscope for whether the gyroscope signals are within noise bands of their respective gyroscopes, and when all checked signals are within the noise band of their respective sensors assigning a zero velocity status to the IMU.

22. The system as recited in claim 20, wherein the computer system updates calibrated values for the accelerometers by comparing the specific force measured by the accelerometer triad to a local gravity vector.

23. The system as recited in claim 20, wherein the computer system updates one or more of a pitch and roll measured during the zero velocity state by comparing the specific force measured by the accelerometer triad to a local gravity vector.

* * * * *